United States Patent
Kuroyanagi et al.

(10) Patent No.: US 7,275,299 B2
(45) Date of Patent: Oct. 2, 2007

(54) MOTOR MANUFACTURING PROCESS

(75) Inventors: Tooru Kuroyanagi, Anjo (JP);
Tsuyoshi Yamaguchi, Anjo (JP);
Shingo Hashimoto, Anjo (JP);
Takahiro Kido, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 372 days.

(21) Appl. No.: 10/496,671

(22) PCT Filed: Jul. 30, 2003

(86) PCT No.: PCT/JP03/09699

§ 371 (c)(1),
(2), (4) Date: May 26, 2004

(87) PCT Pub. No.: WO2004/012324

PCT Pub. Date: Feb. 5, 2004

(65) Prior Publication Data

US 2005/0005422 A1    Jan. 13, 2005

(30) Foreign Application Priority Data

Jul. 30, 2002  (WO) .................. PCT/JP02/07749
Jan. 31, 2003  (JP) ...................... 2003-023222

(51) Int. Cl.
*H02K 15/00*    (2006.01)
(52) U.S. Cl. .................. 29/596; 29/605; 29/606; 29/732; 29/734; 29/736; 140/92.1
(58) Field of Classification Search .............. 29/596, 29/605, 606, 732, 734, 736; 140/92.1
See application file for complete search history.

(56) References Cited

U.S. PATENT DOCUMENTS

| 1,538,187 | A |   | 5/1925 | Herrick |
|---|---|---|---|---|
| 2,873,514 | A |   | 2/1959 | Mills |
| 3,193,913 | A |   | 7/1965 | Moore |
| 4,750,258 | A | * | 6/1988 | Anderson ............... 29/596 |
| 4,908,541 | A |   | 3/1990 | Kawazoe et al. |
| 5,060,364 | A |   | 10/1991 | Scherer |
| 6,389,678 | B1 | * | 5/2002 | Ackermann et al. ....... 29/596 |
| 2004/0055139 | A1 |   | 3/2004 | Kuroyanagi et al. |
| 2004/0068858 | A1 |   | 4/2004 | Kuroyanagi et al. |

FOREIGN PATENT DOCUMENTS

EP    1 414 137 A1    4/2004

(Continued)

OTHER PUBLICATIONS

U.S. Appl. No. 10/433,097, filed Jun. 12, 2003, Kuroyanagi et al.

*Primary Examiner*—A. Dexter Tugbang
*Assistant Examiner*—Tim Phan
(74) *Attorney, Agent, or Firm*—Oliff & Berridge, PLC

(57) ABSTRACT

A plurality of single-pole coils are retained by a coil retaining device, the single-pole coils are arranged such that the coil insertion portions of each single-pole coil confront the inner circumference openings of the slots and may be generally parallel to the axial direction of the motor core, each single-pole coil is moved linearly toward the motor core such that the coil retaining device and the moving locus before the adjoining coil insertion portions in the adjoining single-pole coils are inserted into the slots are parallel or approach the more from the inner circumference side to the outer circumference side and the two coil insertion portions of each single-pole coil are moved such that they may start their movements simultaneously and at equal velocities.

33 Claims, 47 Drawing Sheets

FOREIGN PATENT DOCUMENTS

| | | |
|---|---|---|
| JP | A 51-138803 | 11/1976 |
| JP | A 55-094567 | 7/1980 |
| JP | A 56-019363 | 2/1981 |
| JP | A 63-001349 | 1/1988 |
| JP | A 63-069448 | 3/1988 |
| JP | A 09-9588 | 1/1997 |
| JP | A 09-322492 | 12/1997 |
| JP | A 2000-116078 | 4/2000 |
| JP | A 2000-125522 | 4/2000 |
| JP | A 2002-325408 | 11/2002 |

* cited by examiner

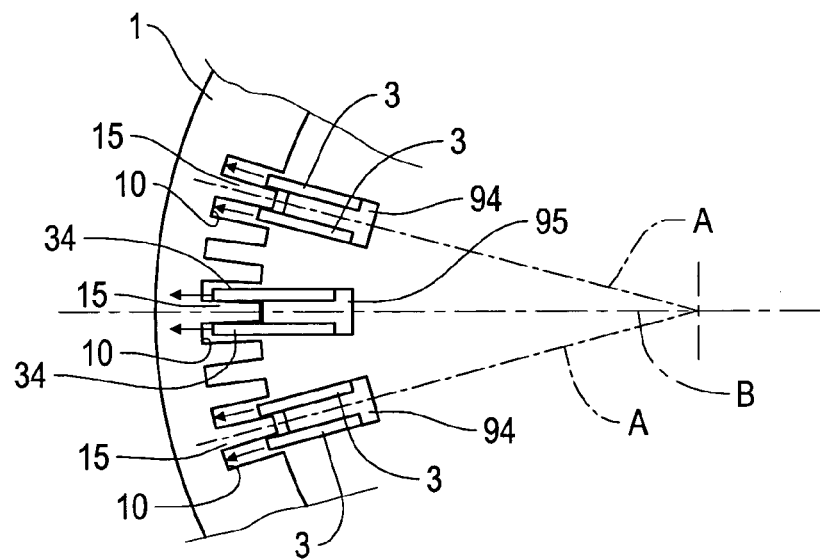
Fig. 19
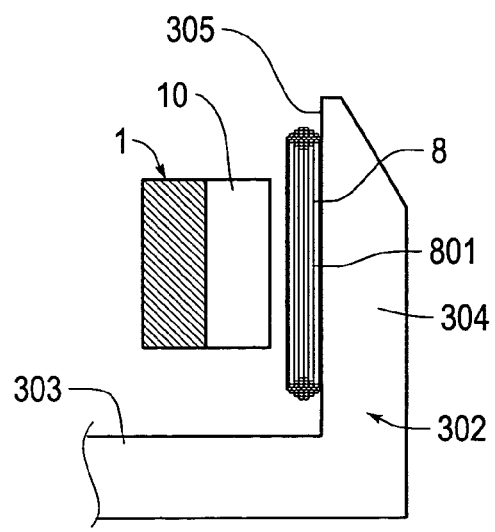 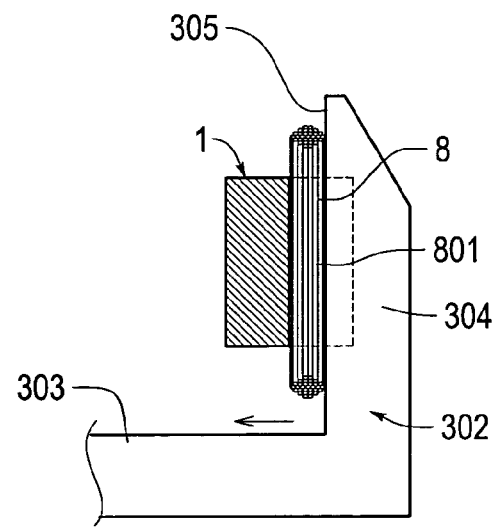
Fig. 20A                Fig. 20B

MOTOR MANUFACTURING PROCESS

This application is the U.S. National Stage of PCT/JP03/09699 filed Jul. 30, 2003 which claims priority from JP2003-023222 filed Jan. 31, 2003 and PCT/JP02/07749 filed Jul. 30, 2002, the disclosures of which are incorporated herein in their entireties by reference thereto.

BACKGROUND OF THE INVENTION

1. Field of Invention

The invention relates to a process for manufacturing a motor and, more particularly, to a process for inserting a coil into a motor core.

2. Description of Related Art

The motor manufacturing process of a motor with a stator prepared by inserting a coil into slots of a motor core, such as a stator core or rotor core, is important. A variety of coil inserting processes or apparatus have been proposed.

In the coil inserting process of JP-A-2000-125522; JP-A-2000-116078; and JP-A-9-322492, for example, the so-called "inserter method" is used. A brief description of one example of the inserter method will be described with reference to FIGS. 66-68. As shown in FIG. 66 and FIG. 67, a ring-shaped stator core 1 is arranged in a horizontal posture, and a coil 8 is also arranged generally in the horizontal posture axially below the stator core 1. A jig (not shown) is lifted from below the coil 8 through the inside of the stator core 1, and the inner side end 81 of the coil 8 is hooked and moved upward by the jig. As a result, the coil 8 is moved to rub the inner circumference of the stator core 1 while changing its state gradually from the horizontal posture to the vertical posture. As such, the coil 8 is inserted into the slots 10 of the stator core 1.

SUMMARY OF THE INVENTION

However, the following problems are included in the motor manufacturing process using the above described inserter method. In the inserter method, the coil 8 is inserted, while changing its state, into the slots 10 of the stator core 1 as described hereinbefore. While the state of the coil changes, there arises a state in which the coil 8 is inserted in an oblique posture. As shown in FIG. 68, therefore, the size of the coil 8 has to be given a surplus at least in its vertical length L0. As a result, at the time when insertion has been completed, the coil 8 takes a state in which the coil end portion at its upper end portion or its lower end portion bulges more than necessary from the stator core 1.

This bulge of the coil end portion of the coil 8 leads to an enlargement in the axial size of the entire motor that has the coil assembled in the stator core as described hereinbefore. This problem, as described above, also occurs when the motor core has the coil inserted not only in the stator core but also in the rotor core.

There is thus a need to adopt an electric motor or a hybrid system in an automobile, wherein the axial size of the motor is reduced.

The invention thus provides a motor manufacturing process that can, among other things, reduce the bulge extents of the coil from the motor core and reduce the axial length of the motor.

According to a first exemplary aspect of the invention, a method for manufacturing a motor with a ring-shaped motor core having slots formed in an inner circumference of the motor core and in which coils are inserted and arranged in the slots, comprising forming a plurality of single-pole coils that include two coil insertion portions and two coil end portions that connect the coil insertion portions; and inserting the coil insertion portions into the slots, by retaining the single-pole coils at or after the forming of the coils; arranging the single-pole coils such that the coil insertion portions of each of the single-pole coils confront inner circumference openings of the slots and are generally parallel to an axial direction of the motor core; moving each of the single-pole coils substantially linearly toward the motor core such that each of the single-pole coils move from a retained position and a moving direction of adjoining coil insertion portions, before the adjoining coil insertion portions of adjoining single-pole coils are inserted into the slots, are substantially parallel or approach each other from an inner circumference side to an outer circumference side; and moving the two coil insertion portions of each single-pole coil such that the coil insertion portions start moving simultaneously and at equal velocities.

According to a second exemplary aspect of the invention, the invention includes a method for manufacturing a motor with a ring-shaped motor core having slots formed in an inner circumference of the motor core and in which coils are inserted and arranged in the slots, comprising forming a plurality of single-pole coils that include two coil insertion portions and two coil end portions that connect the coil insertion portions; and inserting the coil insertion portions into the slots by retaining the single-pole coils at or after the forming of the coils; arranging the single-pole coils such that the coil insertion portions of each of the single-pole coils confront inner circumference openings of the slots and are generally parallel to an axial direction of the motor core; moving the each of the single-pole coils substantially linearly toward the motor core such that each of the single-pole coils move from a retained position and a moving direction of adjoining coil insertion portions, before the adjoining coil insertion portions of adjoining single-pole coils are inserted into the slots, are substantially parallel or approach each other from an inner circumference side to an outer circumference side; and moving the two coil insertion portions of each single-pole coil, such that the coil insertion portions are simultaneously inserted into the slots.

According to a third exemplary aspect of the invention, the invention includes a method for manufacturing a motor with a ring-shaped motor core having slots formed in an inner circumference of the motor core and in which coils are inserted and arranged in the slots, comprising forming a plurality of single-pole coils having two coil insertion portions and two coil end portions that connect the coil insertion portions; placing the coils in a magazine, wherein the magazine has a shape such that the magazine can be arranged on an inner side of the inner circumference of the motor core, is provided in an outer circumference of the magazine with a plurality of coil retaining grooves at positions confronting the slots of the motor core as to arrange the coil insertion portions of the single-pole coil, and the coil retaining grooves for arranging the adjoining coil insertion portions in the adjoining single-pole coils are arranged either in parallel with each other or to approach each other from the inner circumference side to the outer circumference side, wherein the coil insertion portions of the single-pole coils are inserted into the coil retaining grooves to retain the coils on the magazine; arranging the magazine inside the motor core so that the coil retaining grooves of the magazine confront the slots of the motor core; and inserting the coil insertion portions of the single-pole coils into the slots, by bringing a coil inserting device into abutment against all the single-pole coils on the magazine to advance abutting portions in a direction from a center of the magazine to the outer circumference, thereby to move each of the single-pole coils substantially linearly toward the motor core such that the coils leave the magazine and such that the two coil insertion portions of each single-pole coil may start moving simultaneously and may take equal velocities.

According to a fourth exemplary aspect of the invention, the invention includes a method for manufacturing a motor with a ring-shaped motor core having slots formed in an inner circumference of the motor core and in which coils are inserted and arranged in the slots, comprising forming a plurality of single-pole coils that include two coil insertion portions and two coil end portions that connect the coil insertion portions; placing the coils in a magazine, wherein the magazine has a shape such that the magazine can be arranged on an inner side of the inner circumference of the motor core, an outer circumference of the magazine is provided with a plurality of coil retaining grooves at positions confronting the slots of the motor core as to arrange the coil insertion portions of the single-pole coil, and in which said coil retaining grooves for arranging adjoining coil insertion portions in the adjoining single-pole coils are arranged either in parallel with each other or to approach each other from an inner circumference side to an outer circumference side, wherein the coil insertion portions of the single-pole are inserted into the coil retaining grooves to retain the coils on the magazine; arranging the magazine inside of the motor core such that the coil retaining grooves of the magazine confront the slots of the motor core; and inserting the coil insertion portions of the single-pole coils into the slots, by bringing a coil inserting device into abutment against all the single-pole coils on the magazine to advance abutting portions in a direction from a center of the magazine to the outer circumference, thereby to move each of the single-pole coils substantially linearly toward the motor core such that the coils leave the magazine and such that the two coil insertion portions of each single-pole coil may be simultaneously inserted into the slots.

BRIEF DESCRIPTION OF THE DRAWINGS

Various embodiments of the invention will be described with reference to the drawings wherein:

FIG. 19 is an explanatory view showing the motions of insertion blades and so on of the coil inserting apparatus;

FIGS. 20A and 20B are explanatory views showing the shape and motion of the insertion blades;

DETAILED DESCRIPTION OF PREFERRED EMBODIMENTS

Figure 15:
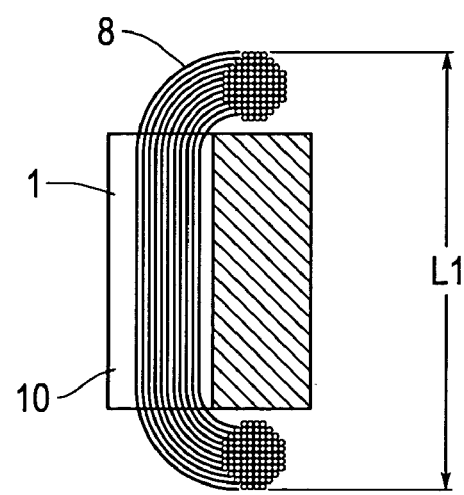
FIG. 15 is an explanatory view of showing the size of the coil inserted into the stator core.
Figure 16:
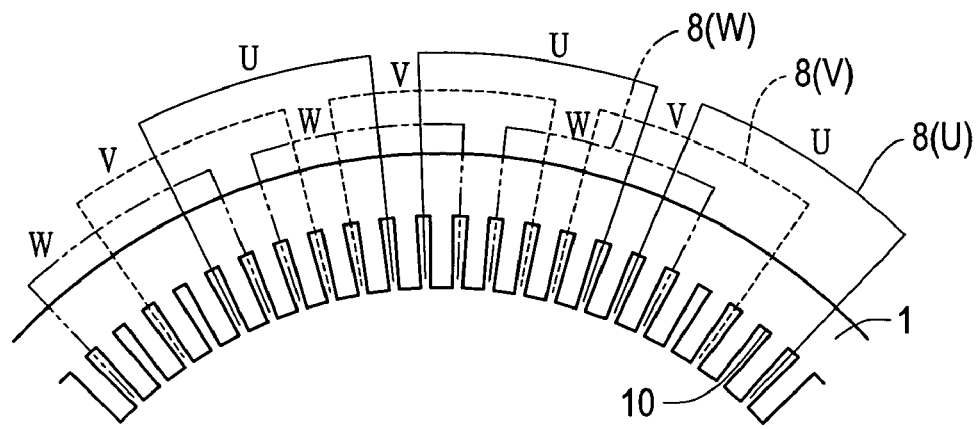
FIG. 16 is an explanatory view showing the arrangement relation of single-pole coils of individual phases to be inserted into the stator core.
Figure 17:
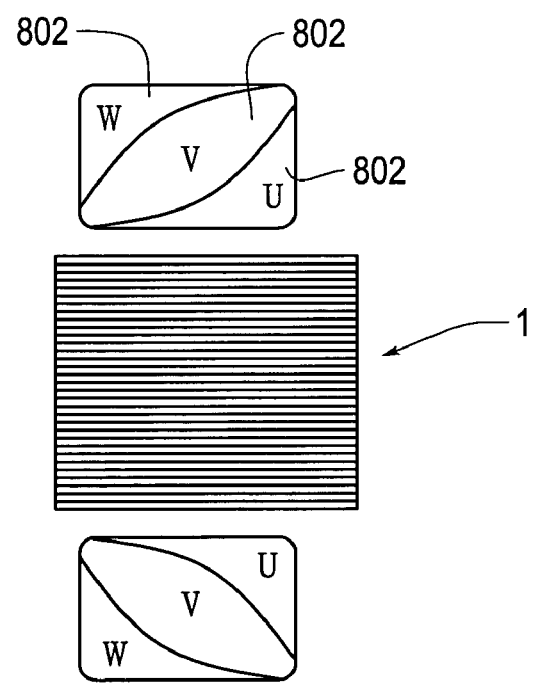
FIG. 17 is an explanatory view showing the overlapping state of a coil end portion of the single-pole coils of individual phases to be inserted into the stator core.

A motor manufacturing process according to a first embodiment of the invention will be described with reference to FIGS. 1-15. A motor to be manufactured by the process of this embodiment includes: a ring-shaped motor core (or stator core) 1 (FIG. 9 to FIG. 12) having a plurality of slots 10 formed in its inner circumference; and a coil group of three phases (U-phase, V-phase and W-phase) (FIG. 16 and FIG. 17). In this motor manufacturing process, the coil group of each phase is composed of a plurality of single-pole coils 8 constructing one pole. Each single-pole coil 8 is inserted into and arranged in the stator core 1 across two slots 10. The single-pole coils 8 belonging to the coil groups of the different phases have their coil end portions 802 partially overlapping each other when they are mounted in the stator core 1.

The manufacturing process of this embodiment includes a coil forming step and a coil inserting step.

Figure 1:
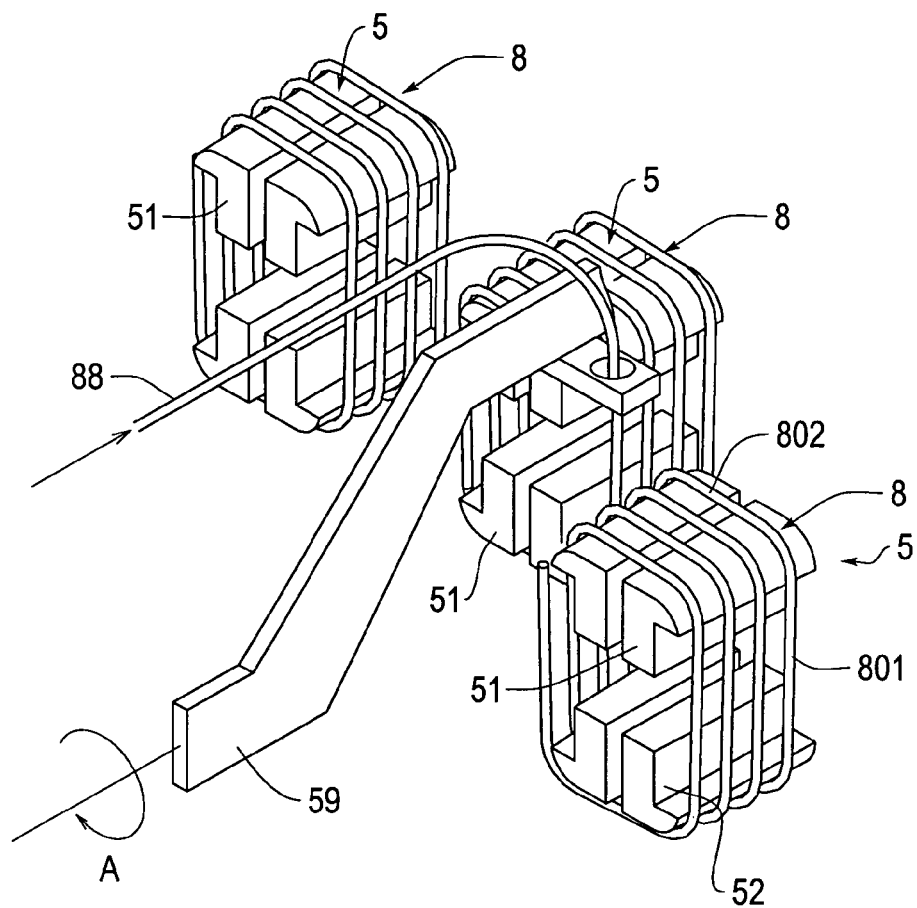
FIG. 1 is an explanatory view showing the state in which coils are wound on winding frames by a winding arm.
Figure 2:
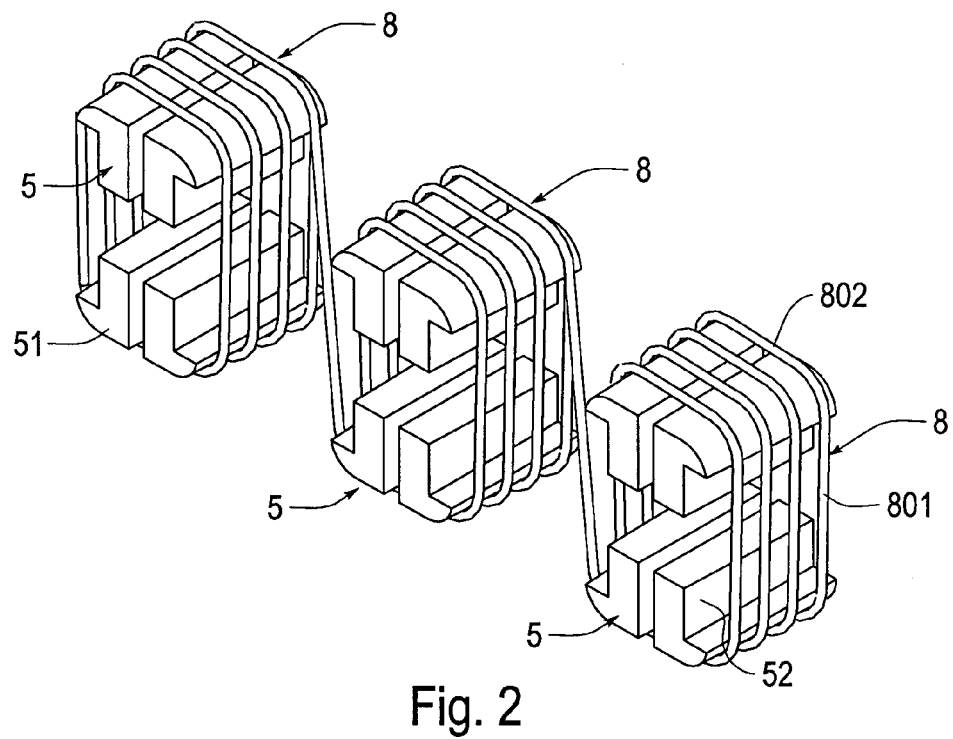
FIG. 2 is an explanatory view showing the state in which the formations of three coils are completed.
Figure 3:
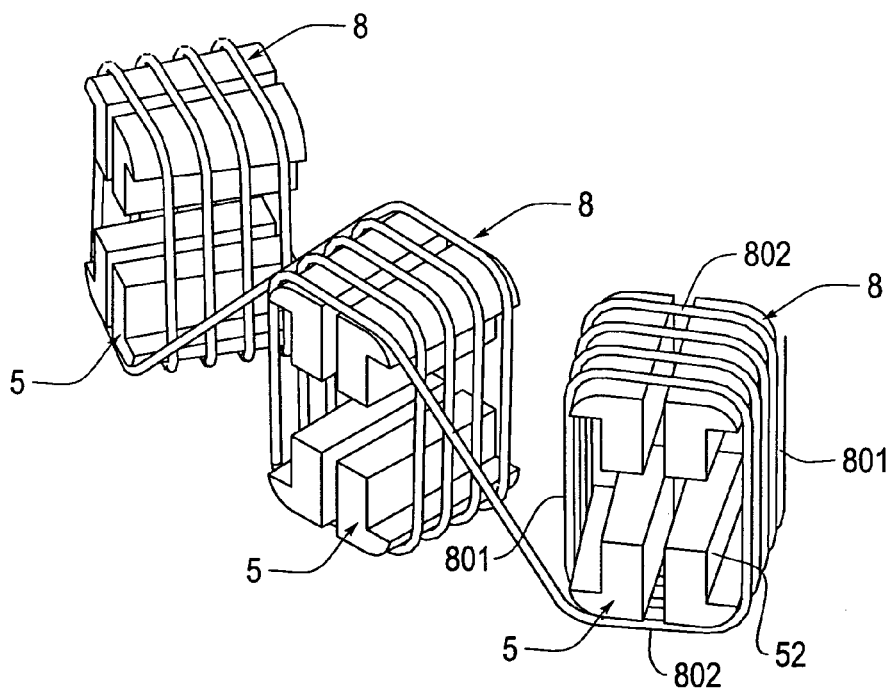
FIG. 3 is an explanatory view showing the state in which the shapes of the three coils are being profiled.

As shown in FIG. 1 to FIG. 3, the coil forming step forms the coil, which includes: the single-pole coil 8 having two coil insertion portions 801 inserted into the slots 10; and the two coil end portions 802 so arranged outside of the stator core 1 as to join the coil insertion portions 801.

Figure 8:
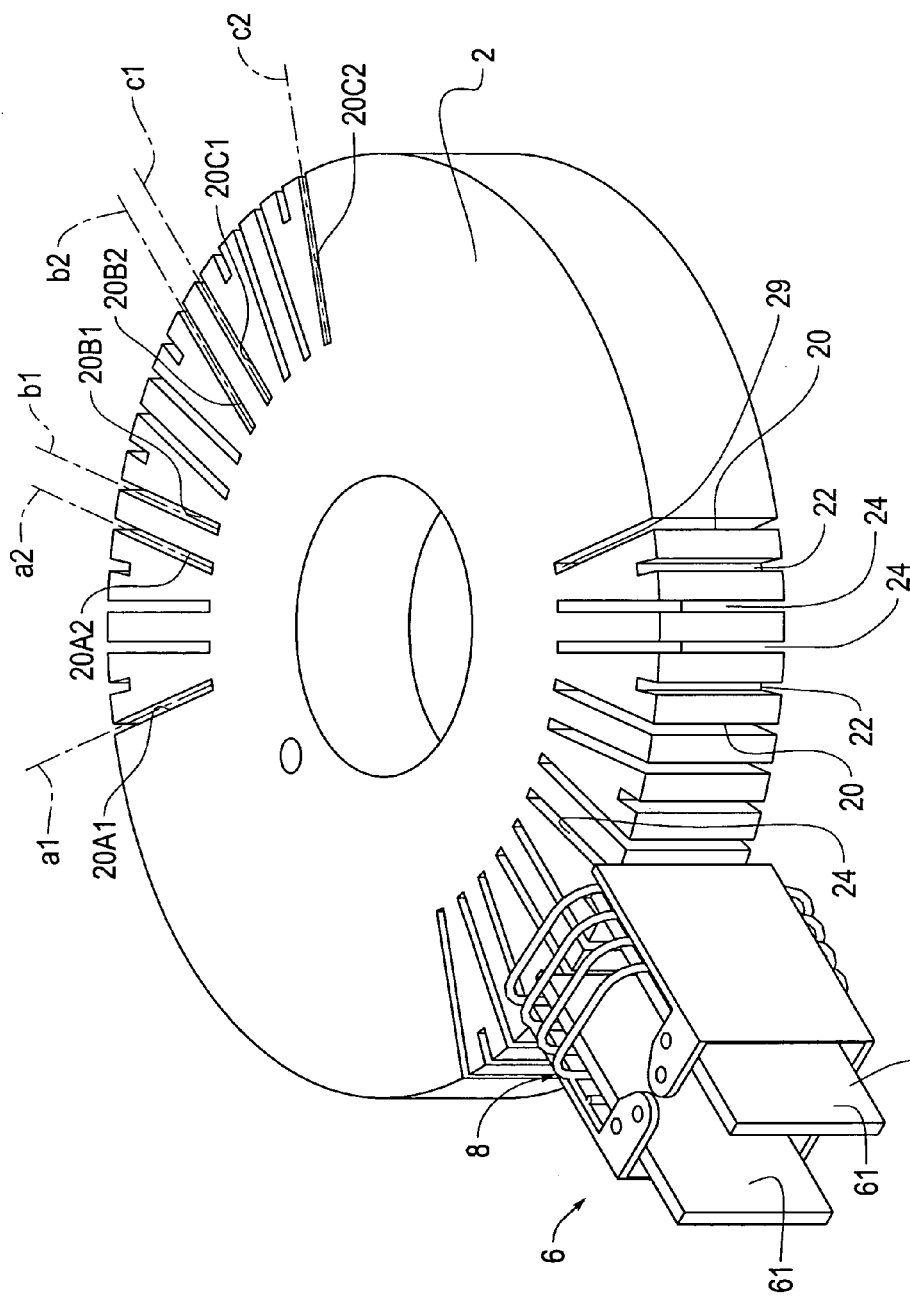
FIG. 8 is an explanatory view showing the state of in which the coil is transferred from the transfer device to a magazine.
Figure 9:
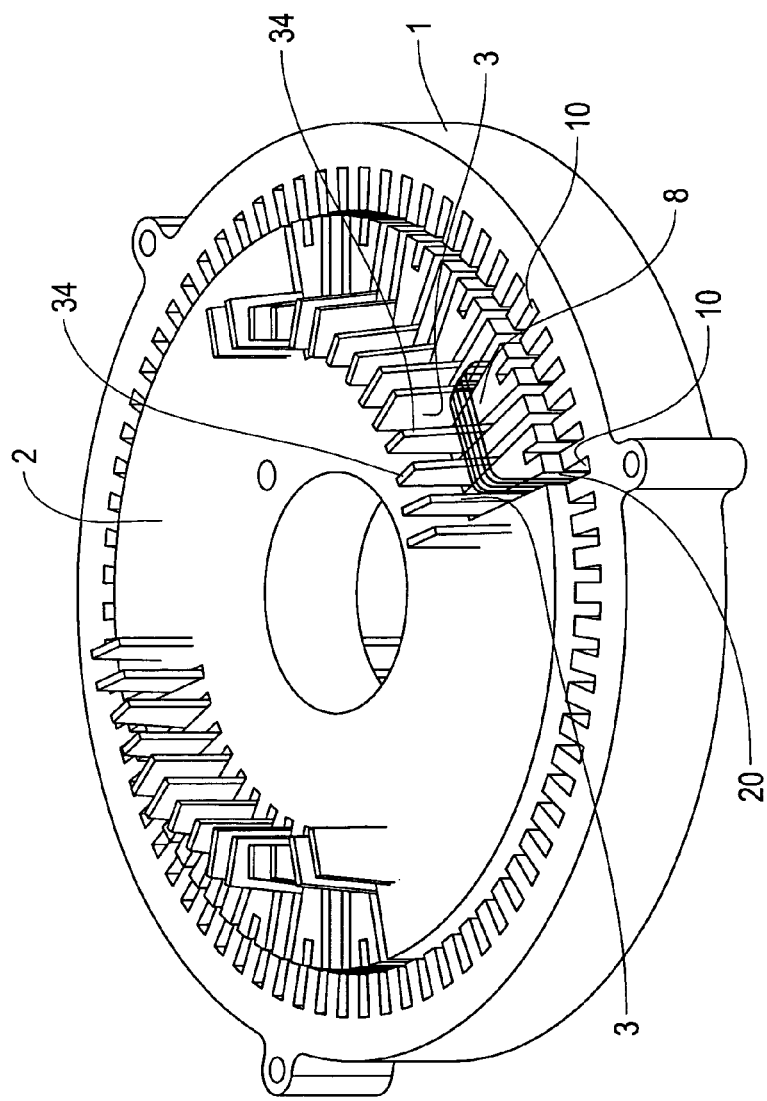
FIG. 9 is an explanatory view showing the state in which the magazine is arranged in a stator core and in which insertion blades and provisional shaping blades are inserted into grooves.
Figure 10:
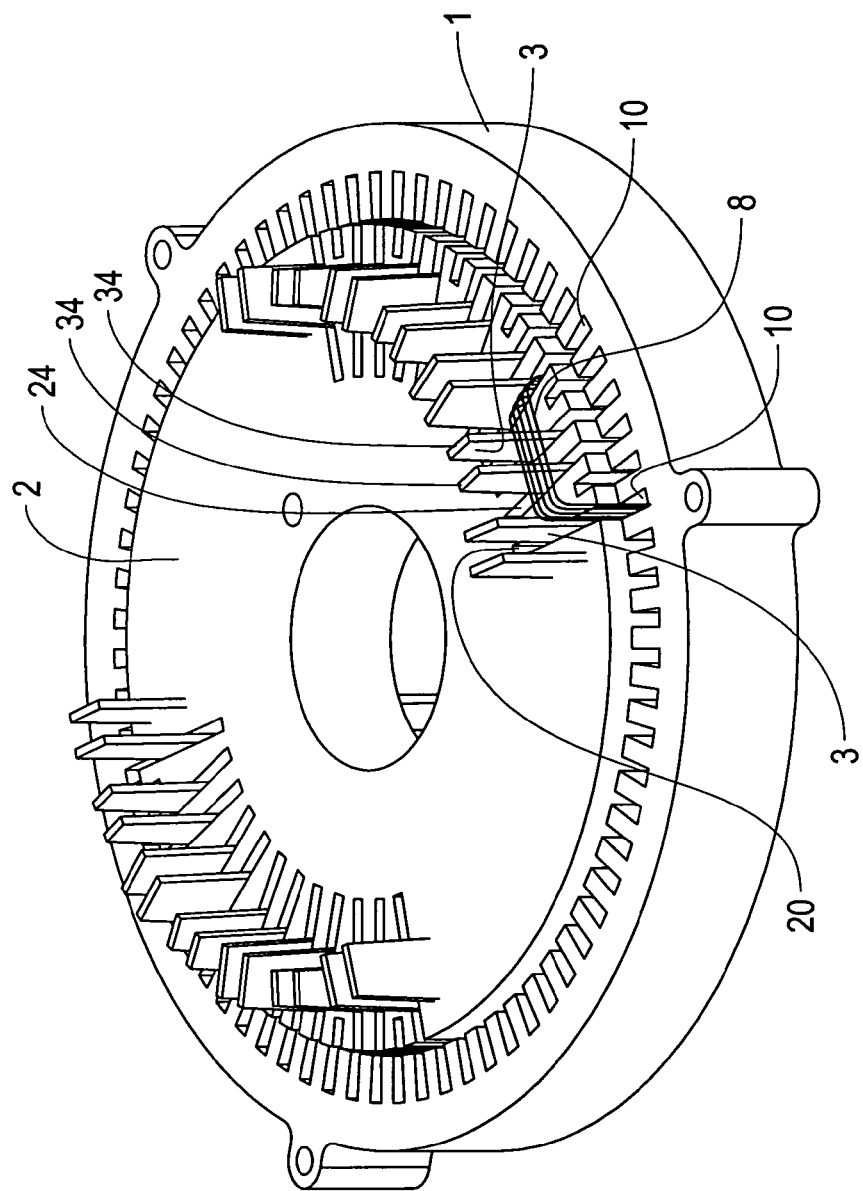
FIG. 10 is an explanatory view showing the state in which the insertion blades and the provisional shaping blades are moved.
Figure 11:
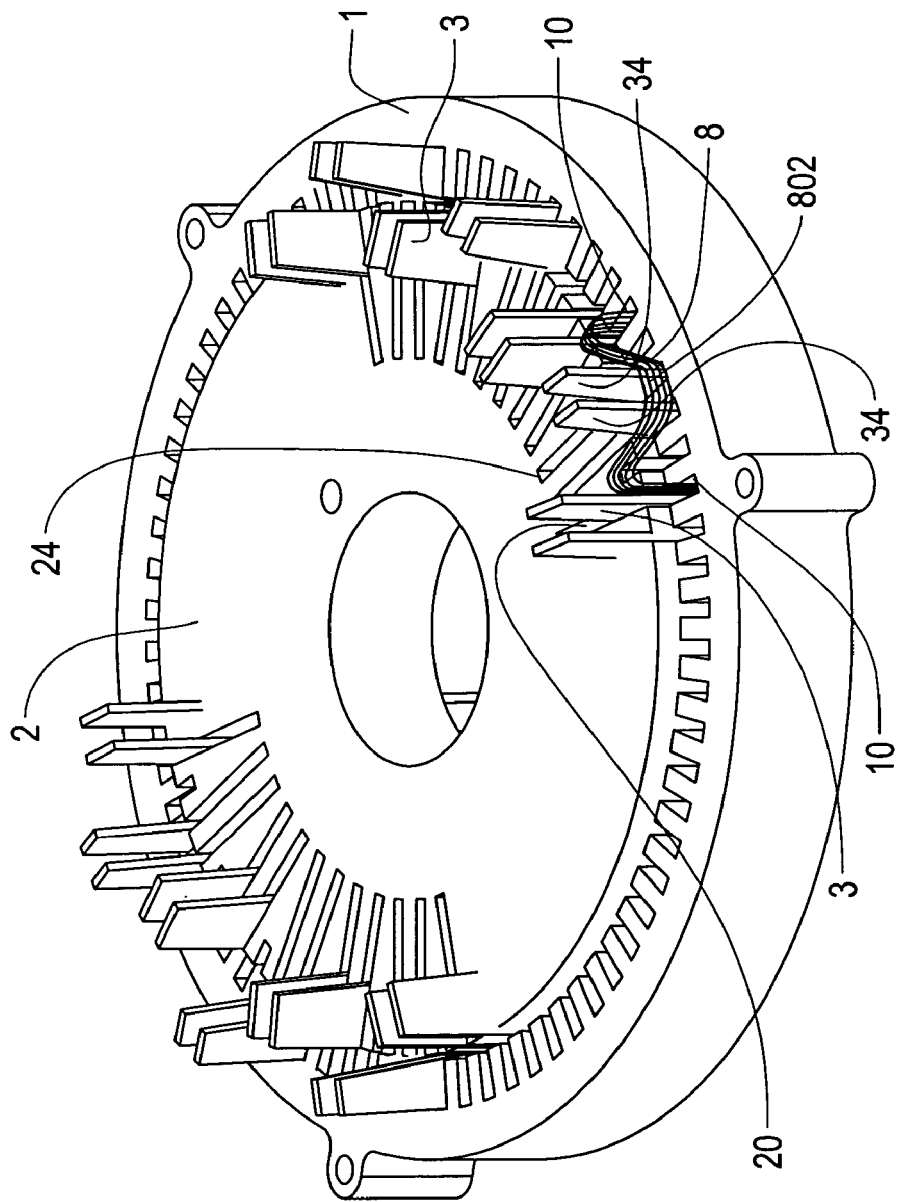
FIG. 11 is an explanatory view showing the state in which the insertion blades and the provisional shaping blades are completely moved.

At the coil inserting step, on the other hand, the single-pole coils 8 are individually arranged generally in parallel with the inner circumference openings of the slots 10 by the coil insertion portions 801 with the coil insertion portions 801 individually kept at an angle of inclination within 5 degrees with respect to the axial direction of the stator core 1, as shown in FIG. 9 to FIG. 11. With this arrangement, the single-pole coils 8 are simultaneously moved generally linearly toward the stator core 1 so that the coil insertion portions 801 of the single-pole coils 8 are simultaneously inserted into the slots 10. At this time, moreover, the adjoining single-pole coils 8 are moved such that the moving loci (e.g., a2 and b1, and b2 and c1 in FIG. 8) before their adjoining coil insertion portions 801 are inserted into the slots 10 may be in parallel with each other. Moreover, the two coil insertion portions 801 of each single-pole coil 8 start their movements simultaneously and take equal velocities.

At the coil inserting step of this embodiment, there is used a magazine 2, which has such a disc shape as can be arranged on the inner side of the inner circumference of the stator core 1 and which is provided in its outer circumference with a plurality of coil retaining grooves 20 for arranging the coil insertion portions 801 of the single-pole coils 8 at positions confronting the slots 10 of the stator core 1, as shown in FIG. 8. Of the coil retaining grooves 20, those (e.g., 20A2 and 20B1, and 20B2 and 20C1 in FIG. 8) for arranging the adjoining coil insertion portions 801 of the adjoining single-pole coils 8 are arranged in parallel with each other. The coils 8 (or the coil insertion portions 801) are inserted into and arranged in the coil retaining grooves 20, and the magazine 2 is arranged in the stator core 1 so that the coil retaining grooves 20 of the magazine 2 confront the slots 10 of the motor core 1.

Next, as shown in FIG. 9, insertion blades 3, as an example of a coil inserting means, are caused to abut against the coils 8 and are advanced from the center to the outer circumference of the magazine 2. The insertion blades 3 thus move the coils 8 from the coil retaining grooves 20 into the slots 10 of the stator core 1.

The more detailed description will be made in the following. The motor to be manufactured in the invention is a three-phase DC brushless motor. The stator core 1 of this embodiment is prepared by laminating ring-shaped electromagnetic steel sheets, and an inner circumference of the motor core 1 is provided with seventy two slots 10 in total, as shown in FIG. 9 to FIG. 12 and FIG. 16.

Here will be briefly described an example of the arrangement of the coils 8 in the individual slots 10 of the stator core 1. In this embodiment, for the stator core 1, thirty six single-pole coils 8 in total are divided into three groups of twelve single-pole coils 8 in total, as corresponding to one phase.

The individual slots 10 are serially numbered from first to seventy second. For the first group, one single-pole coil is inserted to form turns through the first slot and the sixth slot. Next to this, another single-pole coil is inserted to form turns through the seventh slot and the twelfth slot. Next to this, one single-pole coil is arranged for every six slots. As shown in FIG. 16, therefore, twelve single-pole coils 8 of the coil group belonging to the U-phase are first inserted into the inner circumference of the stator core 1 and are arranged in the adjoining state.

The single-pole coils 8 belonging to the second and third groups (i.e., the V-phase and W-phase) are arranged with shifts of two and four slots, respectively, in the circumferential direction from the arranged state of the first group. As shown in FIG. 16, therefore, all the single-pole coils 8 are mounted in the stator core 1 such that the coil end portions 802 of the single-pole coils 8 belonging to the U-phase are partially overlapped from the inner circumference side of the stator core 1 by the coil end portions 802 of the single-pole coils 8 belonging to the V-phase. Also, the coil end portions 802 of the single-pole coils 8 belonging to the V-phase are partially overlapped from the inner circumference side of the stator core 1 by the coil end portions 802 of the single-pole coils 8 belonging to the W-phase. As shown in FIG. 17, the coil end portions 802 of the individual phases are finally packed so compactly at a provisional shaping step and a proper shaping step to be described hereinafter that they are deformed outward from the slots 10.

In this embodiment, moreover, the magazine 2 is used to handle one group (of one phase), i.e., the twelve single-pole coils 8 at once so that the thirty six single-pole coils 8 in total are mounted in the stator core 1 by the works of three times.

As shown in FIG. 8, the magazine 2 includes: the paired left and right coil retaining grooves 20; a pair of shallowed left and right preparatory grooves 22 positioned between the coil retaining grooves 20; and a pair of left and right provisional shaping grooves 24 positioned between the preparatory grooves 22. If these six grooves are bundled into one group, moreover, twelve groups are disposed adjacent to each other over the outer circumference of the magazine 2.

Moreover, all the adjoining grooves are disposed to confront the slots 10 in the stator core 1 (although partially omitted from FIG. 8 to FIG. 12).

Moreover, all the individual preparatory grooves 22 are arranged along the radial directions and are oriented in radially different directions. On the other hand, the coil retaining grooves 20 are so arranged in parallel as to make one pair with the coil retaining grooves 20 arranged adjacent to each other for receiving the adjoining single-pole coils 8. Moreover, the paired provisional shaping grooves 24 are arranged in parallel to each other.

Before using the magazine 2 thus constructed, a winder step is performed for forming the coils. At this winder step, the single-pole coils 8 are formed three by three.

For this winder step, as shown in FIG. 1, there are used three juxtaposed winding frames 5 and a winding arm 59 for feeding a wire (or an electric line) 88 and winding it on the winding frames 5.

As shown in FIG. 1, each winding frame 5 is provided with four upper, lower, left and right pawl portions 51, and in its left and right side faces with cutouts 52 for allowing a later-described transfer device 6 to easily insert thereinto. Moreover, the pawl portions 51 are opened/closed leftward and rightward so that they are opened leftward and rightward to have a larger diameter when they wind the wire. Moreover, each winding frame 5 can be moved forward and backward as a whole and can turn leftward and rightward.

The winding arm 59 is constructed to feed the wire 88 while turning around the winding frames 5 in the advanced states. The turning direction is, moreover, constructed to be changeable.

At first, the winding frame 5 at the left end is advanced (although not shown), and the wire 88 is fed while the winding arm 59 is turned clockwise around the winding frame 5 at the left end. As a result, the first single-pole coil 8 is formed.

Next, the left side winding frame 5 is retracted, and the central winding frame 5 is advanced (although not shown). Then, the wire 88 is fed while the winding arm 59 is turned counter-clockwise around the central winding frame 5. As a result, the second single-pole coil 8 is formed.

Moreover, as shown in FIG. 1, the central winding frame 5 is retracted, and the right end winding frame 5 is advanced. Then, the wire 88 is fed while the winding arm 59 being turned again clockwise (in the direction of arrow A) around the right end winding frame 5. As a result, the third single-pole coil 8 is formed.

Next, the right end winding frame 5 is retracted so that the three winding frames 5 are arranged in a line, as shown in FIG. 2. Next, the left and right winding frames 5 are slightly turned outside, as shown in FIG. 3, so that the three single-pole coils 8 are tensed to adjust their shapes.

Next, in this embodiment, the three single-pole coils 8 thus formed around the three winding frames 5 are transferred from the winding frames 5 to the magazine 2 by the transfer device 6, as shown in FIG. 4 to FIG. 8.

As shown in FIG. 4 to FIG. 7, the transfer device 6 is provided with two base plates 61 and clamp plates 62 individually arranged outside of the base plates 61. These base plates 61 and clamp plates 62 can be turned or opened/closed in the horizontal directions.

Figure 4:
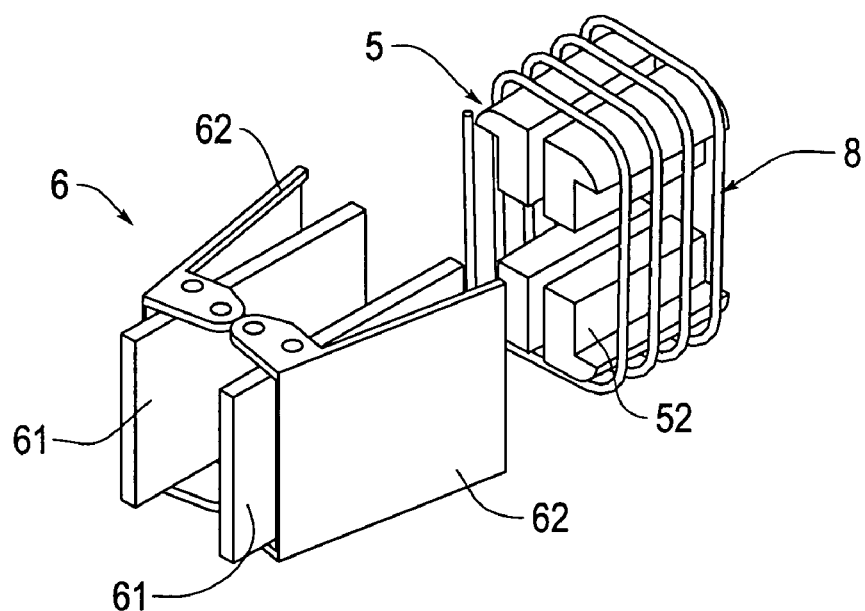
FIG. 4 is an explanatory view showing the state just before a transfer device is inserted into the coil on the winding frame.

When this transfer device 6 is used to perform the coil transferring actions actually, the pawl portions 51 of the winding frame 5 are closed at first to the left and right to reduce the external diameter of the winding frame 5, as shown in FIG. 4. As a result, a clearance is established between the winding frame 5 and the single-pole coil 8 formed around the winding frame 5.

Moreover, the transfer device 6 is positioned in parallel to adjust the clearance of the base plates 61 to the position of the clearance between the winding frame 5 and the single-pole coil 8. Moreover, the clamp plates 62 are opened to the left and right from the base plates 61.

Figure 5:
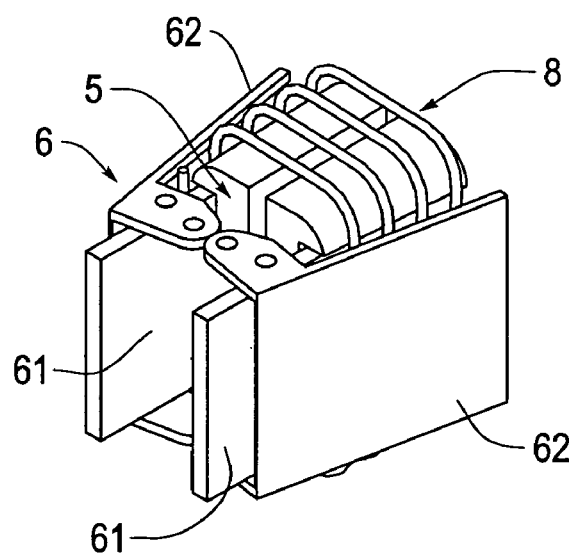
FIG. 5 is an explanatory view showing the state just after transfer device is inserted into the coil on the winding frame.
Figure 6:
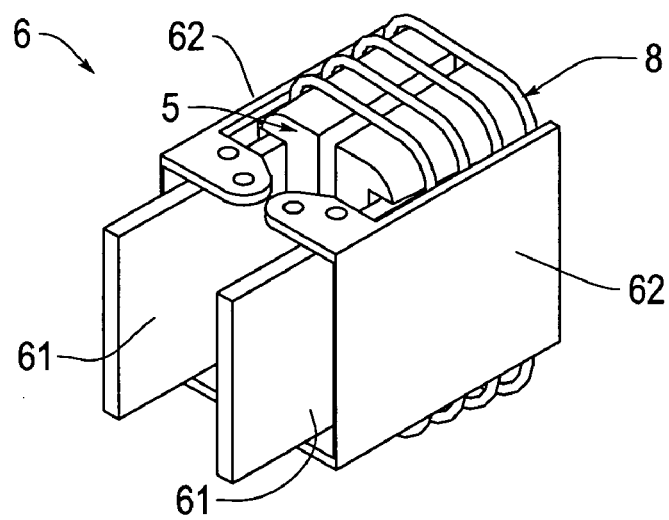
FIG. 6 is an explanatory view showing the state in which the transfer device is inserted into the coil on the winding frame and clamps the coil.
Figure 7:
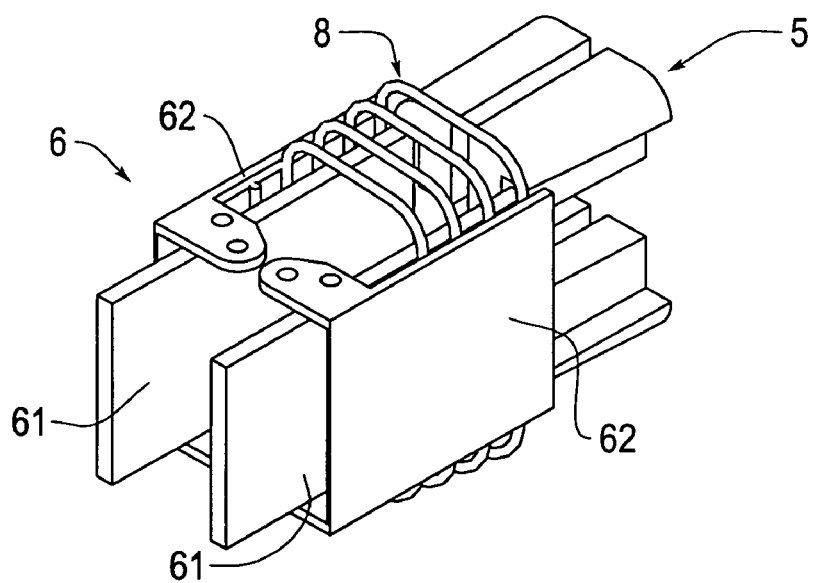
FIG. 7 is an explanatory view showing the state in which the coil on the winding frame is pulled out by the transfer device.

Next, the base plates 61 of the transfer device 6 are inserted into the clearances between the winding frame 5 and the single-pole coil 8, as shown in FIG. 5. As shown in FIG. 6, the clamp plates 62 are then closed to clamp the single-pole coil 8 between the clamp plates 62 and the base plates 61. As shown in FIG. 7, the transfer device 6 is retracted to complete the removal of the single-pole coil 8 from the winding frame 5.

Next, the transfer device 6 is so arranged that it confronts the outer circumference of the magazine 2, and that the outer side faces 610 of its base plates 61 are generally in parallel with the inner side faces of the coil retaining grooves 20, as shown in FIG. 8. And, the clamp plates 62 are slightly opened to make the single-pole coil 8 movable, and this single-pole coil 8 is pushed and transferred by the not-shown pusher into the coil retaining grooves 20 of the magazine 2. At this time, the single-pole coil 8 is not pushed deeply into the coil retaining grooves 20 but leaves such clearances between itself and the bottom portions 29 of the coil retaining grooves 20 so that the later-described insertion blades 3 may be inserted thereinto.

By performing these actions at once with the three transfer devices 6, the three single-pole coils 8 formed around the three winding frames 5 can be transferred at once to the magazine 2. Here, in case the individual single-pole coils 8 may be separated, one transfer device 6 can also be used to transfer the single-pole coils 8 one by one.

By repeating the forming and transferring works of the three coils with the winding frames 5 thus far described four times, moreover, the twelve single-pole coils 8 are arranged on the outer circumference of the magazine 2.

Here, the formation to the transfer of the coils to the magazine 2 can also be rationalized by increasing the facilities of the winding frames 5, the winding arms 59 and the transfer devices 6 to proceed in parallel.

Next, the coils are moved from the magazine 2 to the stator core 1. At first, the magazine 2 is so arranged in the stator core 1 that the coil retaining grooves 20 of the magazine 2 confront the slots 10 of the stator core 1, as shown in FIG. 9.

At this time, all the single-pole coils 8 on the magazine 2 are so arranged that their coil insertion portions 801 are generally in parallel with the corresponding slots 10. And, the angle made between the coil insertion portions 801 and the axial direction of the stator core 1 is kept within 5 degrees at this time.

Moreover, the insertion blades 3 are inserted into the clearances in the coil retaining grooves 20 of the magazine 2. On the other hand, provisional shaping blades 34 are inserted into the provisional shaping grooves 24 of the magazine 2.

As shown in FIG. 10 and FIG. 11, moreover, the insertion blades 3 are advanced in the coil retaining grooves 20 in the directions from the center to the outer circumference, and the provisional shaping blades 34 are advanced in the provisional shaping grooves 24 in the directions from the center to the outer circumference. As a result, the single-pole coils 8 are pushed by the insertion blades 3 so that they move from the coil retaining grooves 20 to the slots 10 of the stator core 1.

Moreover, the upper and lower coil end portions 802, as bulging out of the stator core 1, of the single-pole coils 8 are pushed and deformed outward by the provisional shaping blades 34 so that they are subjected to the provisional shaping treatment.

These advancing actions of the insertion blades 3 and the provisional shaping blades 34 are simultaneously performed for all the twelve single-pole coils 8 so that these twelve single-pole coils 8 of one group are simultaneously inserted into the slots 10 of the stator core 1.

At this time, the angle made between the individual coil insertion portions 801 and the stator core 1 is kept within 5 degrees even during the movements. Therefore, all the single-pole coils 8 are simultaneously moved generally linearly toward the stator core 1 so that the coil insertion portions 801 of all the single-pole coils 8 are simultaneously inserted into the slots 10.

Of the coil retaining grooves 20 (e.g., 20A1-20C2) of the magazine 2 thus far described, moreover, there are arranged in parallel the coil retaining grooves (e.g., 20A2 and 20B1, and 20B2 and 20C1 in FIG. 8) for arranging the adjoining coil insertion portions 801 in the adjoining single-pole coils 8. Therefore, the coil insertion portions 801 of each single-pole coil 8 move such that their moving loci (e.g., a2 and b1, and b2 and c1 in FIG. 8) before they are inserted into the slots 10 are parallel.

Moreover, the insertion blades 3 for pushing the coil insertion portions are completely synchronized from the start to the stop of their movement so that the two coil insertion portions 801 owned by each single-pole coil 8 start their movements simultaneously and move at the equal velocities.

Next, in this embodiment a second provisional shaping step is performed by using a pair of upper and lower formers 66, which are also used in the proper shaping step.

Figure 12:
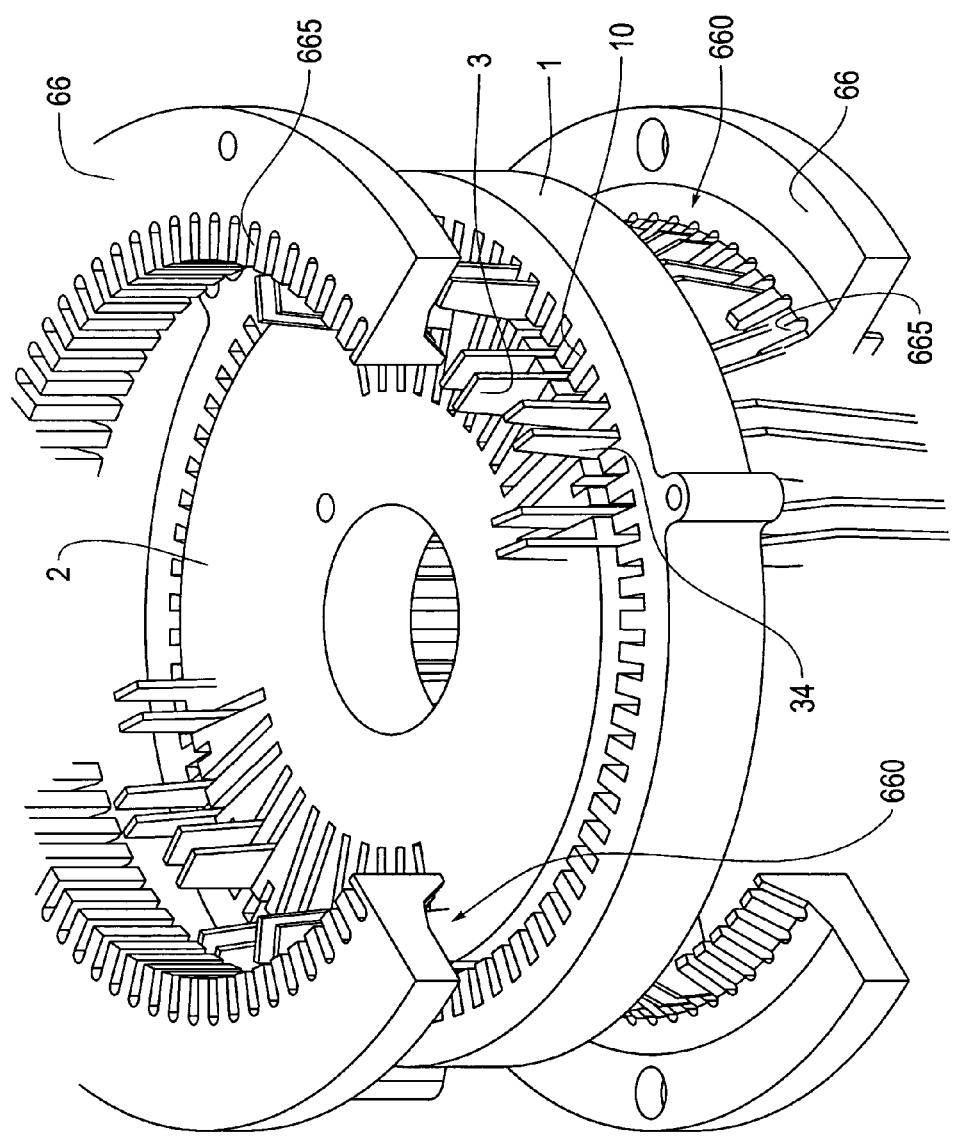
FIG. 12 is an explanatory view showing the state in which upper and lower formers are being advanced toward the stator core.

As shown in FIG. 12, the formers 66 have ring shapes, as shown in FIG. 12, and are provided, on their sides confronting the stator core 1, with shaping faces 660 for profiling the coils into a desired shape. Specifically, the upper and lower individual formers 66 have the tapered shaping faces 660, the inner circumference portions of which protrude toward the stator core 1. And, the formers 66 are constructed such that the coils 8 are shaped outward along the tapered shapes of the shaping faces 660 by advancing the formers 66 to the stator core 1.

Moreover, each former 66 is provided with cutouts 665 for preventing the insertion blades 3 and the provisional shaping blades 34 from interfering each other. And, the formers 66 can be pushed onto the stator core 1 while the insertion blades 3 and the provisional shaping blades 34 are advanced.

The paired upper and lower formers 66 thus constructed are individually advanced from their upper and lower positions and pushed onto the stator core 1. As a result, the second provisional shaping is performed such that the coil end portions 802, as bulging out from above and below the stator core 1, of the twelve single-pole coils 8 thus arranged in the stator core 1 fall down toward the stator core 1.

Next, the coil forming works using the winding frames 5 and the winding arm 59 and the coil transferring works using the transfer device 6 are performed to insert and arrange the twelve single-pole coils 8 of the second group in the magazine 2.

Like before, moreover, the magazine 2 is so arranged inside of the stator core 1 that the coil retaining grooves 20 of the magazine 2 confront the slots 10 of the stator core 1.

At this time, the magazine 2 and the stator core 1 are arranged at such circumferentially shifted positions that the coils of the first phase of the first group and the coils of the second group are shifted. Next, there are performed the movements of the coils 8 using the insertion blades 3 and the provisional shaping using the provisional shaping blades 34. Still moreover, the second provisional shaping is performed by using the paired upper and lower formers 66 like the above.

Next, the twelve single-pole coils 8 of the third group are worked as in the cases of the first and second groups. At the moving time of the coils from the magazine 2 to the stator core 1, however, the relative positions of the magazine 2 and the stator core 1 are so circumferentially shifted that the third group (or the third phase) may be shifted with respect to the first group (or the first phase) and the second group (or the second phase).

On the other hand, the second provisional shaping of the third group is resultantly the proper shaping step. In other words, at the stage where the coils of the third group are inserted into the stator core 1, all of the thirty six single-pole coils 8 are mounted in the stator core 1. Moreover, the provisional shaping by the provisional shaping blades 34 is directly performed exclusively on the twelve single-pole coils 8 of the third group. On the other hand, the shaping to be performed as the second provisional shaping by the formers 66 is performed on all the thirty six single-pole coils 8 so that it becomes the proper shaping step for profiling the entire coil shape. Thus, the thirty six single-pole coils 8 in total are inserted and arranged in the stator core 1, and the proper shaping is in the completed state.

Here in this embodiment, a series of works are performed from the formation of the twelve single-pole coils of the individual groups to the second provisional shaping. By using three sets of magazines 2, however, the works could naturally be done in parallel with three sets from the coil shaping to the insertion and arrangement of the coils in the magazine 2 so that they might be rationalized.

Figure 13:
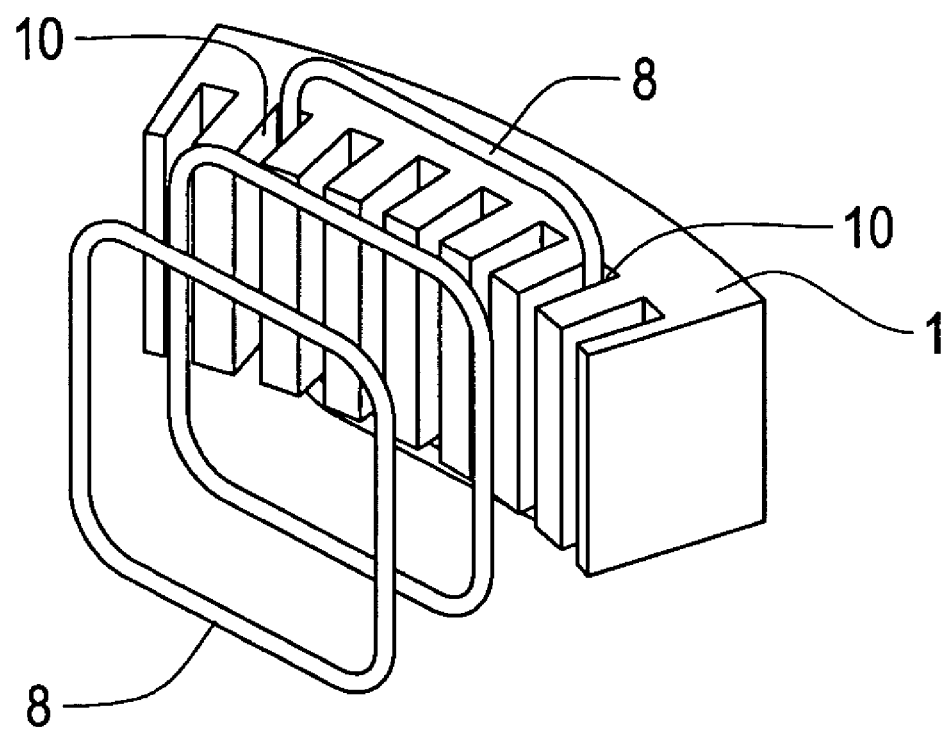
FIG. 13 is an explanatory view showing the state in which the locus of the coil when the coil is inserted into the stator core is perspectively taken.
Figure 14:
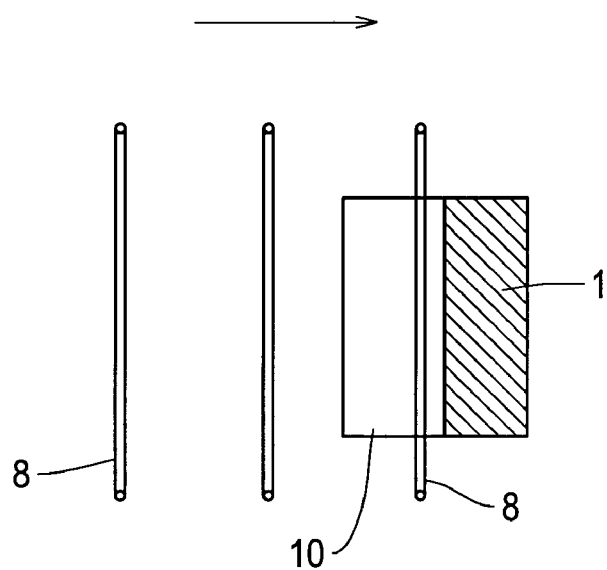
FIG. 14 is an explanatory view showing the state in which the locus of the coil when the coil is inserted into the stator core is taken from the side.
Figure 68:
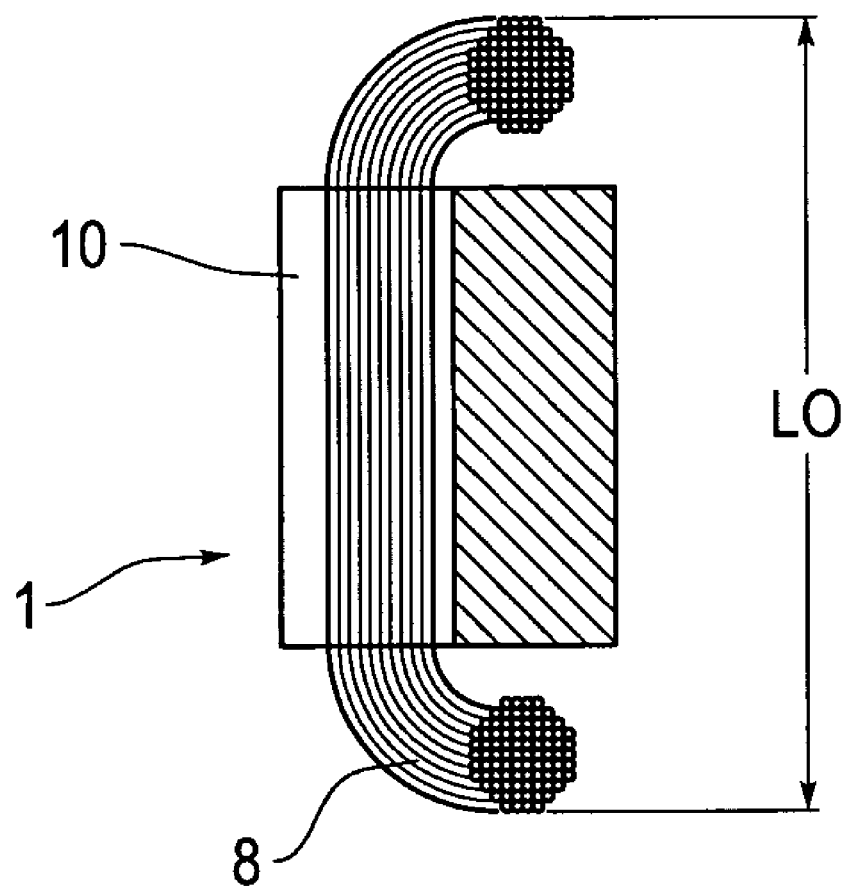
FIG. 68 is an explanatory view of the related art example showing the size of the coil inserted into the stator core.

By making use of the magazine 2 and the insertion blades 3, as described hereinbefore, this embodiment can execute the so-called "linear insertion method" easily and stably. As shown in FIG. 13 and FIG. 14, more specifically, the coils 8 can be linearly inserted without changing their postures into the slots 10. Therefore, it is not necessary to enlarge the vertical length of the coils 8 more than necessary. As shown in FIG. 15, more specifically, the vertical size L1 of the coils 8 inserted into the stator core 1 can be made sufficiently shorter than the vertical size L0 of the prior art, as shown in FIG. 68.

Therefore, it is possible to prevent the coils 8 from excessively bulging out of the stator core 1 and to reduce the axial length of the parts constructed by mounting the coils 8 in the stator core 1 and accordingly the axial length of the entire motor.

In this embodiment, moreover, the moving loci of the adjoining coil insertion portions 801 of the adjoining single-pole coils 8 are parallel, as described hereinbefore. Even when the stator core 1 has a small diameter or uses many turns (or windings) of single-pole coils 8, these single-pole coils 8 can be easily arranged on the inner circumference side of the stator core 1, thereby to add an effect that the coil inserting step can be easily performed.

Noting the movements of the individual single-pole coils 8 one by one, moreover, the two coil insertion portions 801 owned by each single-pole coil 8 start their movements simultaneously and move at the equal velocities. As a result, each single-pole coil can move while keeping its coil insertion portions at the minimum distance at all times. From this point, it is unnecessary to add excessive length to the coil end portions.

Noting all the single-pole coils 8 of one phase, moreover, all the coil insertion portions 801 start their movements simultaneously and move at the equal velocities. As a result, the length of the crossover lines and the coil length can be minimized, and the movements of the coil insertion portions 801 are well balanced. Therefore, the coils are not disturbed in their arrayed state and the electric lines (or the wires) constructing the coils are hardly damaged.

Especially in this embodiment, moreover, the provisional shaping grooves 24 are formed in the magazine 2 so that the provisional shaping is performed by the movements of the provisional shaping blades 34. As a result, the provisional shaping can be easily performed to push and deform the coil end portions 802 of the coil outward, each time each single-pole coil 8 is mounted in the stator core 1. Moreover, these works can be done simultaneously with the transfer of the coils, thereby to simplify the device and the step.

In this embodiment, moreover, the formers 66 are used and pushed onto the stator core 1 to perform the second provisional shaping and the proper shaping of the coils 2. As a result, all the provisionally shaped coils can be shaped all at once into a desired shape merely by pushing the formers 66 onto the stator core 1. By the second provisional shaping and the proper shaping, moreover, the coil end portions bulging from the stator core 1 can be shaped to approach the stator core 1 so that the aforementioned axial size can be made smaller.

Moreover, the formers 66 are provided with the aforementioned cutouts so that they can be pushed onto the stator core 1 while the insertion blades 3 and the provisional shaping blades 34 are advanced. Therefore, the second provisional shaping and the proper shaping by the formers 66 can be executed consecutively during the insertion and provisional shaping of the coils 8 into the stator core 1, as described hereinbefore, so that the manufacturing process can be rationalized.

Here in this embodiment, the insertion blades 3 are used as an example of a coil inserting means, and the provisional shaping blades 34 are used as an example of a provisional shaping means. However, these blades could be replaced by the split insertion blades or the split insertion hooks and the split provisional shaping blades or the split provisional shaping hooks, which are split on the surface side face and the back side face of the magazine 2. In this modification, moreover, the split insertion blades or the split insertion hooks and the split, provisional shaping blades or the split provisional shaping hooks could be integrated on the surface side face and the back side face of the magazine 2, thereby to simplify the device.

Moreover, this embodiment has exemplified the three-phase DC brushless motor, but process thus far described could be applied to a motor of another structure.

Figure 18:
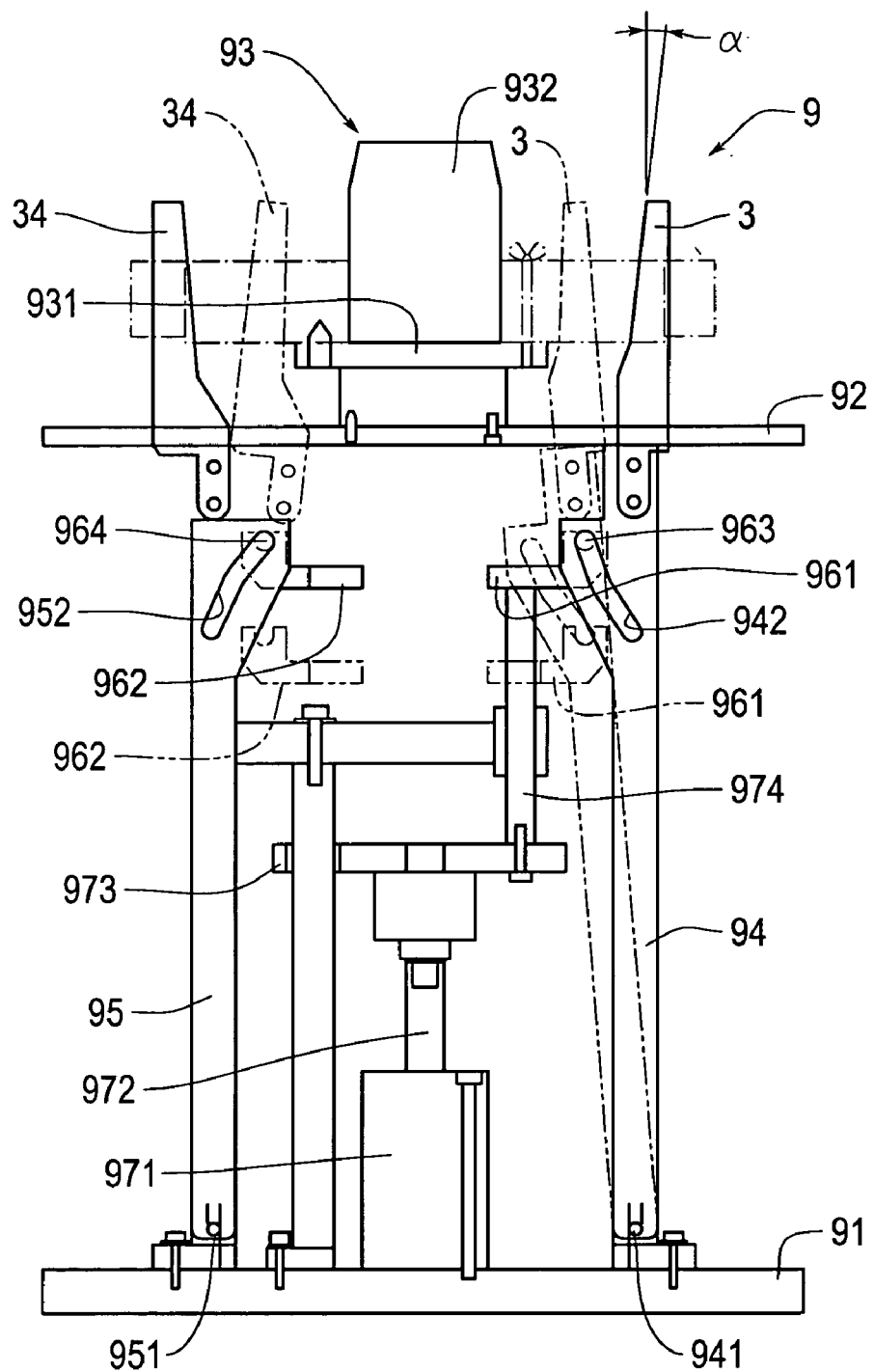
FIG. 18 is an explanatory view showing a construction of a coil inserting apparatus.

In a second embodiment of the invention, a coil inserting apparatus for inserting the coils from the magazine 2 of Embodiment 1 into the stator 1 is shown in more detail in FIG. 18 and FIG. 19.

The coil inserting apparatus 9 of this embodiment is, as shown FIG. 18, provided with an upper plate portion 92, which is fixed through the not-shown posts extended from a bottom plate portion 91, and a magazine receiving rest 93 disposed above the upper plate portion 92 for placing the magazine 2 thereon.

The magazine receiving rest 93 is composed of a flange portion 931, and a central mandrel 932 having a column shape with a smaller diameter than that of the flange portion 931.

Moreover, the bottom plate portion 91 is provided with a plurality of first arms 94 arranged to rock on fulcrums 941, and a plurality of second arms 95 arranged to rock on fulcrums 951. As shown in the same Figure, the first arms 94 are provided with the insertion blades 3 at their upper ends, and the second arms 95 are provided with the provisional shaping blades 34 at their upper ends.

The first arm 94 is provided with a slot 942, which can engage with a pin 963 formed on a lifting plate 961. As shown in FIG. 18, on the other hand, the second arm 95 is provided with a slot 952, which can engage with a pin 964 formed on a second lifting plate 962.

Moreover, the lifting plate 961 is connected to a cylinder 971, a lifting rod 972, a base plate 973, a connecting rod 974 and so on, which are arranged above the bottom plate portion 91, so that it is moved up and down as the lifting rod 972 is driven upward and downward by the cylinder 971.

Moreover, the slots 942 and 952 formed in the first arm 94 and the second arm 95 have sloped slot portions. As the engaging positions between the pins 963 and 964 and the slots 942 and 952 are shifted by the vertical movements of the pins 963 and 964, moreover, the first arm 94 and the second arm 95 rock on the fulcrums 941 and 951. Here, the shapes of the slot 942 of the first arm 94 and the slot 952 of the second arm 95 are slightly changed to give different rocking strokes to the first arm 94 and the second arm 95.

As shown in FIG. 19, moreover, each first arm 94 is arranged with the two insertion blades 3 in parallel so that these two insertion blades 3 are moved together in parallel in the rocking direction of the first arm 94. Here, the rocking directions of all the first arms 94 are taken along a radial direction A through the center of teeth 15 positioned between the two slots 10 of the stator 1.

Moreover, each second arm 95 is likewise arranged with the two provisional shaping blades 34 in parallel so that these two provisional shaping blades 34 are moved together in parallel in the rocking direction of the second arm 95. Here, the rocking directions of all the second arms 95 are taken along a radial direction B through the center of the teeth 15 positioned between the two slots 10 of the stator 1.

What should be noted on this coil inserting apparatus 9 is that the angle of inclination α of the insertion blades 3 at the rocking motion starting position of the insertion blades 3 with respect to the vertical direction is set within 5 degrees, and that the angle of inclination at the rocking motion ending position with respect to the vertical direction is set at 0 degrees, as shown in FIG. 18.

When the coils are to be transferred from the magazine 2 to the stator 1 by using the coil inserting apparatus 9, therefore, all the single-pole coils 8 can be simultaneously moved generally linearly toward the stator core 1 while the angle made between the coil insertion portions 801 to abut against the insertion blades 3 and the slots 10 of the stator 1 being always kept within 5 degrees.

As described hereinbefore, moreover, the two adjoining insertion blades 3 are arranged in parallel and push the adjoining coil insertion portions 801 of the adjoining single-pole coils 8. As a result, the adjoining coil insertion portions 801 can be pushed by the insertion blades 3 to move in parallel in the two coil retaining grooves 20 arranged in parallel, as described hereinbefore, and the pushing points are always kept in parallel. And, the adjoining coil insertion portions 801 of the adjoining single-pole coils 8 can be moved remarkably easily in parallel with each other until they reach the slots 10, thereby to make their moving loci parallel.

In a third embodiment of the invention, another example of the aforementioned insertion blades is shown in FIGS. 20A and 20B. As shown in FIGS. 20A and 20B, specifically, an insertion blade 302 of this embodiment is formed into a generally L-shape, which is composed of a horizontally extending base portion 303 and a vertically extending vertical blade portion 304. Moreover, this vertical blade portion 304 has an abutment face 305 formed as a vertical face. And, the insertion blade 302 is constructed such that the vertical blade portion 304 is moved back and forth by moving the base portion 303 horizontally with its abutment portion 305 being kept vertical.

By using this insertion blade 302, the angle made between the coil insertion portion 801 and the axial direction of the slot core 1 can be kept substantially at 0, as shown in FIG. 20A, not only at the time of abutting against the coil insertion portion 801 but also at the instant when the insertion of the stator core 1 into the slots 10 is completed.

As shown in FIGS. 21A-22C, this fourth embodiment of the invention uses a pair of upper and lower split insertion blades 320 and 330 as the insertion blades.

Specifically, the split insertion blades 320 and 330 of this embodiment are a pair of upper and lower strip shapes, as shown in FIGS. 21A-22C, and have such tapered portions 325 and 335 on one-side faces of their leading end sides as are arranged to have their leading ends in a confronting relation.

Figure 21A:
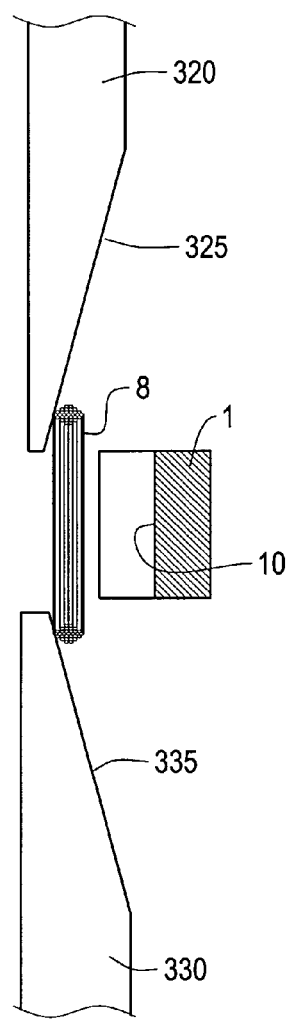
FIGS. 21A-21C are explanatory views showing the shape and motion of the insertion blades from the side.
Figure 21B:
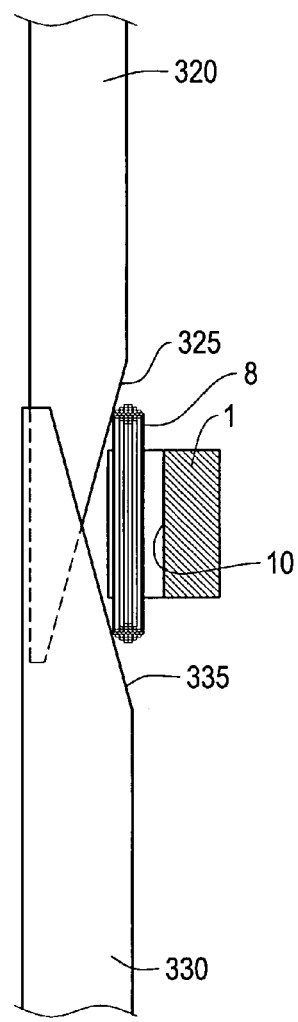
Figure 21C:
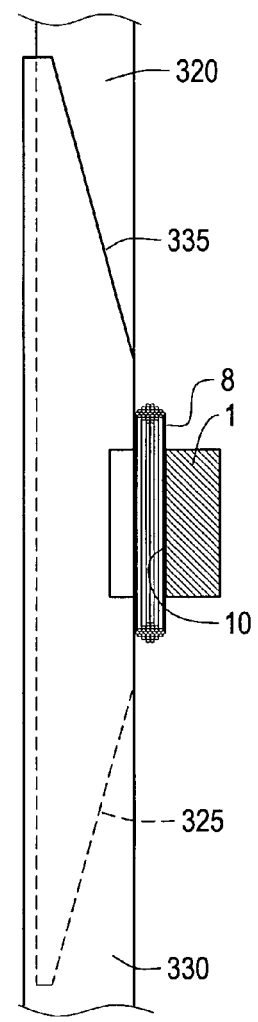
Figure 22C:
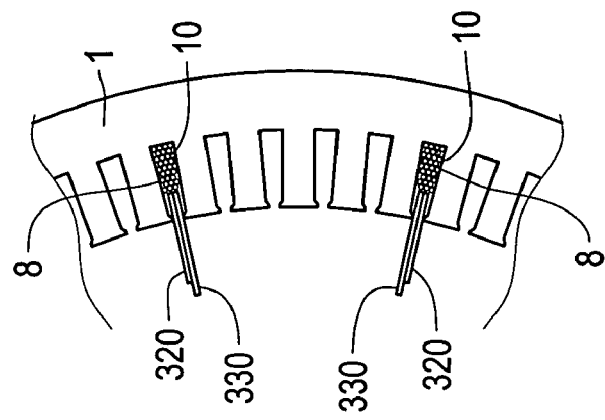
FIGS. 22A-22C are explanatory views showing the shape and motion of the insertion blades from above.
Figure 22B:
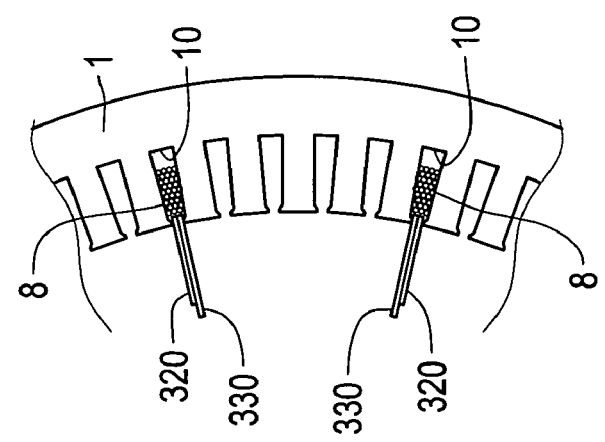
Figure 22A:
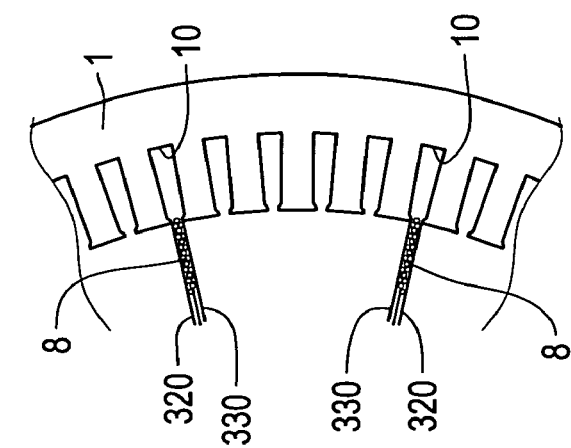

Next, the actions of the split insertion blades 320 and 330 of the case in which the single-pole coils 8 are moved will be briefly described with reference to FIGS. 21A-22C. FIGS. 21A-21C present views, in which the motions of the split insertion blades 320 and 330 and the single-pole coils 8 are taken in the radial direction of the stator core 1. FIGS. 22A-22C present explanatory views, which correspond to the individual actions of FIG. 21 and in which the width sizes of the portions, as contacting with the coils 8, of the split insertion blades 320 and 330, are taken and shown in the axial direction of the stator core 1.

As FIG. 21 and FIG. 22 proceed from (a) to (c), the split insertion blades 320 and 330 approach and overlap each other. The width sizes of the abutting portions against the single-pole coils 8 grow gradually larger along the tapered portions 325 and 335 so that the single-pole coils 8 are gradually pushed into the slots 10 of the stator core 1.

Here, the insertion pressure to be applied to the single-pole coil 8 is applied to the four portions which are generally symmetric with respect to the winding center point of the single-pole coil 8, as will be shown in FIG. 29 described herein after. As a result, the single-pole coil 8 can be moved linearly from the state, in which it is arranged generally in parallel with the slot 10, while substantially maintaining the posture of the singer-pole coil 8.

Figure 23:
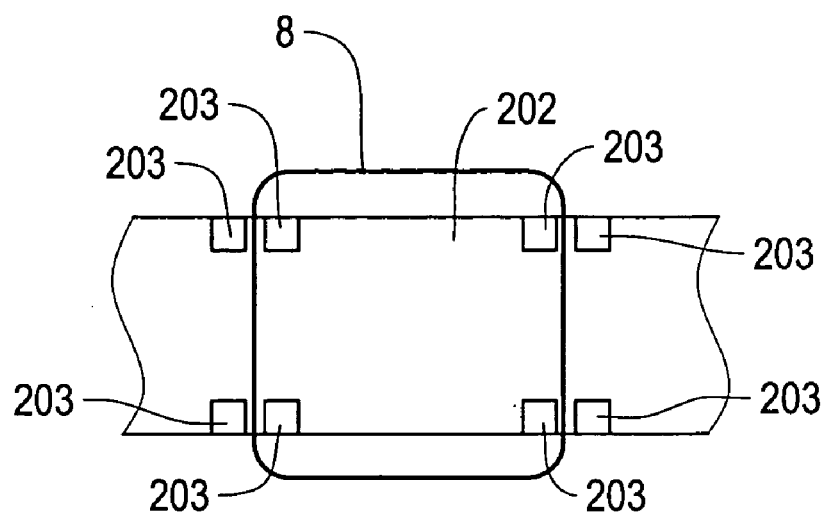
FIG. 23 is an explanatory view showing the structure of a magazine from the front.
Figure 24:
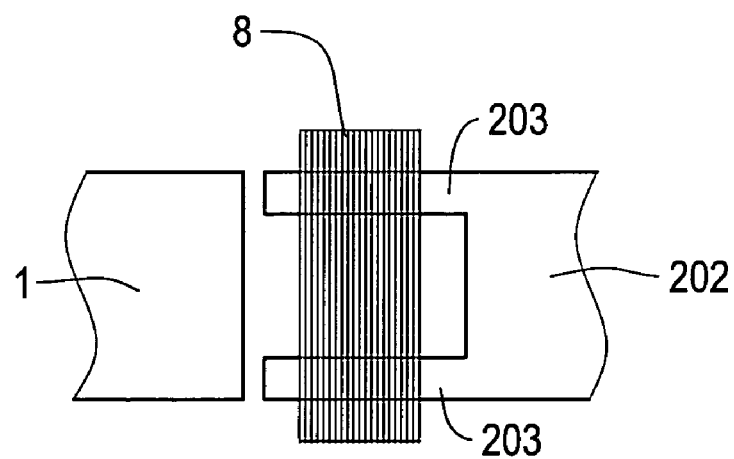
FIG. 24 is an explanatory view showing the structure of the magazine from the side.
Figure 25:
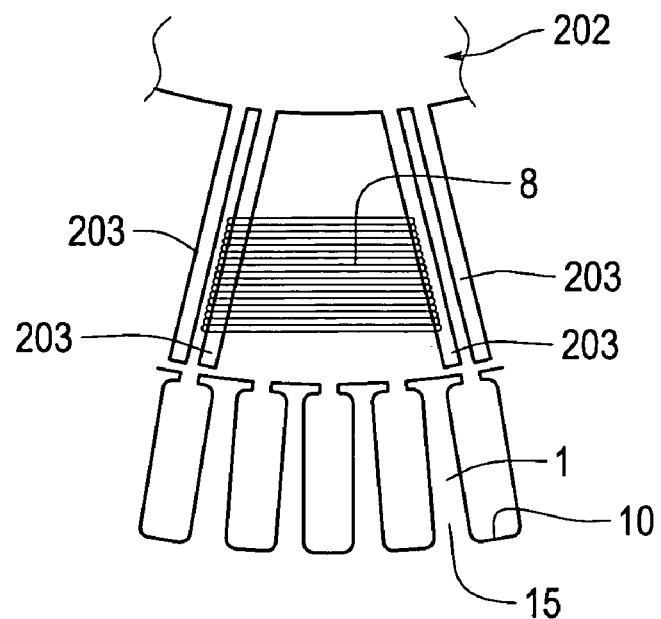
FIG. 25 is an explanatory view showing the structure of the magazine from the upper face.

As shown in FIG. 23 to FIG. 25, this fifth embodiment of the invention adopts a magazine 202 having a structure different from that of the first Embodiment.

The magazine 202 of this embodiment has supporting rod portions 203 for forming coil retaining grooves to retain the single-pole coils 8. In this case, too, the coil inserting step can be executed as in the first Embodiment by retaining the single-pole coils 8 in the manner shown in FIG. 23 and FIG. 24.

Figure 26:
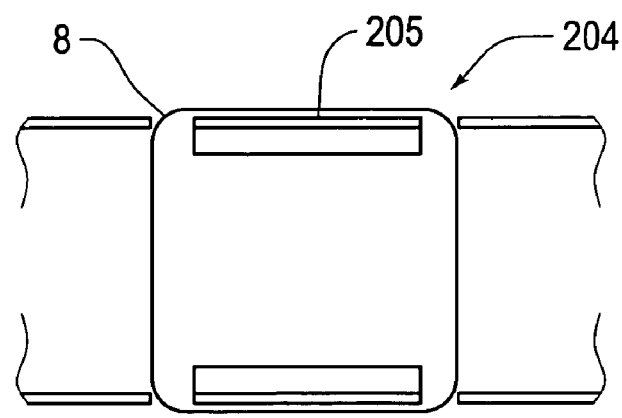
FIG. 26 is an explanatory view showing the structure of a magazine from the front.
Figure 27:
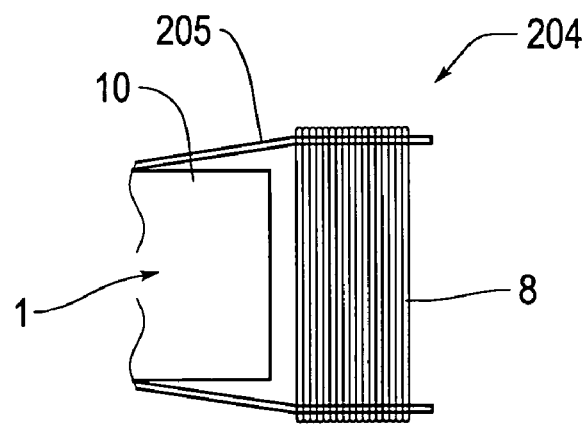
FIG. 27 is an explanatory view showing the structure of the magazine from the side.
Figure 28:
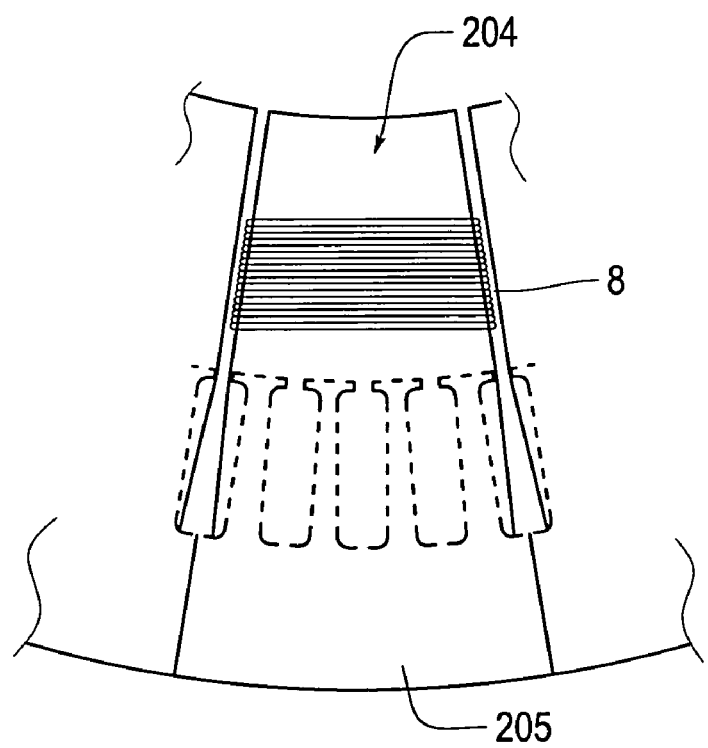
FIG. 28 is an explanatory view showing the structure of the magazine from the upper face.

As shown in FIG. 26 to FIG. 28, too, this sixth embodiment of the invention adopts a magazine 204 having a construction different from that of the magazine of the first embodiment.

The magazine 204 of this embodiment is provided with a pair of upper and lower magazine plates 205 for every one pole, which extend from the radially outer side to the inner circumference side.

In this case, as shown in FIG. 26 to FIG. 28, the single-pole coils 8 of one pole are retained by the magazine plates 205 of the magazine 204 and are mounted up and down in the axial direction of the stator core 1. The single-pole coils 8 are pushed and moved in the slots 10 by the insertion blades or the like. After this, the coil inserting step can be executed by the actions to extract the magazine plates 205 retaining the individual single-pole coils 8, either one by one or simultaneously together to the radially outer side.

As shown in FIG. 29 to FIG. 34, this seventh embodiment of the invention presents an example of the position, at which the insertion pressure is applied to the single-pole coil 8 at the coil inserting step.

Figure 29:
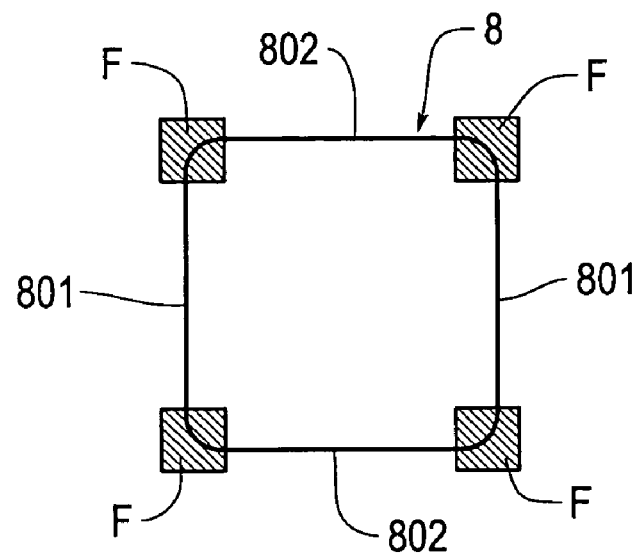
FIG. 29 is an explanatory view showing an example of the applied positions of an insertion pressure to be applied to the single-pole coil.

FIG. 29 shows an example, in which the insertion pressure is applied to a plurality of positions substantially symmetric with respect to the winding center point of the single-pole coil 8. That is, the pushed regions F of four corners at the boundary portions between the coil insertion portions 801 and the coil end portion 802 of the single-pole coil 8.

Figure 30:
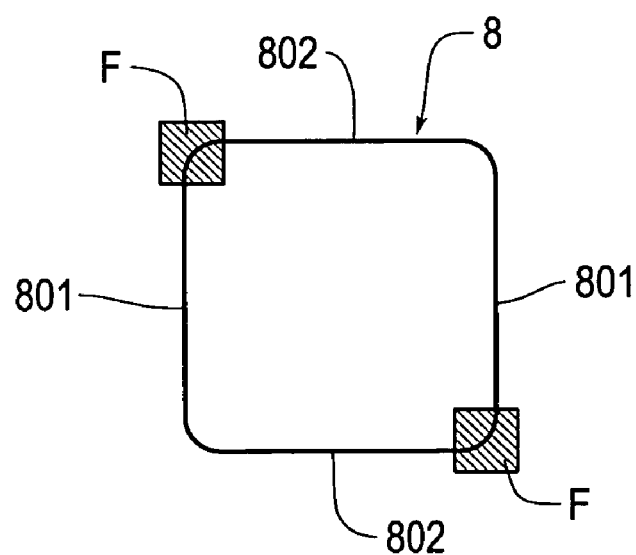
FIG. 30 is an explanatory view showing an example of the applied positions of the insertion pressure to be applied to the single-pole coil.

FIG. 30 shows an example, in which the insertion pressure is applied to a plurality of positions substantially symmetric with respect to the winding center point of the single-pole coil 8. That is, pushed regions F of two diagonal ones of the four corners at the boundary portions between the coil insertion portions 801 and the coil end portion 802 of the single-pole coil 8.

Figure 31:
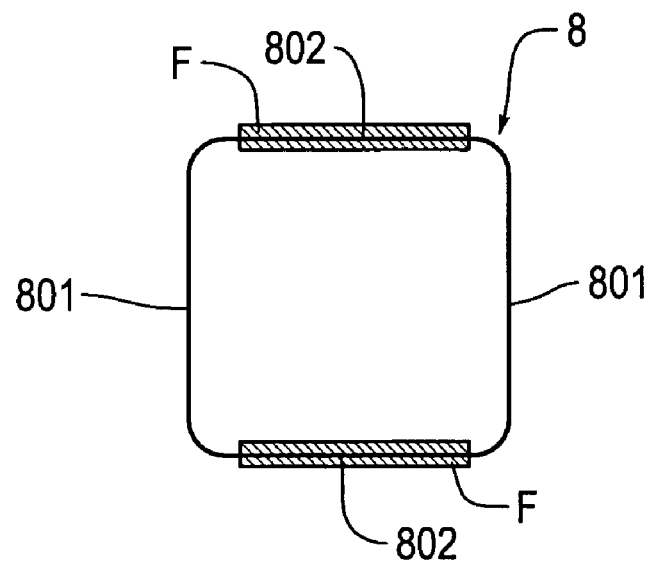
FIG. 31 is an explanatory view showing an example of the applied positions of the insertion pressure to be applied to the single-pole coil.
Figure 34:
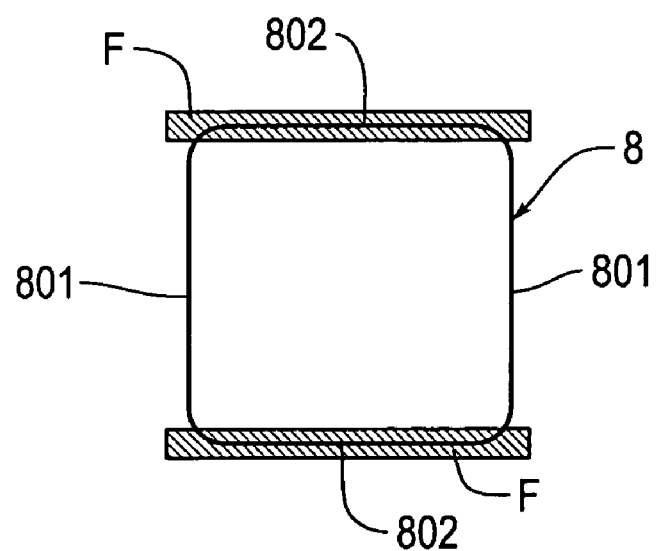
FIG. 34 is an explanatory view showing an example of the applied positions of the insertion pressure to be applied to the single-pole coil.

FIG. 31 and FIG. 34 show an example, in which the insertion pressure is applied to the pushed regions F of the two coil end portions 802 of the single-pole coil 8, individually.

Figure 32:
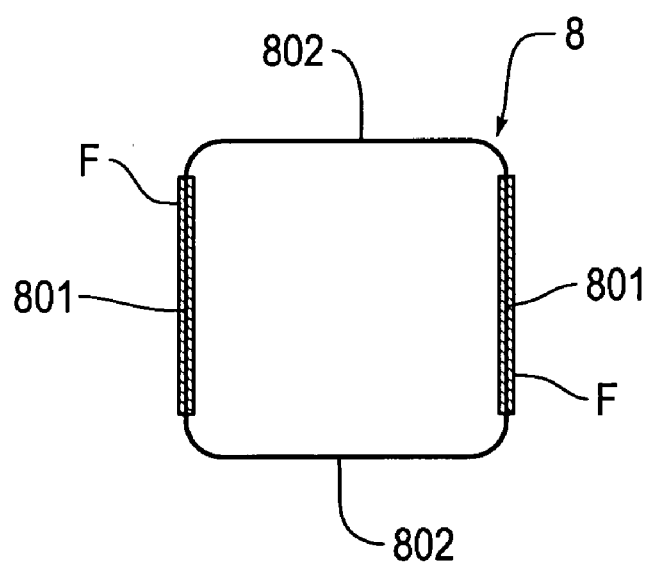
FIG. 32 is an explanatory view showing an example of the applied positions of the insertion pressure to be applied to the single-pole coil.
Figure 33:
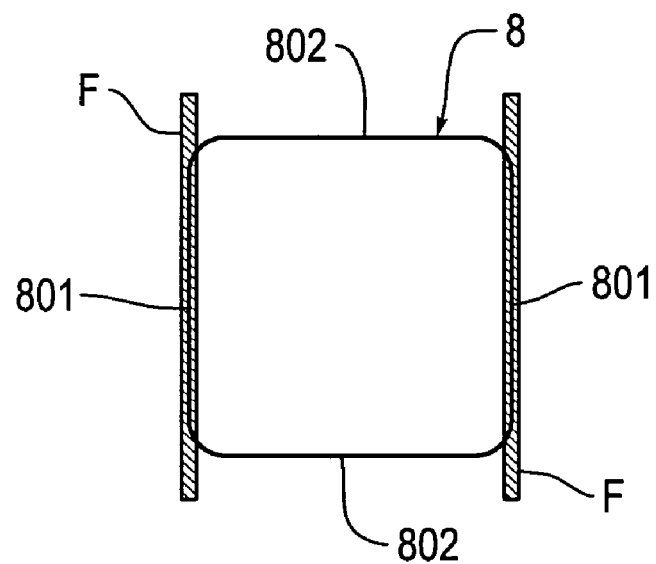
FIG. 33 is an explanatory view showing an example of the applied positions of the insertion pressure to be applied to the single-pole coil.

FIG. 32 and FIG. 33 show an example, in which the insertion pressure is applied to the pushed regions F of the two coil insertion portions 801 of the single-pole coil 8, individually.

According to any of these examples, the single-pole coil 8 can be linearly moved while the angle made between the coil insertion portions 801 of the single-pole coil 8 and the slots 10 is kept within 5 degrees. Here, FIG. 29 to FIG. 34 just present the examples, and it is quite natural that the pushed regions F or the applied positions of the insertion pressure could be further modified.

Figure 35:
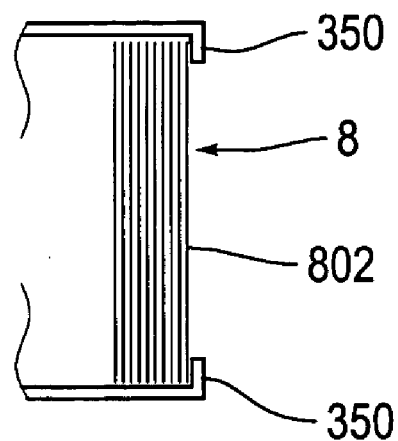
FIG. 35 is an explanatory view showing a structure of split insertion hooks.
Figure 36:
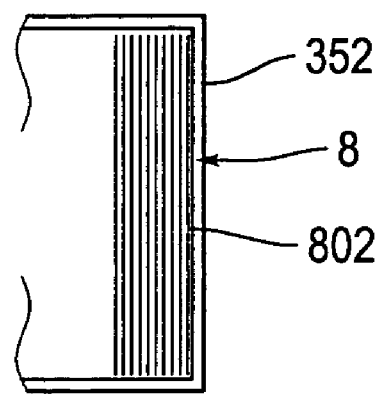
FIG. 36 is an explanatory view showing another example of the structure of the split insertion hooks.

As shown in FIG. 35 and FIG. 36, this eighth embodiment of the invention presents an example, in which split insertion hooks can be used as an example of a coil inserting means in place of the insertion blades 3 of the first embodiment.

FIG. 35 shows one of a pair of split insertion hooks 350, which are split into the surface side and the back side of the magazine. These split insertion hooks 350 have an L-shaped section to be hooked on the two end portions of the coil end portion 801 so that they apply the insertion pressure to the pushed regions F of the four corners, as shown in FIG. 29.

FIG. 36 shows one of a pair of split insertion hooks 352, which are split into the surface side and the back side of the magazine. These split insertion hooks 352 have a C-shaped section to be hooked on the entirety of the coil end portion 801 so that they apply the insertion pressure, as shown in FIG. 34. The coil inserting step like that of the first embodiment can also be executed by using those split insertion hooks.

In the ninth embodiment of the invention, as shown in FIG. 37 to FIG. 55, the coil forming step is executed by using a magazine (or a take-up jig) 7, which has a special structure to function as the take-up jig.

Figure 37:
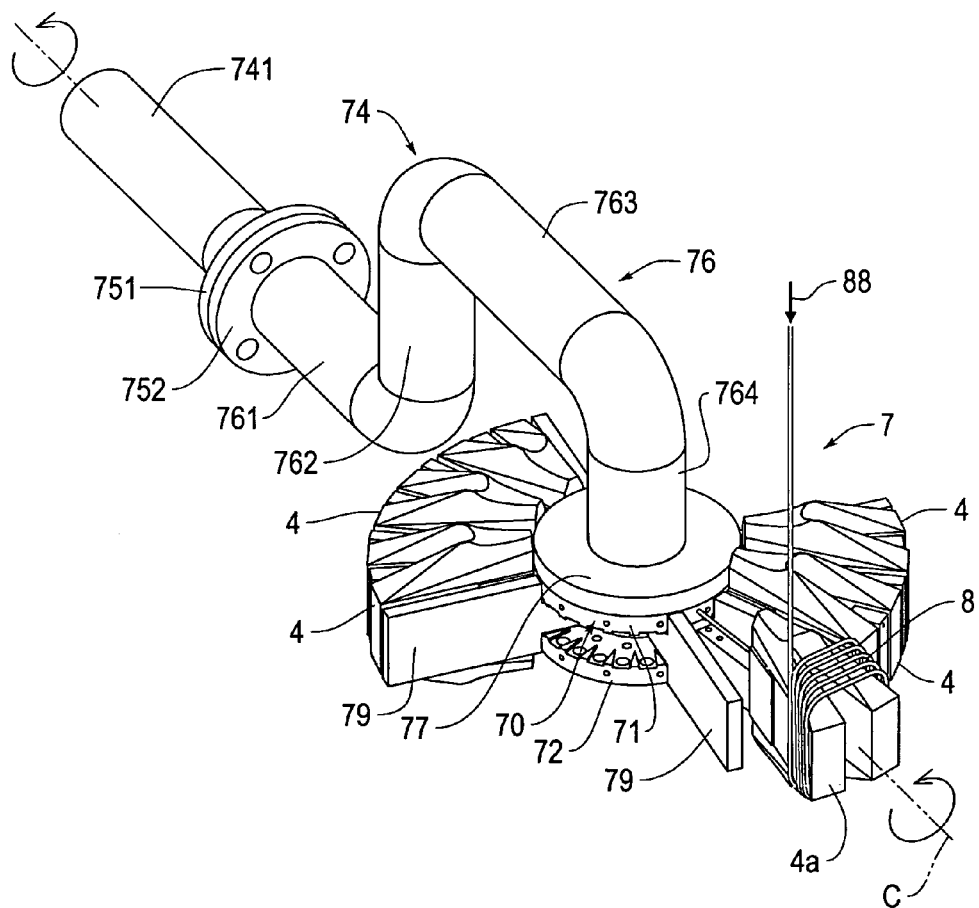
FIG. 37 is an explanatory view showing a construction of a coil forming apparatus.
Figure 38:
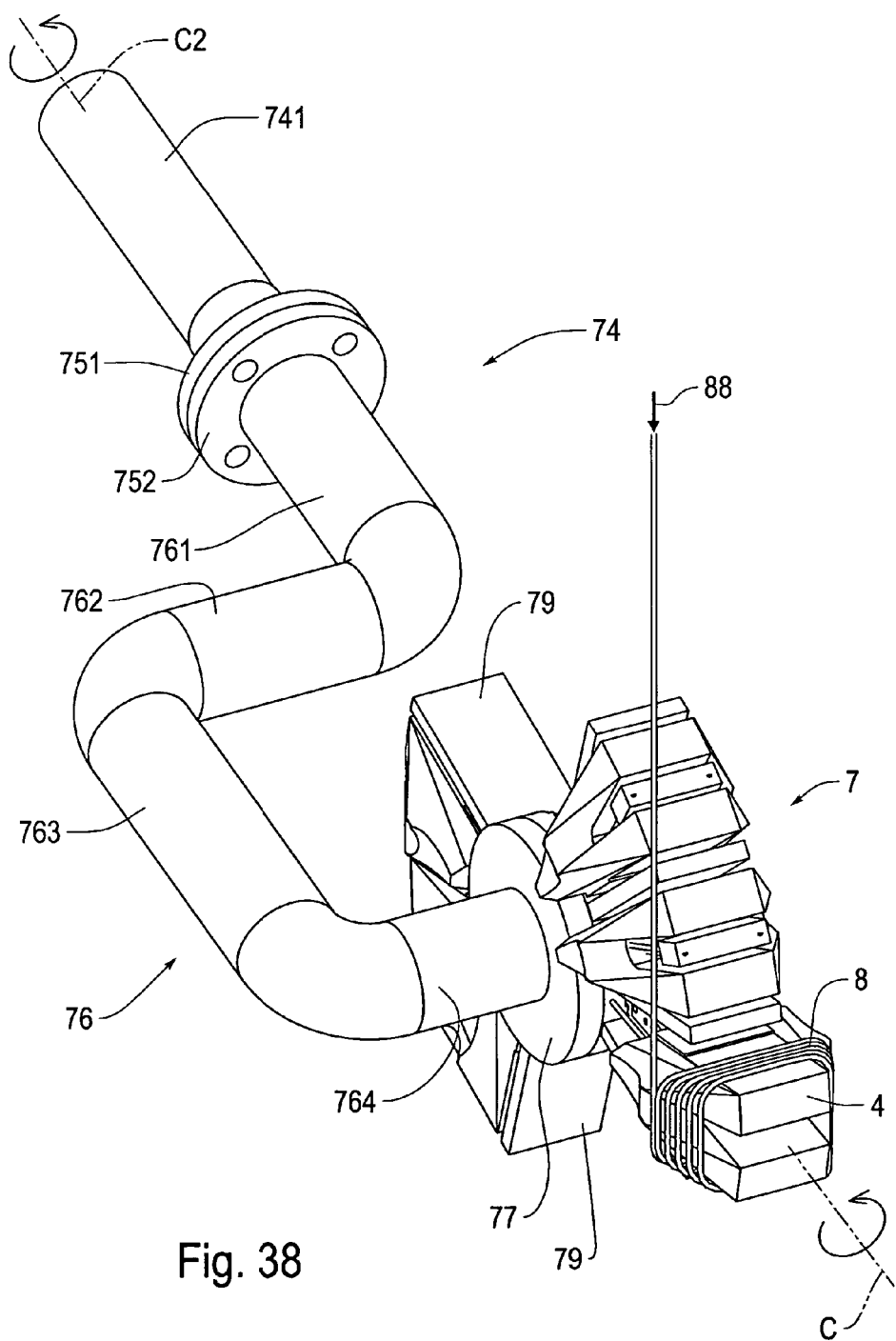
FIG. 38 is an explanatory view showing the state in which a coil is formed by the coil forming apparatus.

In this embodiment, there are used the take-up jig (or the magazine) 7 and a turning device 74 are used as a coil forming device for forming a motor coil (as referred to FIG. 50), which is prepared by juxtaposing three adjacent single-pole coils 8 turned in a loop shape with the electric line 88, as shown in FIG. 37 and FIG. 38.

Figure 39:
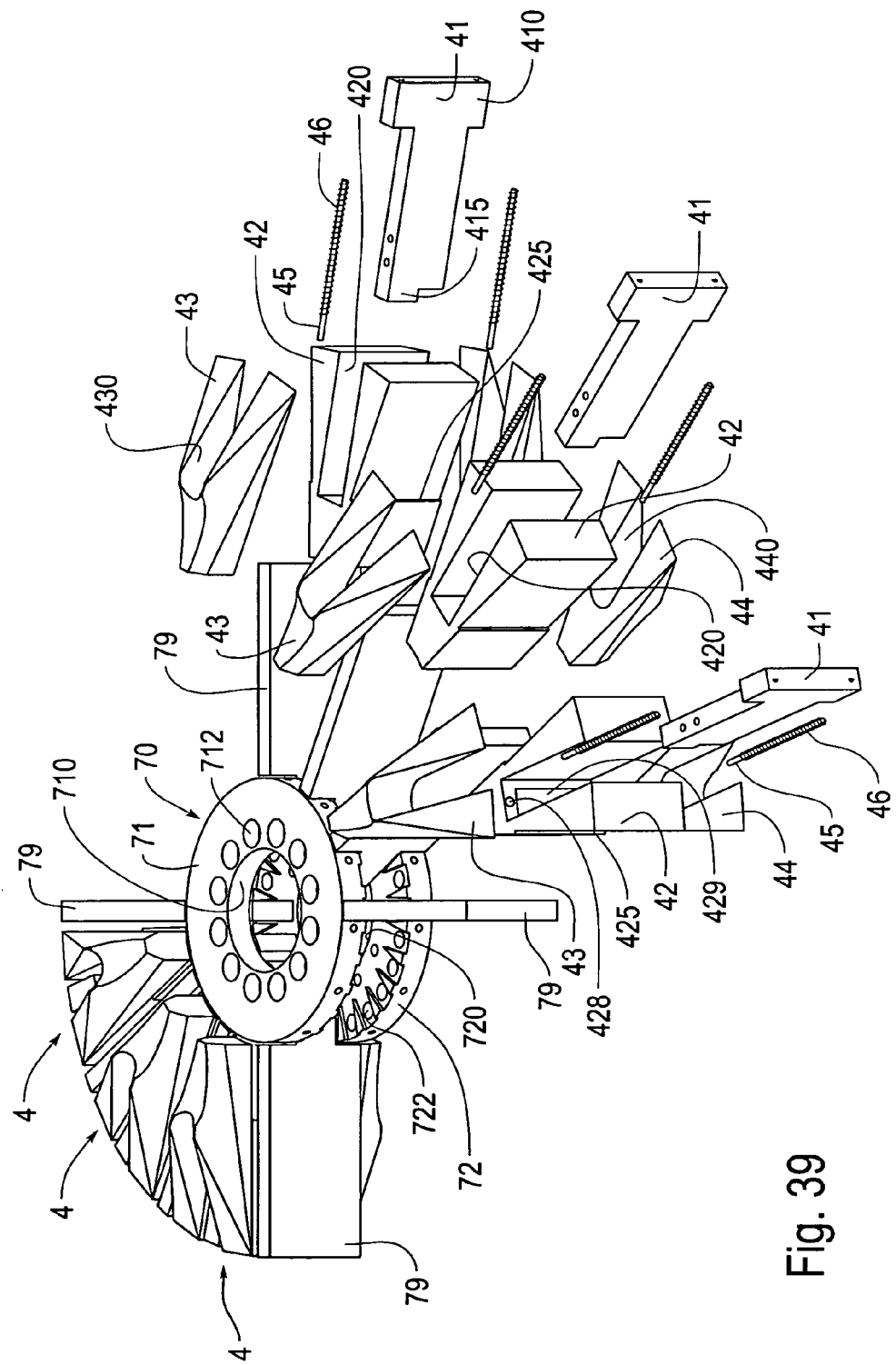
FIG. 39 is an expanded explanatory view showing a structure of a take-up jig.

As shown in FIG. 37 to FIG. 39, the take-up jig 7 is provided with a base holder 70 and a plurality of winding frames 4 arranged on the outer circumference of the base holder 70. The individual winding frames 4 are arranged to move to and from the base holder 70 and are constructed such that any of the winding frames 4 may protrude from the remaining ones.

As shown in FIG. 37 and FIG. 38, the turning device 74 is constructed to turn the take-up jig 7 as a whole on the longitudinal axis C of the winding frame 4 protruded.

The coil forming device of this embodiment will be described in detail in the following. In the take-up jig 7, as shown in FIG. 39, the base holder 70 has a disc shape. Specifically, the base holder 70 has a pair of upper and lower ring-shaped plates 71 and 72, which are provided with central through holes 710 and 720, respectively, and a plurality of positioning holes 712 and 722 around the central through holes 710 and 720. These central through holes 710 and 720 and the positioning holes 712 and 722 are provided for determining the engaging positions with the turning device 74, as will be described hereinafter.

Moreover, the paired upper and lower ring-shaped plates 71 and 72 are connected through separate plates 79, which are arranged in the radial direction extending from the centers of those ring-shaped plates 71 and 72. In this embodiment, the four separate plates 79 are arranged at a pitch of an internal angle of 15 degrees, and the four separate plates 79 are further arranged at the diagonal positions at the pitch of the internal angle of 15 degrees. In the spaces of the internal angle of about 15 degrees between the adjoining separate plates 79, moreover, there are individually arranged the winding frames 4. In this embodiment, the six winding frames 4 in total are provided by arranging the three adjoining winding frames 4 at the diagonal positions.

Here, as shown in FIG. 39, the take-up jig 7 of this embodiment is constructed such that the separate plates 79 and the winding frames 4 can be further arranged at empty positions in the outer circumference of the disc-shaped base holder 70, so that it can be provided with the twelve winding frames 4 at the maximum.

As shown in FIG. 39, moreover, the winding frames 4 are arranged such that they can move back and forth along the axes extending radially from the center point of the base holder 70. Moreover, the individual winding frames 4 have a sector shape, in which they are widened along the aforementioned axis.

As shown in FIG. 39, more specifically, each winding frame 4 has a frame body portion 42, which is generally formed in a sector shape in view of the front face and the back face, if these front and back faces are those parallel to the ring-shaped plates 71 and 72 of the base holder 70, and which is provided with a cutout 420 at its central portion.

Moreover, the frame body portion 42 is provided on its two side faces with stepped portions 425 for positioning the formed single-pole coil 8.

On the front side and the back side of the frame body portion 42, on the other hand, there are removably arranged shaping blocks 43 and 44 for profiling the shapes of the single-pole coil to be wound. These shaping blocks 43 and 44 are also generally formed in a sector shape, which is provided with cutouts 430 and 440 at their central portions. Here, the shaping blocks 43 and 44 are fixed on the frame body portion 42 by driving the not-shown screws.

As shown in FIG. 39, moreover, the shaping blocks 43 and 44 of this embodiment are made the thicker as they come the closer to the inner circumference side from the outer circumference side, so that the single-pole coil to be shaped may become higher toward the inner circumference side.

As shown in FIG. 39, moreover, the frame body portion 42 is provided with a rectangular through hole 429 in the axial direction from the cutout 420 to the base holder 70. In the upper and lower portions of the through hole 429, moreover, rod holes 428 are formed as circular through holes. Moreover, the winding frame 4 is arranged to move back and forth in the base holder 70 by fixing a guide plate 41 through the through hole 429 in the base holder 70.

As shown in FIG. 39, more specifically, the guide plate 41 is provided with a root end portion 415 to be fixed in the base holder 70, and a leading end portion 410, which is vertically large-sized generally in a T-shape to regulate the advanced position of the winding frame 4. And, the root end portion 415 of the guide plate 41 is inserted into the through hole 429 opened in the bottom portion of the cutout 420 of the frame body portion 42, and rods 45 carrying springs 46 are inserted into the rod holes 428 formed at the upper and lower portions of the through hole 429 in the frame body portion 42. And, the root end portion 415 of the guide plate 41 is clamped and fixed between the paired upper and lower ring-shaped plates 71 and 72 of the base holder 70, and the two rods 45 are fixed at their one-side ends on the ring-shaped plates 71 and 72 and at their other ends on the leading end portion 410 of the guide plate 41. As a result, the winding frame 4 is fixed such that it can move back and forth with respect to the base holder 70.

Figure 51:
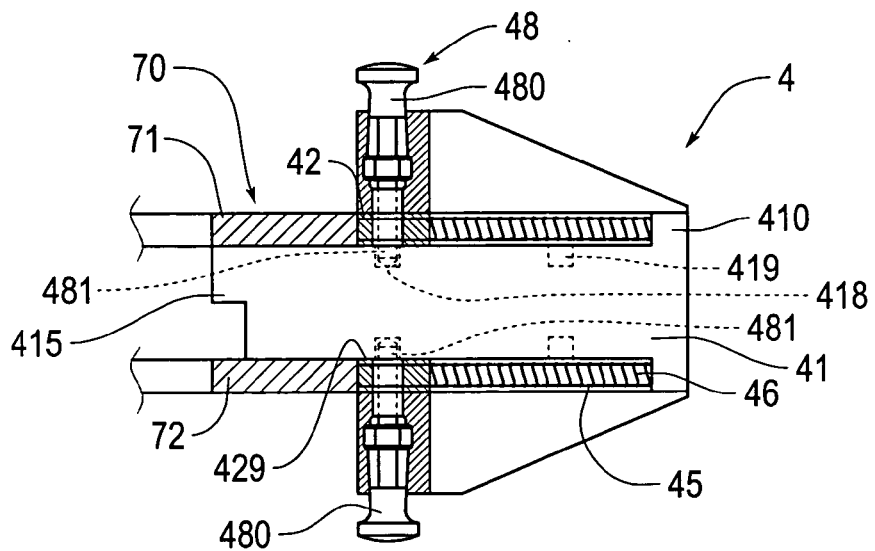
FIG. 51 is an explanatory view showing a structure for fixing the winding frame at the retracted position.
Figure 52:
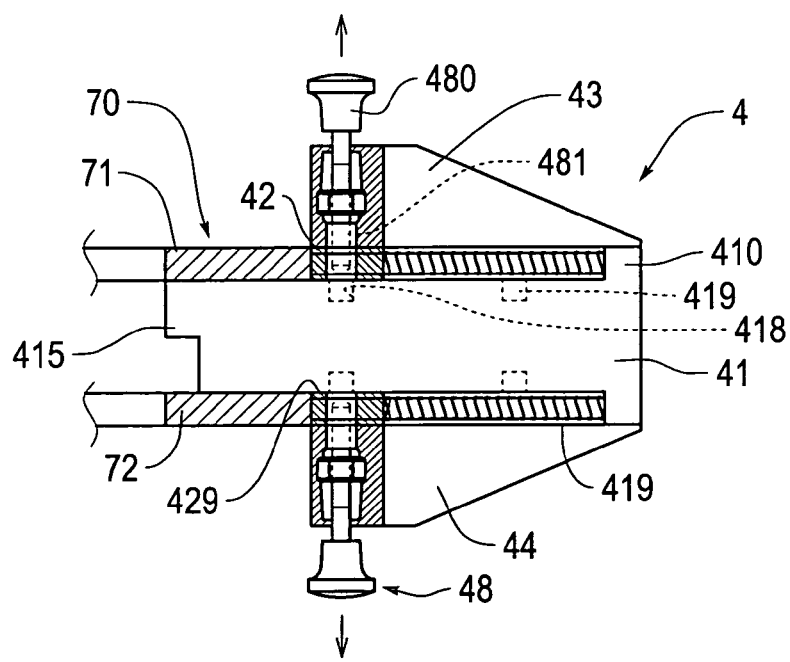
FIG. 52 is an explanatory view showing the state in which the positioning pins of the winding frame are disengaged from a guide plate.
Figure 53:
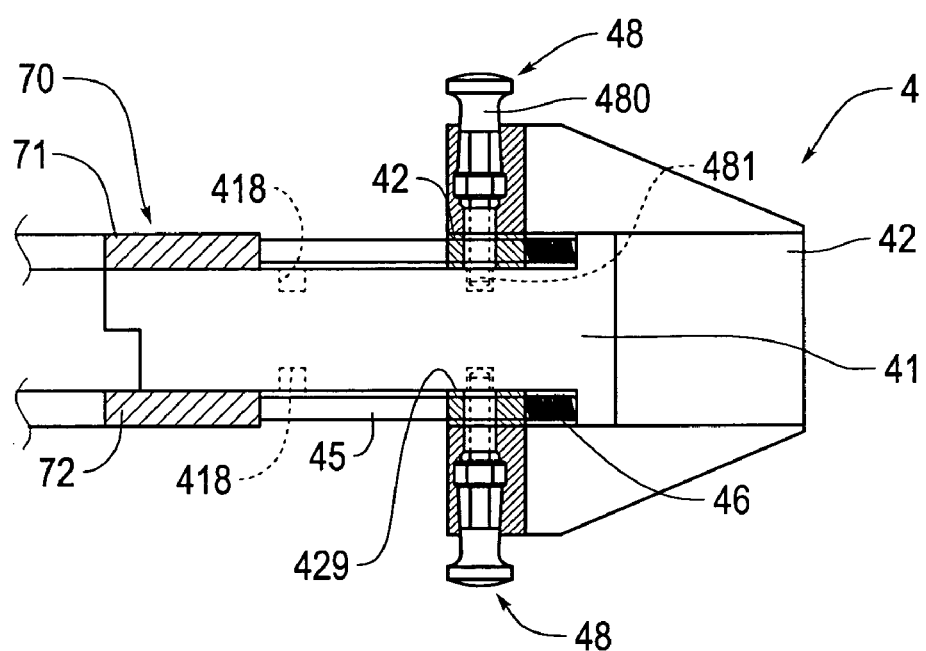
FIG. 53 is an explanatory view showing a structure for fixing the winding frame at the advanced position.

As shown in FIG. 51 to FIG. 53, moreover, the winding frame 4 is provided in its upper and lower portions with positioning pins 48, which can move their leading end portions 481 forward and backward by pinching and operating their head portions 480. Moreover, the guide plate 41 is provided with pin holes 418 and 419, which can engage with the pin leading end portions 481. While the pin leading end portions 481 of the positioning pins 48 being made to engage with the pin holes 418, as shown in FIG. 51, the winding frame 4 is retracted and kept in the state close to the base holder 70. When the winding frame 4 is to be advanced, on the other hand, the positioning pins 48 are retracted to release the pin leading end portions 481 and the pin holes 418 from the engaging state so that the winding frame 4 is advanced against the springs 46. As shown in FIG. 53, moreover, the positioning pins 48 are advanced again to bring the pin leading end portions 481 into engagement with the pin holes 419. As a result, the winding frame 4 is advanced in its axial direction and is fixed at a position spaced from the base holder 70.

On the two sides of each winding frame 4 thus arranged, there exists the separate plates 79, which are extended from the outer circumference of the base holder 70. Moreover, the separate plate 79 and the winding frame 4 are spaced at a predetermined distance functioning as the later-described coil retaining groove 20.

Figure 40:
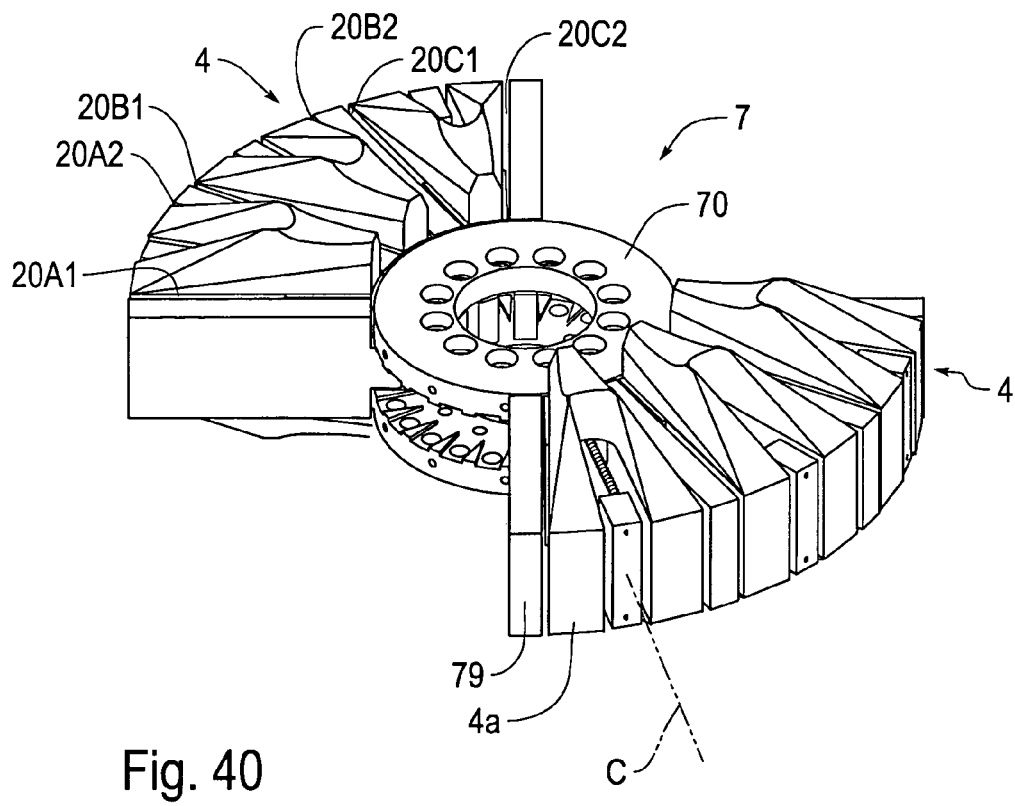
FIG. 40 is an explanatory view showing the state in which all the winding frames of the take-up jig are retracted.

Of the coil retaining grooves 20, as shown in FIG. 40, there are arranged in parallel the coil retaining grooves (e.g., 20A2 and 20B1, or 20B2 and 20C1 in FIG. 40) for arranging the adjoining coil insertion portions 801 in the adjoining single-pole coils 8.

In the take-up jig 7 of this embodiment, moreover, the contour formed of the leading ends of all the winding frames 4 retracted is a circular shape around the center point of the base holder 70. In other words, the take-up jig 7 of this embodiment is shaped such that the individual winding frames 4 may be arranged to confront the inner circumference of the later-described stator core.

Next, as shown in FIG. 37 and FIG. 38, the turning device 74 of this embodiment is provided with a straight portion 741 extending from the not-shown drive shaft, and a bent portion 76 connected to the straight portion 741 through flanges 751 and 752, and the bent portion 76 is provided at its leading end with a flange 77 for connecting the bent portion 76 to the take-up jig 7.

As shown in the same Figures, the bent portion 76 is provided with: a first portion 761 extending on the common axis of the straight portion 741; a second portion 762 bent at 90 degrees and extended from the first portion; a third portion 763 bent at 90 degrees from the second portion 762 and extended in parallel with the straight portion 741; and a fourth portion 764 bent at 90 degrees from the third portion 763. And, the aforementioned connecting flange 77 is arranged at the leading end of the fourth portion 764.

When the connecting flange 77 is connected to the base holder 70 of the take-up jig 7, as shown in FIG. 37 and FIG. 38, the connecting flange 77 is so positionally arranged that the center point of the base holder 70 in the thickness direction and in the radial direction may be located on the axis of the straight portion 741.

Moreover, the circumferentially fixed position of the connecting flange 77 to the take-up jig 7 can be so suitably changed that the axis C of the winding frame 4 may be aligned with the turning center C2 of the straight portion 741 of the turning device 74.

With reference to FIG. 40 to FIG. 50, here will be described a process for forming a motor coil having a plurality of juxtaposed single-pole coils 8, by the coil forming apparatus including the take-up jig 7 and the turning device 74 thus far described. The presentation of the turning device 74 is omitted from those Figures.

First of all, all the winding frames 4 in the take-up jig 7 are retracted, as shown in FIG. 40, and the take-up jig 7 is so fixed on the turning device 74 that the turning center C2 (as referred to FIG. 37 and FIG. 38) of the turning device 74 is aligned with the axis C of the first winding frame 4a.

Figure 41:
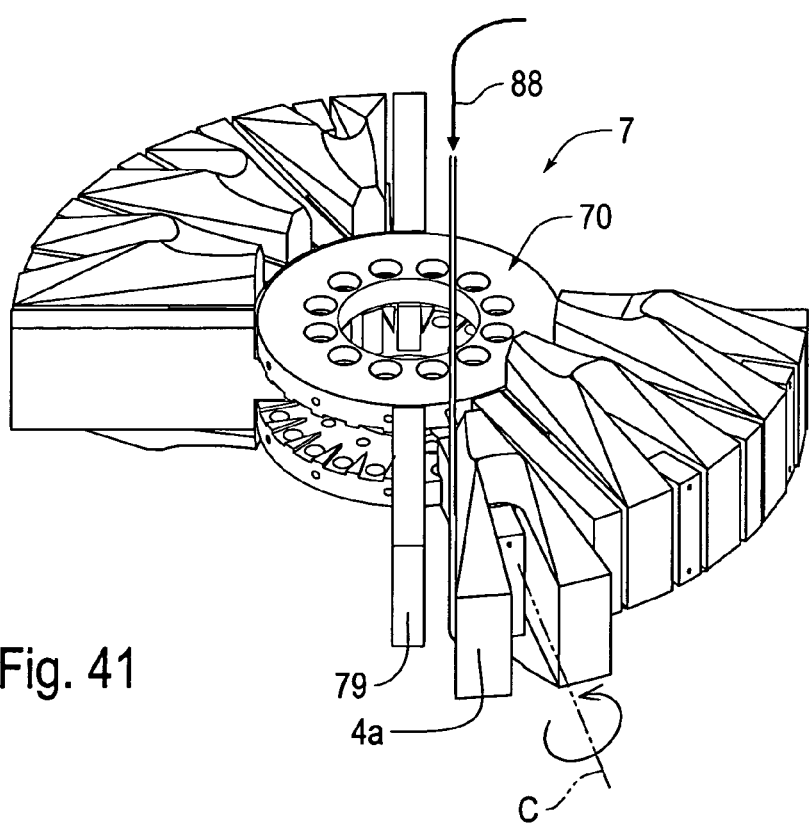
FIG. 41 is an explanatory view showing the state in which the first winding frame of the take-up jig is advanced.

Next, a winding frame protruding step is performed to advance the first winding frame 4a from that state so as to protrude the same from the remaining winding frames 4, as shown in FIG. 41. At this time, the winding frame 4a is released from the fixed state, in which it is fixed at the retracted position by the positioning pins 48 (FIG. 51 to FIG. 53), and the winding frame 4a is advanced against the springs 46. The winding frame 4a is fixed again at its advanced position by the positioning pins 48.

Then, the electric line 88 is fed in one direction from above, as shown in FIG. 41, and its leading end is fixed on the take-up jig 7. In this fixing method, a special fixing device may be used to fix the leading end at a predetermined position, or the leading end may be tied to an arbitrary position of the take-up jig 7. The latter method is adopted in this embodiment.

Figure 42:
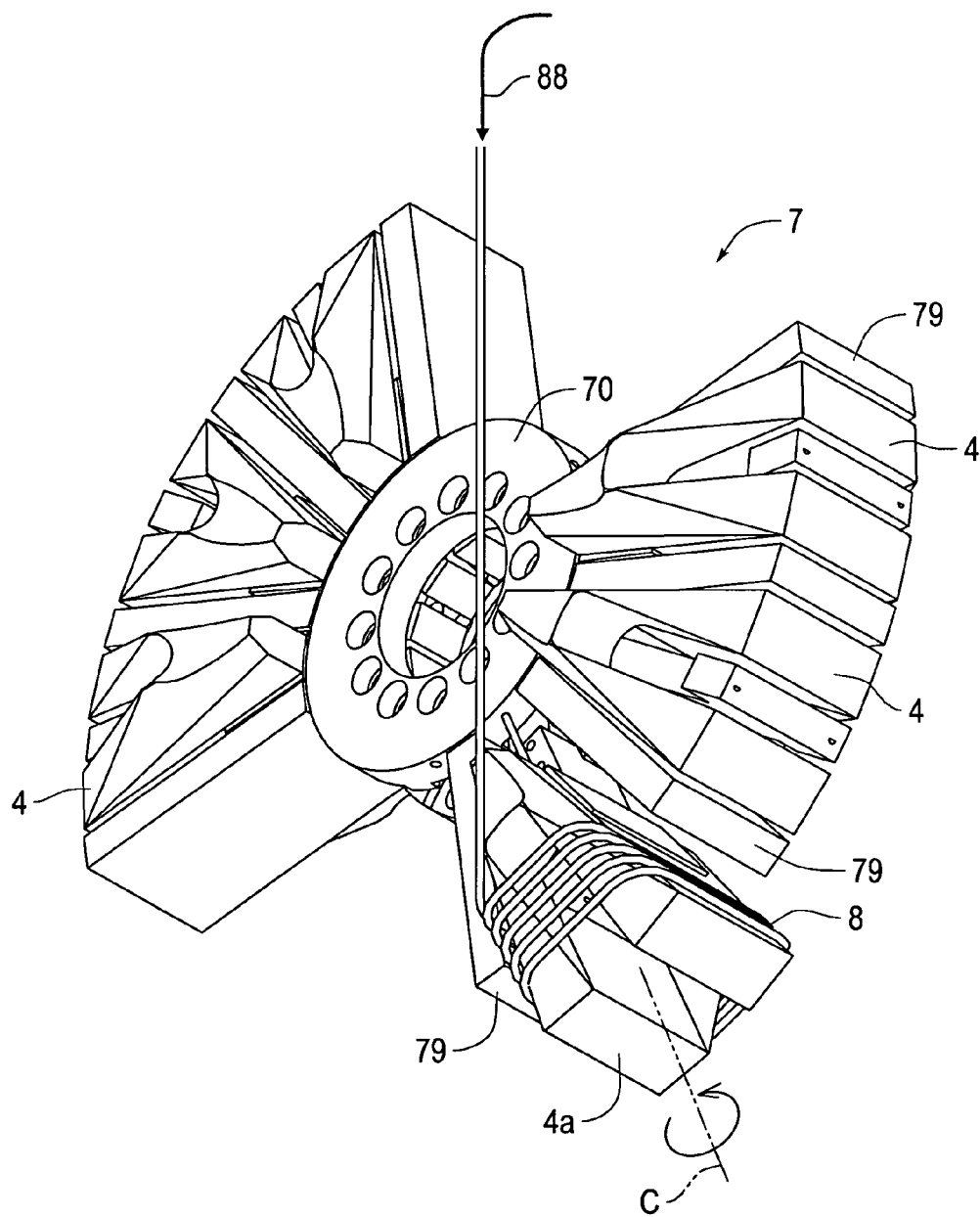
FIG. 42 is an explanatory view showing the state in which the take-up jig is turned on the axis of the first winding frame to wind the electric line.
Figure 43:
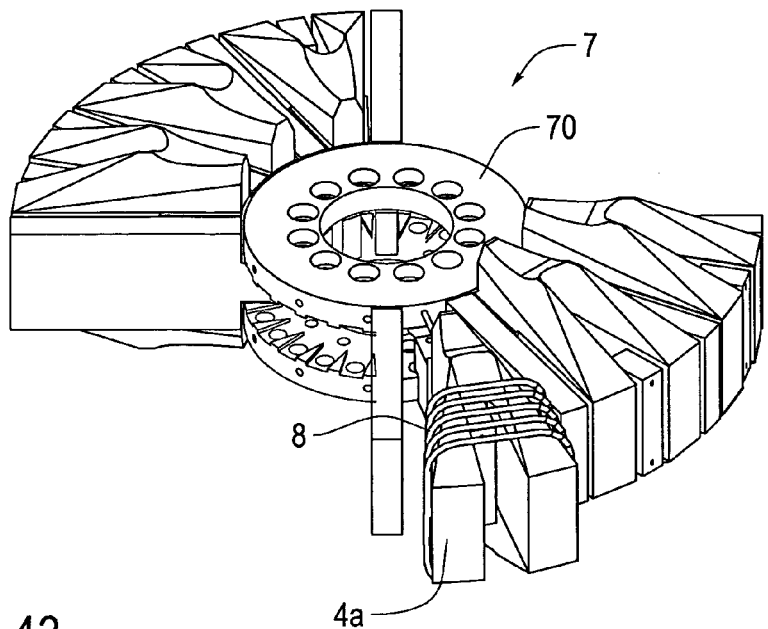
FIG. 43 is an explanatory view showing the state in which the electric line is completely wound on the first winding frame.

Next, as shown in FIG. 41 and FIG. 42, the protruded winding frame 4*a* is fed in one direction with the electric line 88, and the turning device 74 is driven to perform a winding step of turning the take-up jig 7 as a whole on the axis C of the winding frame 4*a*. As a result, the electric line 88 is wound around the protruded winding frame 4*a*, thereby to complete the formation of the first single-pole coil 8, as shown in FIG. 43.

Figure 44:
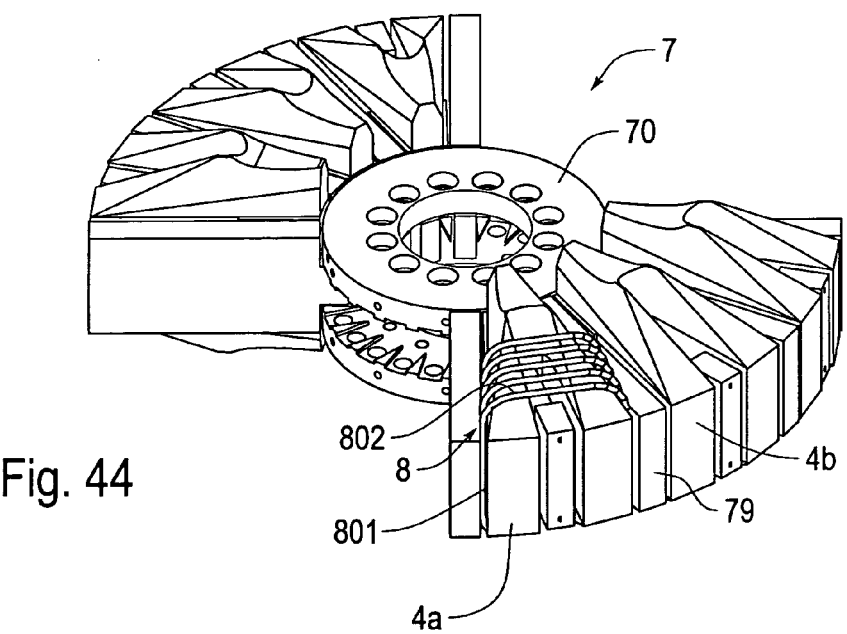
FIG. 44 is an explanatory view showing the state in which the first winding frame is retracted.

Next, there is performed a winding frame retracting step of retracting the first winding frame 4*a* having the single-pole coil 8 formed thereon, as shown in FIG. 44. At this time, the winding frame 4*a* is fixed at the retracted position by operating the positioning pins 48 (FIG. 51 to FIG. 53) again.

As shown in FIG. 44, the single-pole coil 8 wound around the winding frame 4*a* takes the state, in which its coil end portions 802 positioned above and below the loop are uncovered to the surface side and back side of the winding frame 4 and in which the coil insertion portions 801 positioned on the left and right are housed in the clearances between the separate plates 79 and the winding frame 4.

Figure 45:
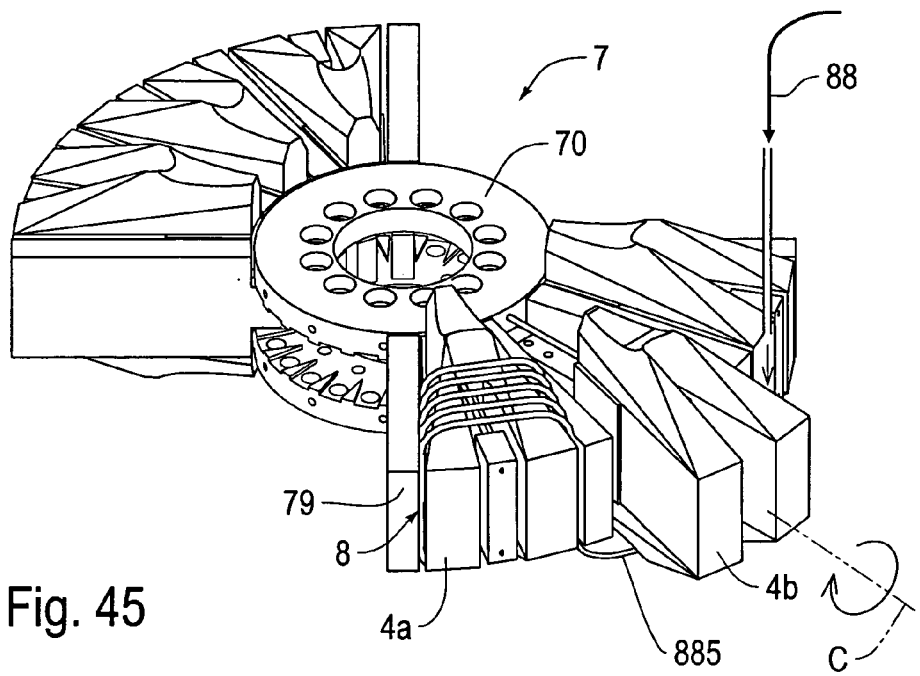
FIG. 45 is an explanatory view showing the state in which the second winding frame of the take-up jig is advanced.

Next, as shown in FIG. 45, a second winding frame 4*b* adjacent to the first winding frame 4*a* having the single-pole coil 8 formed thereon is advanced along the axis C to protrude from the outer sides of the remaining winding frames 4 and is fixed like before at the advanced position.

Before or after this winding frame protruding step, moreover, the engaging position between the take-up jig 7 and the turning device 74 is changed to align the turning center of the turning device 74 and the axis of the second winding frame 4*b*.

As shown in FIG. 45, a crossover line 885 leading from the single-pole coil 8 retained by the first winding frame 4*a* is turned over to below the second winding frame 4*b*, and the succeeding electric line 88 is fed like before from above in one direction.

Figure 46:
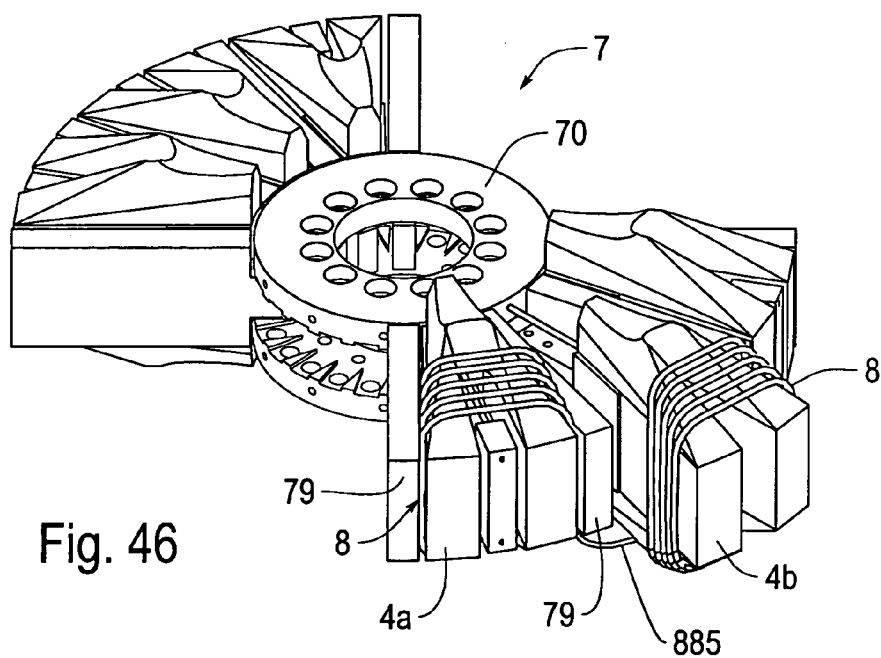
FIG. 46 is an explanatory view showing the state in which the take-up jig is turned on the axis of the second winding frame to wind the electric line completely.

Next, as shown in FIG. 45 and FIG. 46, the protruded winding frame 4*b* is fed with the electric line 88 in one direction, and there is performed the winding step of turning the take-up jig 7 as a whole on the axis C of the winding frame 4*b*. The turning direction at this time is reversed from that of the case of the first winding frame 4*a*. As a result, the electric line 88 is wound around the protruded winding frame 4*b*, as shown in FIG. 47, thereby to complete the formation of the second single-pole coil 8 having its wound direction reversed from that of the first single-pole coil 8.

Figure 47:
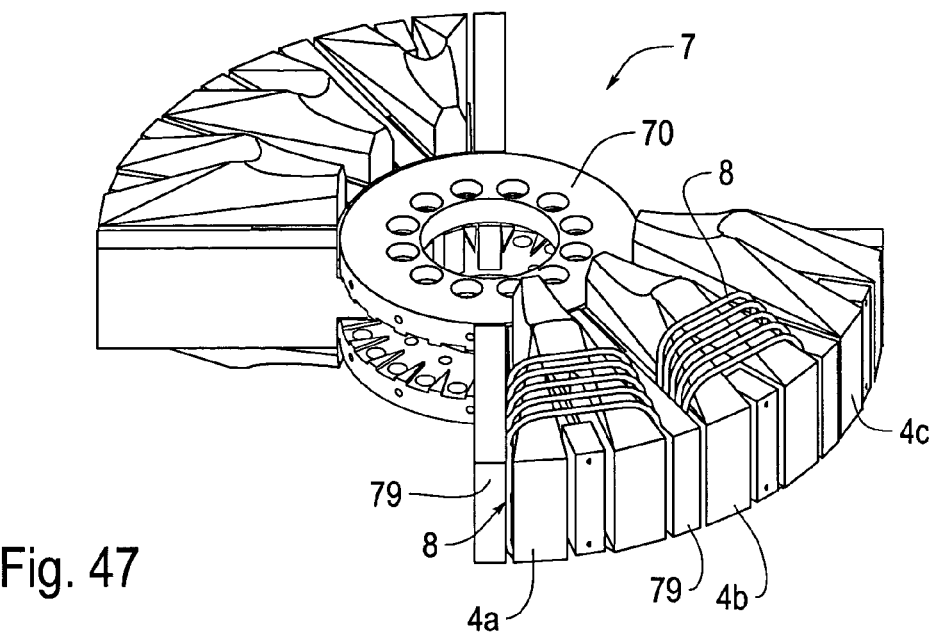
FIG. 47 is an explanatory view showing the state in which the second winding frame is retracted.

Next, as shown in FIG. 47, the second winding frame 4*b* having the single-pole coil 8 formed thereon is retracted and is fixed like before at the retracted position. The second single-pole coil 8 wound around the winding frame 4*b* takes the state, in which its coil end portions 802 positioned above and below the loop are uncovered to the surface side and back side of the winding frame 4 and in which the coil insertion portions 801 positioned on the left and right are housed in the clearances between the separate plates 79 and the winding frame 4.

Figure 48:
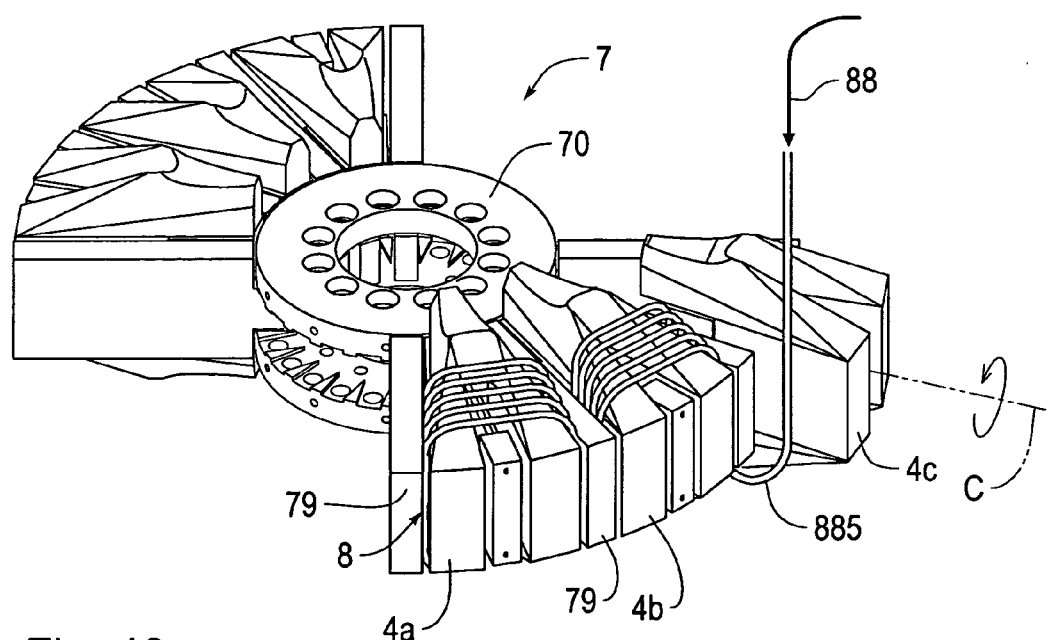
FIG. 48 is an explanatory view showing the state in which a third winding frame of the take-up jig is advanced.

Next, as shown in FIG. 48, a third winding frame 4*c* adjacent to the second winding frame 4*b* is advanced along the axis C to protrude from the outer sides of the remaining winding frames 4 and is fixed like before at the advanced position. In this case, too, before or after this winding frame protruding step, moreover, the engaging position between the take-up jig 7 and the turning device 74 is changed to align the turning center C2 (FIG. 37 and FIG. 38) of the turning device 74 and the axis C of the third winding frame 4*c*.

As shown in the same Figure, the electric line 88 succeeding to the crossover line 885 leading from the single-pole coil 8 retained by the second winding frame 4*b* is fed like before from above in one direction.

Figure 49:
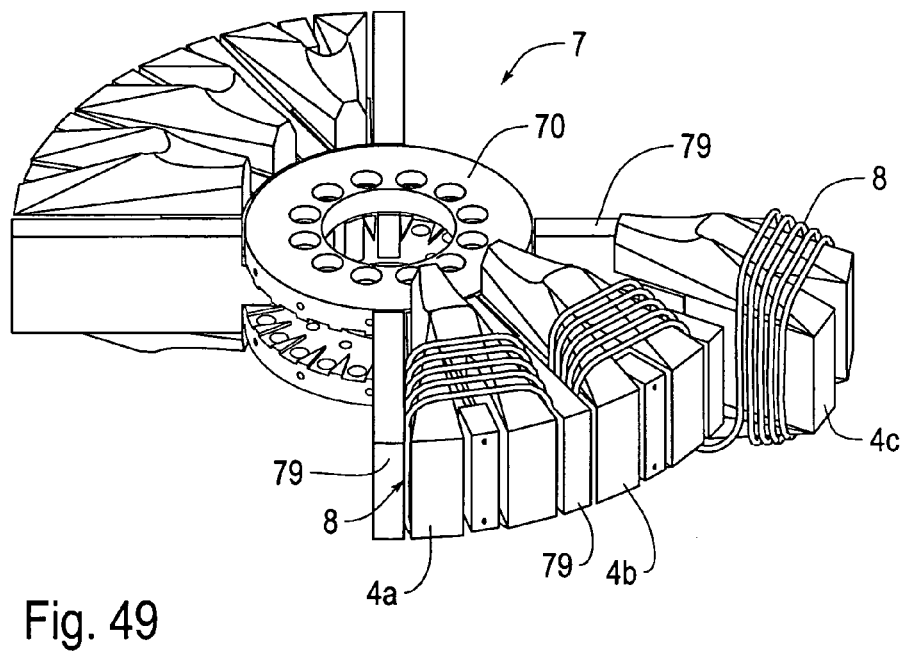
FIG. 49 is an explanatory view showing the state in which the take-up jig is turned on the axis of the third winding frame to wind the electric line completely.

Next, as shown in FIG. 48 and FIG. 49, the protruded winding frame 4*c* is fed with the electric line 88 in one direction, and there is performed the winding step of turning the take-up jig 7 as a whole on the axis C of the winding frame 4*c*. The turning direction at this time is reversed from that of the case of the second winding frame 4*c*. As a result, the electric line 88 is wound around the protruded winding frame 4*c*, as shown in FIG. 49, thereby to complete the formation of the third single-pole coil 8 having its wound direction reversed from that of the second single-pole coil 8.

Figure 50:
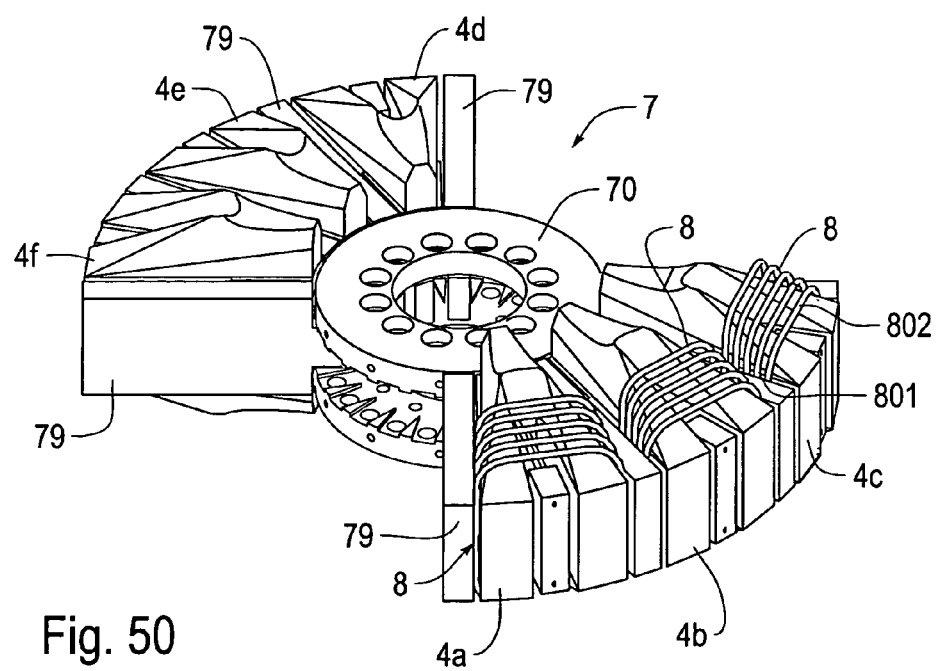
FIG. 50 is an explanatory view showing the state in which the third winding frame is retracted.

Next, as shown in FIG. 50, the third winding frame 4*c* having the single-pole coil 8 formed thereon is retracted and is fixed like before at the retracted position. The coil insertion portions 801 of the third single-pole coil 8 formed around the winding frame 4*c* are also housed in the clearances between the separate plates 79 and the winding frame 4.

As a result, there is completed the coil, in which the three single-pole coils 8 are juxtaposed to each other such that their winding directions are alternately reversed.

Next, as shown in FIG. 50, for three winding frames 4*d* to 4*f* opposed to the three winding frames 4*a* to 4*c* having the aforementioned coils formed, too, the coil, in which the three single-pole coils 8 are juxtaposed to each other with the alternately reversed winding directions can be formed by a procedure similar to the aforementioned one.

Thus in the coil forming method of this embodiment, there are used the take-up jig 7 having the aforementioned structure composed of the base holder 70 and the winding frames 4 and the turning device 74. As described hereinbefore, moreover, the winding frame protruding step, the winding step and the winding frame retracting step are performed sequentially on the individual winding frames.

Here, the winding step is performed by turning the take-up jig as a whole on the axis C of the protruded winding frame 4. As described hereinbefore, therefore, the electric line 88 can be fed in one direction so that the single-pole coil 8 can be formed around the winding frame 4 without any torsion of the electric line 88.

On the other hand, the winding step follows the winding frame protruding step, and is followed by the winding frame retracting step. In case the winding frame 4 or the object of the winding step is to be changed, more specifically, this change can be made by advancing and retracting the winding frame 4 at the winding frame protruding step and at the winding frame retracting step, and no special space for feeding the electric line need be established between the adjoining winding frames 4. Therefore, the length of the crossover line 885 between the single-pole coils 8 obtained can be reduced to a sufficient short length.

In this embodiment, moreover, each winding frame 4 of the take-up jig 7 is generally given the sector shape, and the shaping blocks 43 and 44 are arranged on the surface side and back side of the winding frame 4. The shaping blocks 43 and 44 are thickened in the inward direction as described above. In the single-pole coil 8 wound around the winding frame 4, therefore, the shapes of the electric line loops composing itself are changed along the axis C of the winding frame 4.

Specifically, the electric line loops composing the single-pole coil 8 become wider in the outward direction along the sector-shaped winding frame 4 and become lower along the shape of the shaping blocks 43 and 44. As a result, it is possible to optimize the arrangement of the coil end portions 802, as will be described hereinafter, when the coil is mounted on the stator core. By adopting this structure, in which the width is larger from the radially inner side to the outer side and in which the axial height is smaller from the radially inner side to the outer side, it is possible to prevent the shifts of the individual electric lines (or the coils) composing the single-pole coil 8 at the time of taking up the electric line 88.

In the take-up jig 7 of this embodiment, moreover, the contour formed of the leading ends of all the winding frames 4 retracted is the circular shape so that the individual winding frames 4 can be arranged to confront the inner circumference of the later-described stator core.

On the two sides of each winding frame 4, moreover, there exists the separate plates 79, which are extended from the outer circumference of the base holder 70. Moreover, the clearance between the separate plate 79 and the winding frame 4 functions as the coil retaining groove 20. As exemplified in the second embodiment, the individual single-pole coils 8 can be mounted on the stator core by their linear movements along those coil retaining grooves.

Next, here will be presented an embodiment of a method of inserting the coil formed by using the coil forming apparatus, directly from the take-up jig 7 into the stator core.

Figure 54:
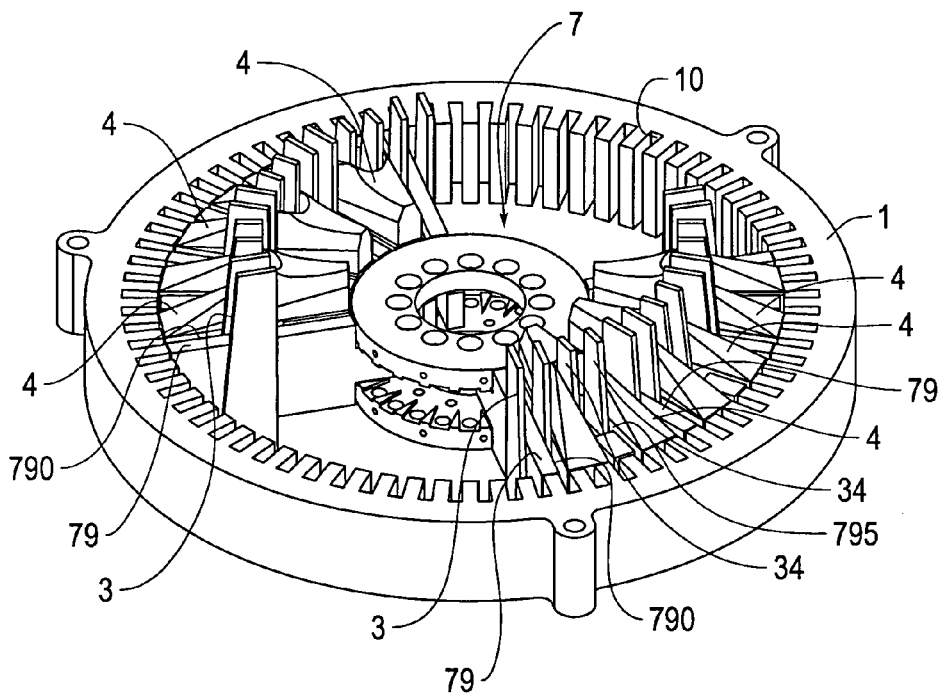
FIG. 54 is an explanatory view showing the state in which the take-up jig is arranged in the stator core.
Figure 55:
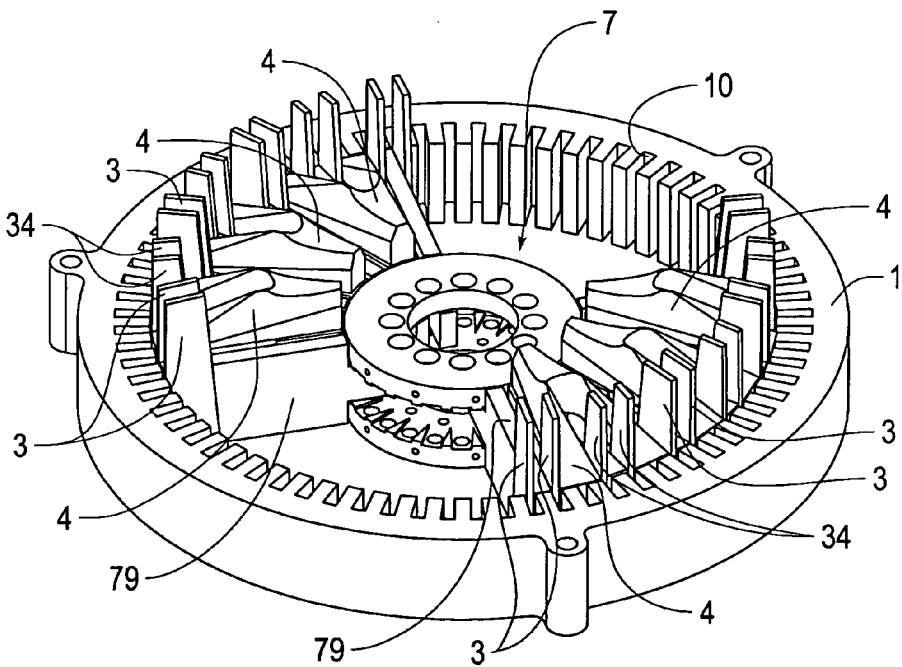
FIG. 55 is an explanatory view showing the state in which the insertion blades and the provisional shaping blades inserted into the take-up jig are advanced.

In this embodiment, as shown in FIG. 54 and FIG. 55, the coils (as referred to FIG. 50) are inserted and arranged in the slots 10 which are formed in the inner circumference of the ring-shaped stator core 1. In this embodiment, here are omitted the coils (or the single-pole coils 8) so as to clarify the movements of the later-described insertion blades 3.

The motor to be constructed by using the stator core 1 is the three-phase DC brushless motor. And, the stator core 1 in this embodiment is manufactured by laminating the ring-shaped electromagnetic steel sheets, and is provided in its inner circumference with the slots 10 for inserting the coils, as shown in FIG. 54 and FIG. 55.

In this embodiment, the stator core 1 is provided with the seventy two slots 10 so as to arrange the thirty six single-pole coils 8 in total. And, every twelve single-pole coils 8 bears each phase. In this embodiment, as described hereinbefore, two sets of coils having three single-pole coils 8 are prepared by the single take-up jig 7, and are simultaneously mounted in the stator core 1. By performing these works six times, all the single-pole coils 8 needed are mounted in the stator core 1.

These works will be described more specifically. First of all, the take-up jig 7 is so arranged in the stator core 1 that coil retaining grooves 790, as formed between the winding frame 4 and the separate plate 79, in the take-up jig 7 may confront the slots 10 of the stator core 1, as shown in FIG. 54.

As shown in FIG. 54, moreover, the insertion blades 3 are inserted into the coil retaining grooves 790 of the take-up jig 7. In the take-up jig 7, moreover, the cutouts 420 formed in the frame body portion 42 of the winding frame 4 and the cutouts 430 and 440 (as referred to FIG. 39) formed in the upper and lower shaping blocks 43 and 44 provide provisional shaping grooves 795, into which the provisional shaping blades 34 are to be inserted.

As shown in FIG. 55, moreover, the insertion blades 3 are advanced in the coil retaining grooves 790 in the direction from the center to the outer circumference. Simultaneously with this, the provisional shaping blades 34 are advanced in the provisional shaping grooves 795 in the direction from the center to the outer circumference. As a result, the single-pole coils 8 are pushed by the insertion blades 3 to move generally linearly from the coil retaining grooves 790 to the slots 10 of the stator core 1. On the other hand, the upper and lower coil end portions 802 (FIG. 50), as bulging from the stator core 1, in the single-pole coil 8 is subjected to a provisional shaping treatment, in which they are pushed and deformed outward by the provisional shaping blades 34.

These advancing actions of the insertion blades 3 and the provisional shaping blades 34 are simultaneously done on all the six single-pole coils 8 so that these six single-pole coils 8 are simultaneously inserted into the slots 10 of the stator core 1.

Next, in this embodiment, a second provisional shaping is executed by using the paired upper and lower formers 66 (as referred to FIG. 12) like those of the first embodiment. The formers 66 have ring shapes, as described hereinbefore, and are provided, on their sides confronting the stator core 1, with the shaping faces 660 for profiling the coils into a desired shape. Moreover, each former 66 is provided with cutouts 665 for preventing the insertion blades 3 and the provisional shaping blades 34 from interfering each other. And, the formers can be pushed onto the stator core 1 while the insertion blades 3 and the provisional shaping blades 34 being advanced.

The paired upper and lower formers 66 thus constructed are individually advanced from their upper and lower positions and pushed onto the stator core 1. As a result, the second provisional shaping is performed such that the coil end portions 802, as bulging out from above and below the stator core 1, of the six single-pole coils 8 thus arranged in the stator core 1 fall down toward the stator core 1.

Next, in this embodiment, the aforementioned coil forming apparatus is used to form two sets of coils having three single-pole coils 8, newly on the take-up jig 7. Like before, moreover, there are performed the movement of the coils from the take-up jig 7 directly to the stator core 1, the provisional shaping and the final second provisional shaping. By repeating these works six times in total, the thirty six single-pole coils 8 in total are mounted on the stator core 1. And, the shaping to be performed as the second provisional shaping by the formers is performed on all the thirty six single-pole coils 8 so that it becomes the proper shaping step for profiling the entire coil shape. Thus, the thirty six single-pole coils 8 in total are inserted and arranged in the stator core 1.

Here in this embodiment, a series of works are performed from the formation of the six single-pole coils to the second provisional shaping and are repeated six times. However, the efficiency can be enhanced by using a plurality of sets of take-up jigs 7. Moreover, the steps can be rationalized by increasing the number of winding frames 4 in the take-up jig 7 from six to twelve and by moving the twelve single-pole coils 8 all at once to the stator core 1.

By making use of the take-up jig 7 and the insertion blades 3, as described hereinbefore, this embodiment can also execute the so-called "linear insertion method", by which the coils are linearly moved, easily and stably. Moreover, the coil retaining grooves 20, which are formed between the winding frames 4 and the separate plates 79, are parallel to each other for arranging the adjoining coil insertion portions 801 of the adjoining single-pole coils 8. As in the first embodiment, therefore, it is possible to ensure the parallel moving loci of the coil insertion portions 801 before inserted into the slots 10. And, the single-pole coils 8 can be linearly inserted without changing their postures into the slots 10. Therefore, it is not necessary to enlarge the vertical length of the coils more than necessary.

In this embodiment, moreover, the coils can be moved from the winding frames 4 having formed them, directly to the stator core 1, as described hereinbefore. Moreover, the coils need not be transferred, after formed, from the winding frames to another coil transfer device so that the coils can be highly efficiently mounted on the stator core. This is because the take-up jig 2 has the aforementioned excellent structure, as detailed hereinbefore.

Moreover, the coils can be inserted from the take-up jig 7 directly into the stator core 1 so that their movements can be easily executed even if the crossover lines connecting the single-pole coils 8 are short.

In the tenth embodiment of the invention, a wedge inserting step is executed after completion of the coil inserting step of the first embodiment.

Figure 57:
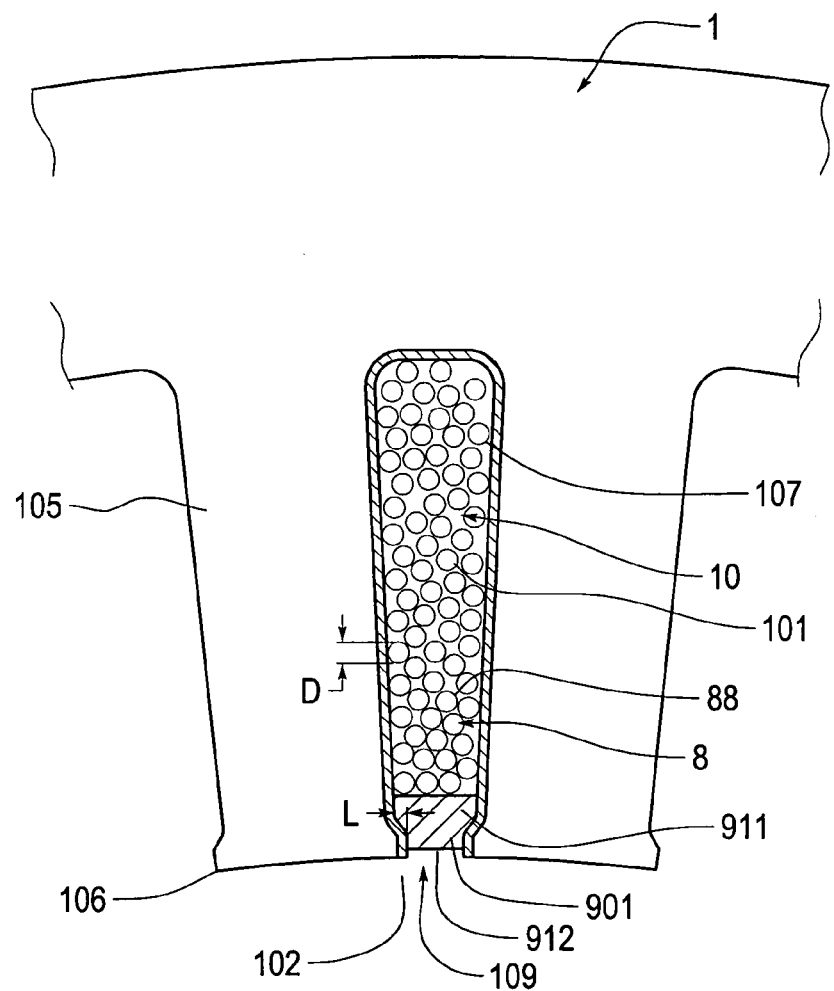
FIG. 57 is an explanatory view showing the state in which the wedge is mounted in the slot of the stator core.

The slot 10 of the stator core 1 of this embodiment is provided, as shown in FIG. 57, with a slot open portion 102, which has its space portion constricted at its inner circumference end portion, and a general portion 101 which has a wider space than that of the slot open portion 102 on its outer circumference side.

After the coil inserting step, moreover, the wedge inserting step is performed to insert a wedge 901 into the slot 10 thereby to clog the inner circumference open portion in the slot 10.

Figure 56:
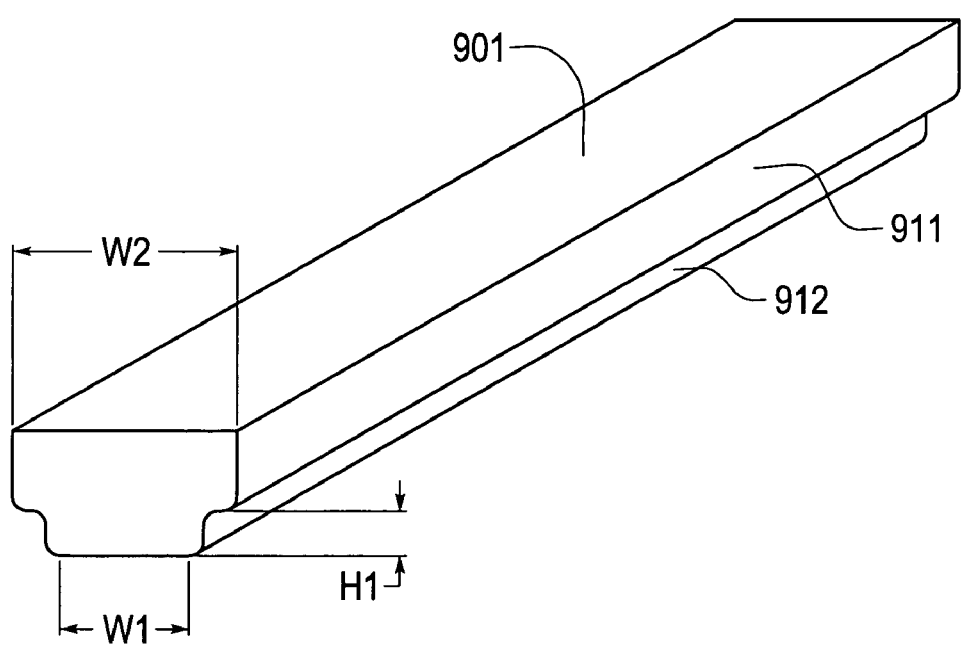
FIG. 56 is a perspective view showing a wedge.

The wedge 901 is provided, as shown in FIG. 56, with a wide portion 911 arranged in the general portion 101 of the slot 10, and a convex portion 912, which has a smaller width size than that of the wide portion 912, which is protruded from the wide portion 911 and which is arranged in the slot open portion 102. This will be described in detail in the following.

The stator core 1 in this embodiment has a ring shape and is provided at its inner circumference portion with a plurality of teeth 105, as shown in FIG. 57, to form the slot 10 in between. Each tooth 105 extends radially from the outer circumference side to the inner circumference side and is provided at its leading end portion with protrusions 106 protruding in the circumferential directions. The space, at which those protrusions 106 confront each other, is the aforementioned slot open portion 102 in the slot 10, and the space on the outer circumference side is the aforementioned general portion 101.

In this embodiment, moreover, there is arranged in advance all over the inner circumference of the slot 10 an insulating film 107, which is made of a synthetic resin having electrically insulating properties, as shown in FIG. 57. Specifically, a film made of an LCP (Liquid Crystal Polymer) is formed in advance. In this embodiment, the insulating film 107 is set to have a thickness of about 300 microns. Here, a sheet of electrically insulating aramid fibers of the prior art can also be applied to that insulating film 107.

As shown in FIG. 56, the wedge 901 is made of an LCP (Liquid Crystal Polymer) and is formed into an integral shape having the wide portion 911 and the convex portion 912. This convex portion 912 has a height size H1 slightly smaller than the radial size of the slot opening portion 102, i.e., the thickness size of the tooth 105. Moreover, the width sizes W1 and W2 of the convex portion 912 and the wide portion 911 are so designed to correspond to the sizes of the space widths of the slot open portion 102 and the general portion 101 of the slot 10 as to establish a small clearance (although not shown) between the confronting teeth 105.

This clearance is sized to be sufficiently smaller than both the size L (FIG. 57) of the protrusion of the inner wall face forming the slot open portion 102 in the stator core 1 from the inner wall face forming the general portion and the diameter D (FIG. 57) of the electric line forming the coil to be inserted and arranged in the slot 10.

Here, it is preferred, as described hereinbefore, for improving the inserting works that a small clearance is formed in the design between the wedge 901 and the tooth 105. In order that the convex portion 912 may play the role to prevent the turning of the wedge 901, however, that clearance should be as small as possible. It is most desired that the wedge 901 contacts in face-to-face relation with the tooth 105 when it is mounted.

Next, the works to insert the wedges 901 into the slots 10 of the stator core 1 are done after all the single-pole coils 8 were inserted into the slots 10. In this embodiment, as in the first embodiment, there is performed a linear inserting method (or a radial inserting method) of moving the single-pole coils 8, as formed by winding the wire 88 in advance, generally linearly from the inner circumference side of the stator core 1 into the slots 10. After this, the wedges 901 are inserted axially into the inner circumference openings of the slots 10.

At this time, the wedges 901 are so inserted into the slots 10 that their convex portions 912 are positioned on the inner circumference side of the stator core 1 whereas the wide portions 911 are positioned on the outer circumference side, and such that those portions 912 and 911 correspond to the slot open portions 102 and the general portions 101 of the slots 10.

As a result, as shown in FIG. 57, the inner circumference openings of the slots 10 can be reliably clogged such that the wide portions 911 and the convex portions 912 of the wedges 901 are positioned in the general portions 101 and the slot open portions 102 of the slots 10, respectively.

The wedge 901 of this embodiment has a shape composed of the wide portion 911 and the convex portion 912, as described hereinbefore, so that it is shaped to have a far superior rigidity than that of the wedge of the prior art, which is formed by bending a sheet-shaped material. Therefore, the wedge has such a strength as can stand sufficiently, even in case the wedge 901 is solely inserted after the single-pole coil 8 was inserted by the radial inserting method into the slot 10 of the stator core 1. By making use of the improved rigidity of the wedge 901, moreover, it is possible to make the width of the slot open portion wider than that of the prior art. Therefore, the radial inserting method can be more stably executed to rationalize the manufacturing process.

Moreover, the wide portion 911 and the convex portion 912 of the wedge 901 are arranged in the general portion 101 and the slot open portion 102 of the slot 10 of the stator core 1, respectively, as described hereinbefore. As a result, the convex portion 912 engages with the slot open portion 102 so that the wedge 901 can be prevented from turning and coming out of the slot open portion 102. Therefore, it is possible to keep the stable clogged state of the inner circumference opening 109 of the slot 10.

Figure 58:
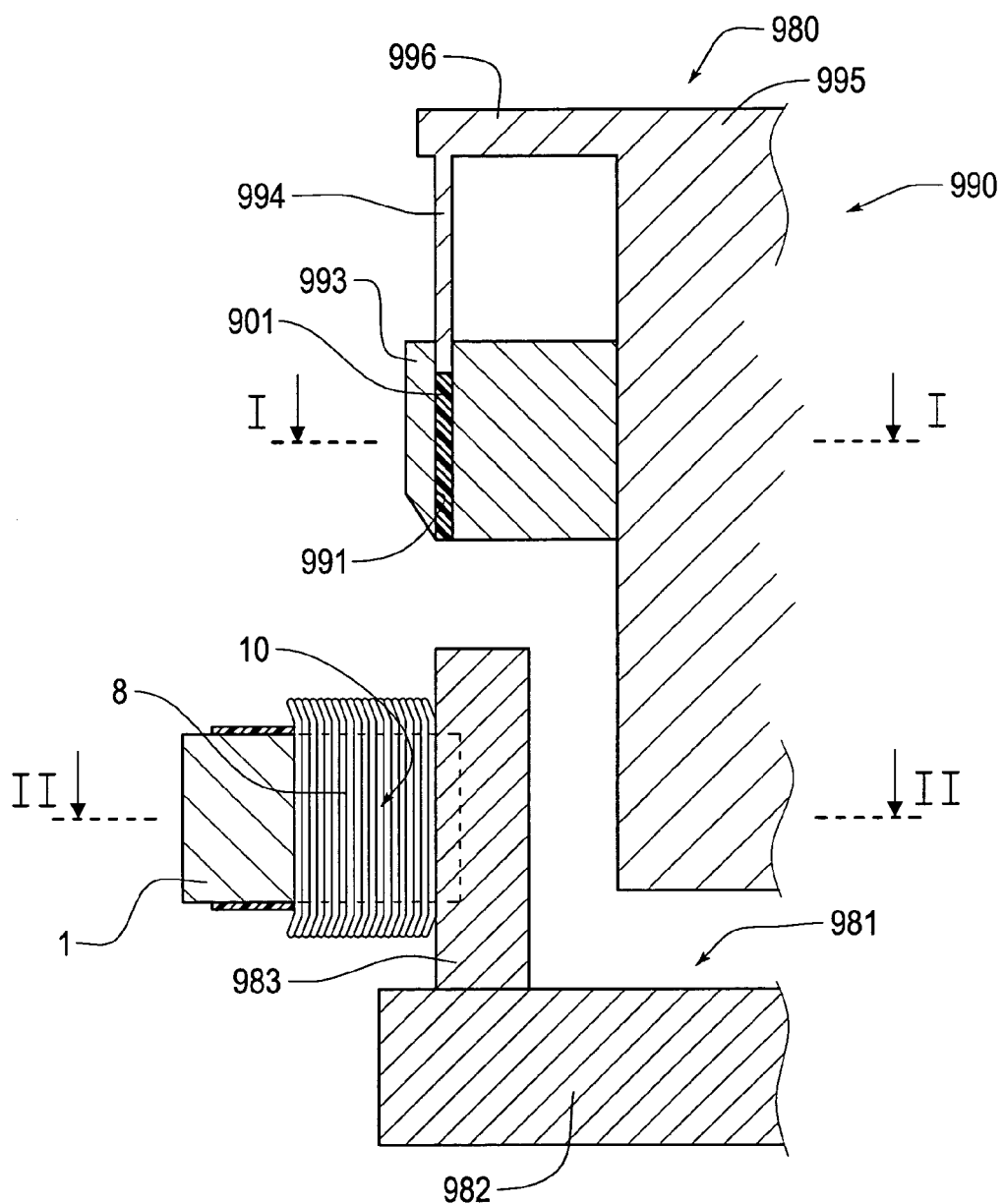
FIG. 58 is an explanatory view showing a structure of an insertion apparatus.

In the eleventh embodiment of the invention, one example of the working method of inserting the wedge 901 of the tenth embodiment into the slot 10 will be described further in detail. In this embodiment, as shown in FIG. 58, there is used an insertion apparatus 980, which can perform the coil insertion and the wedge insertion alternately.

This insertion apparatus 980 includes: a coil inserting portion 981 for executing the radial insertion method by moving the single-pole coil 8 linearly from the inner circumference side of the stator core 1 to the outer circumference side; and a wedge inserting portion 990 for moving the wedge 901 in the axial direction. Here, the axial direction and the radial direction in the following description will mean the axial direction and the radial direction of the motor of the case, in which the stator core 1 is arranged.

The coil inserting portion 981 includes: a blade unit 982 disposed movably in the radial direction; and an insertion blade 983 erected axially from the blade unit 982. Moreover, the coil inserting portion 981 can move in the axial direction together with the wedge pusher 995 when it abuts against a later-described wedge pusher 995.

On the wedge inserting portion 990 is provided with: a wedge magazine 993 having an arrangement hole 991 for arranging the wedge 901; and the wedge pusher 995 having a pushing pin portion 994 for pushing the wedge 901. This pushing pin portion 994 is extended in the axial direction from an arm portion 996 extended in the radial direction from the wedge pusher 995, and is constructed to move according to the axial movement of the wedge pusher 995.

Moreover, the wedge pusher 995 and the wedge magazine 993 can move synchronously in the axial direction till the wedge magazine 993 abuts against the stator core 1.

Figure 59:
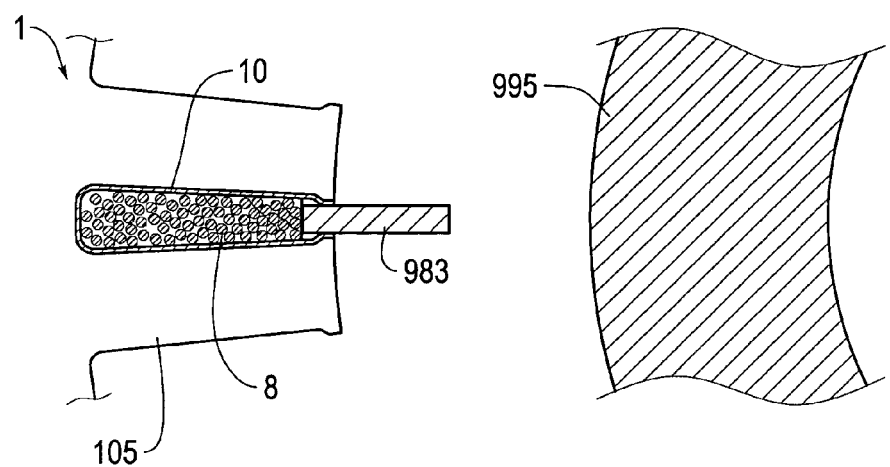
FIG. 59 is a section taken along line I-I of FIG. 58.

When the coil 8 is inserted into the slot 10 of the stator core 1, moreover, the insertion blade 983 moved from the inner circumference side to the outer circumference side is brought into abutment against the coil 8 positioned on the inner circumference side of the stator core 1 and is moved to the outer circumference side. As a result, the coil 8 is inserted in a linear motion and arranged in the slot 10 of the stator core 1, as shown in FIG. 58 and FIG. 59.

Figure 60:
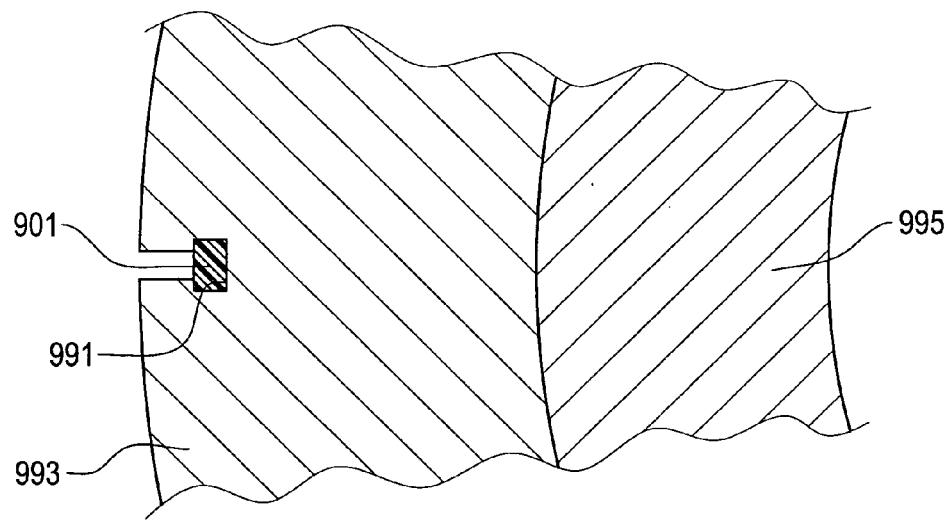
FIG. 60 is a section taken along line II-II of FIG. 58.
Figure 61:
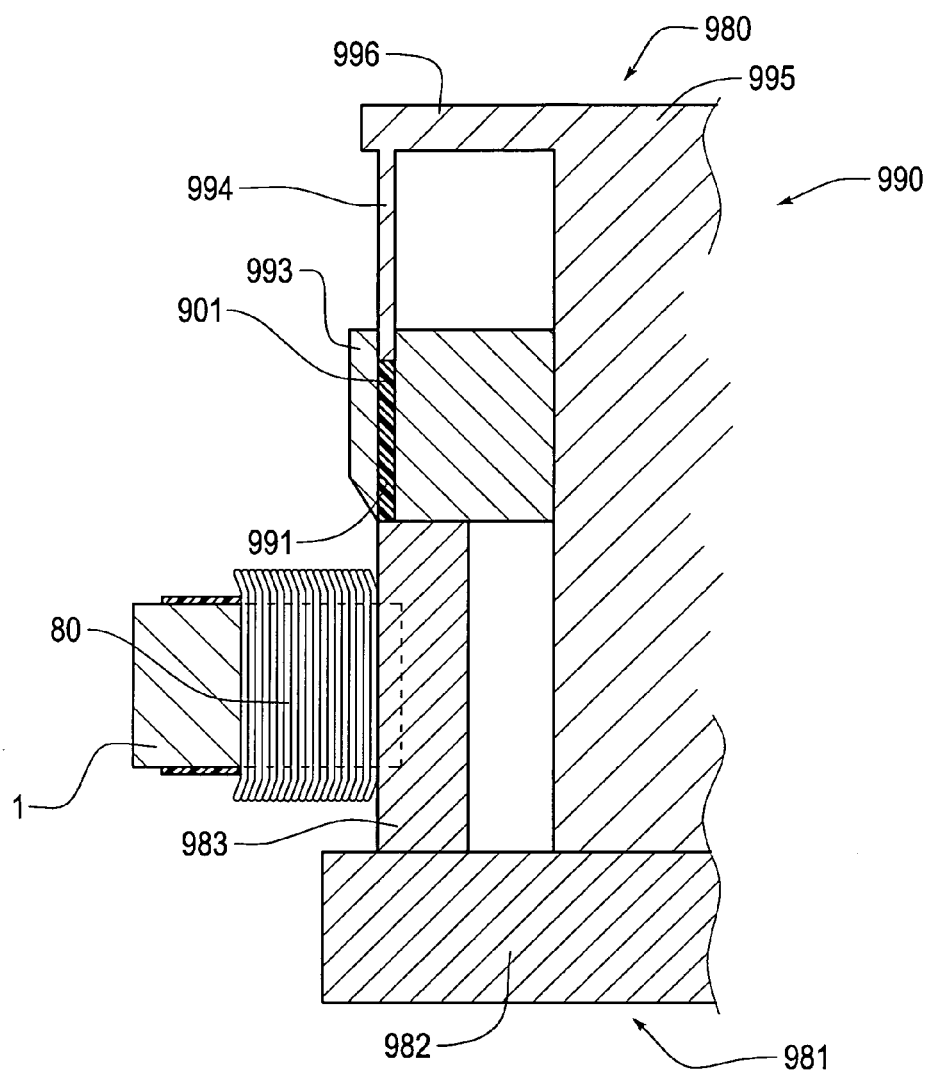
FIG. 61 is an explanatory view showing the state in which the working of a wedge pusher of the insertion apparatus is started.
Figure 62:
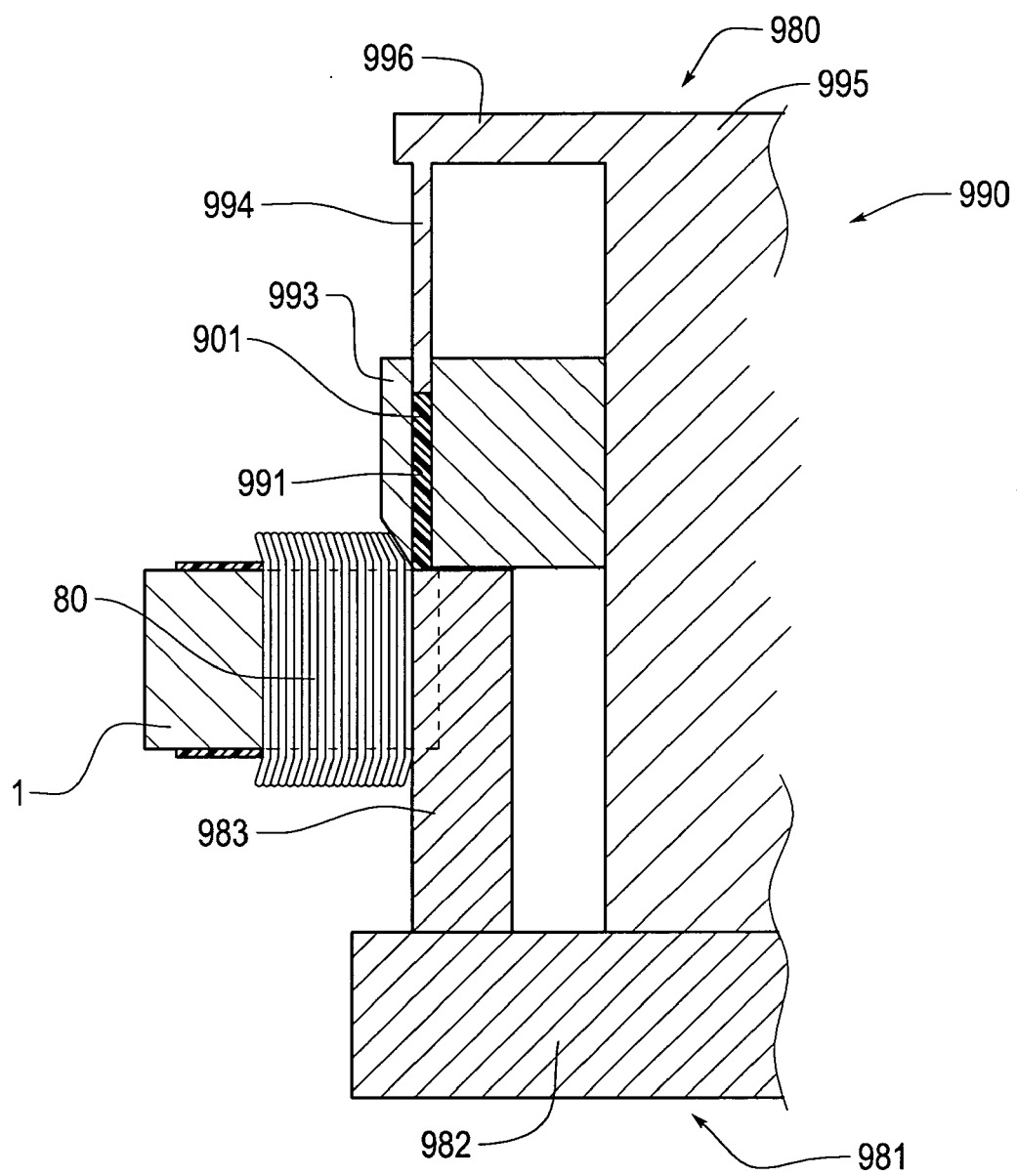
FIG. 62 is an explanatory view showing the state in which the wedge pusher of the insertion apparatus abuts against a blade unit.

Next, in the working case to insert the wedge 901, the wedge 901 is arranged in advance in the arrangement hole 991 of the wedge magazine 993, as shown in FIG. 58 and FIG. 60, and the wedge magazine 993 and the wedge pusher 995 are moved down synchronously in the axial direction. After the lower end of the wedge pusher 995 abutted against the blade unit 982, as shown in FIG. 61, the wedge inserting portion 990 and the coil inserting portion 981 move synchronously as a whole in the axial direction, as shown in FIG. 62.

Figure 63:
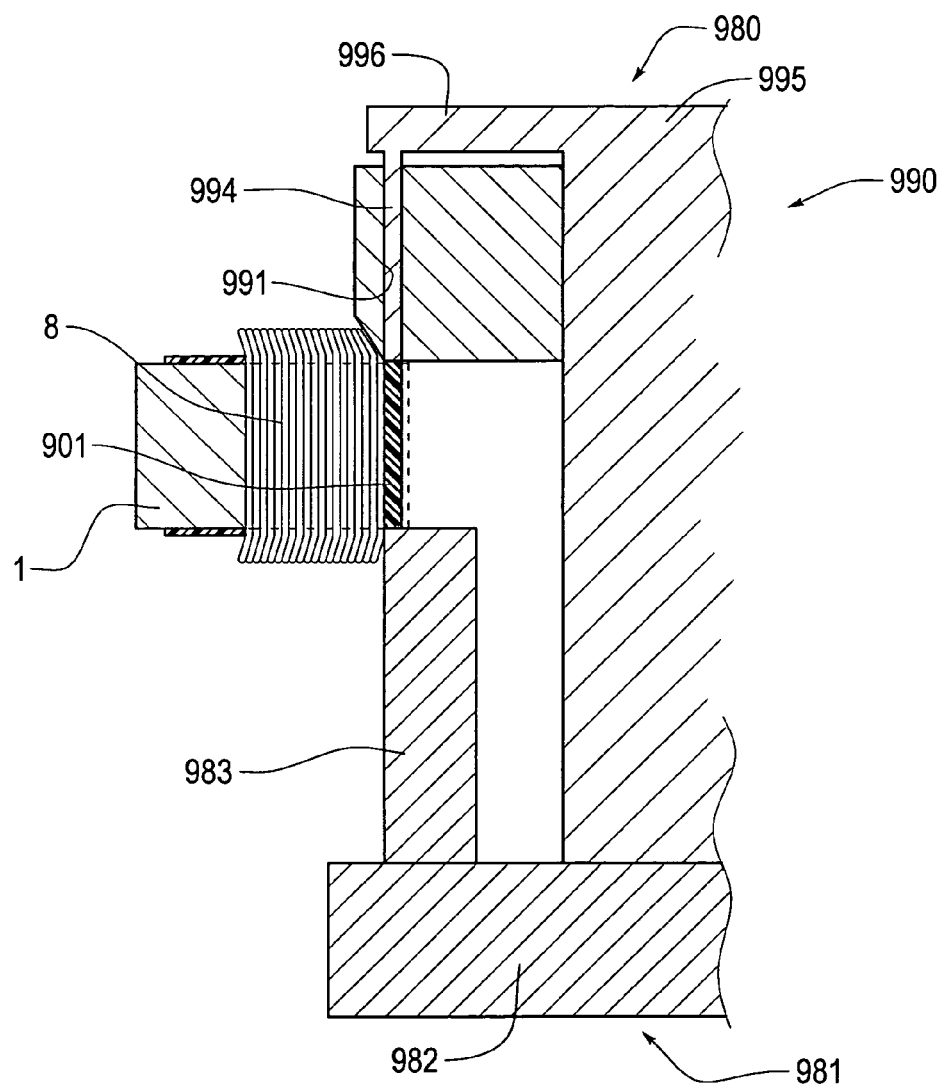
FIG. 63 is an explanatory view showing the state in which the wedge is pushed from the insertion apparatus into the slot of the stator core.

After the wedge magazine 993 abutted against the stator core 1, as shown in FIG. 63, the wedge magazine 993 exclusively stops the downward movement, but the remaining portions continue the downward movements. As a result, the pushing pin portion 994 of the wedge pusher 995 penetrates into the arrangement hole 991 of the wedge magazine 993 thereby to push out the wedge 901 downward. As a result, the wedge 901 is inserted into the slot 10.

In this embodiment, as described hereinbefore, the works to insert the wedge 901 can be reliably performed by using the insertion apparatus 980, after the works to insert the coil 8 by the radial insertion method. Especially, the wedge 901 of this embodiment has the highly rigid shape composed of the wide portion 911 and the convex portion 912, as described hereinbefore, so that it can be smoothly inserted while withstanding the pushing force of the pushing pin portion 72 sufficiently.

The twelfth embodiment of the invention presents another example for inserting the two single-pole coils 8 simultaneously at the coin inserting step into the slots 10 of the stator core 1, as shown in FIG. 64A to FIG. 65B.

The coil inserting device to be used in this embodiment is constructed to move insertion blades 381 to 384, as can be inserted into the coil retaining grooves 20 of the magazine 2, by the push of a pair of surface and back pusher plates 39.

First of all, the magazine 2 is provided, as in the first embodiment, with the parallel coil retaining grooves 20, in which the adjoining coil insertion portions 801 (i.e., 801b and 801c in FIG. 64) of the adjoining single-pole coils 8 are to be inserted and arranged. And, the pusher plate 39 is disposed to have its advancing direction (i.e., a direction of arrow G) in parallel with the two parallel coil retaining grooves 20.

Moreover, the pusher plate 39 is provided, as shown in FIG. 64, with: a central flat portion 390 arranged perpendicularly of the advancing direction (i.e., the direction of arrow G); and slope portions 391 and 392 sloped to retract on the two sides from the central flat portion 390. The central flat portion 390 is constructed to push the insertion blades 382 and 383 to abut against the adjoining coil insertion portions 801b and 801c of the two adjoining single-pole coils 8, and the slope portions 391 and 392 on the two sides are constructed to push the insertion blades 381 and 384 to abut against the coil insertion portions 801a and 801d, respectively.

As shown in FIG. 64A to FIG. 65B, moreover, the insertion blades 381 to 384 are provided with engaging pin portions 385 abutting against the pusher plate 39, so that they may individually protrude to the surface side and back side of the magazine 2.

Moreover, the two insertion blades 382 and 383 abutting against the central flat portion 390 of the pusher plate 39 are made slightly longer in the radial direction than the insertion blades 381 and 384 positioned on the two sides of the former, and are adjusted such that the leading ends of all the insertion blades 381 and 384 may be positioned on one arc around the center of the stator core 1.

On the other hand, the angle of inclination $\beta$ of the slope portions 391 and 392 of the pusher plate 39 is set at one half of the angle $\alpha$ made by the coil retaining groove 20 to insert the two coil insertion portions 801 (801a and 801b, or 801c and 801d) owned by each single-pole coil 8. In short, $\beta=\alpha/2$. As a result, when the four insertion blades 381 to 384 are pushed by the pusher plates 39, the leading ends of all the insertion blades 381 to 384 are positioned at all times on one arc around the center of the stator core 1.

Figure 64A:
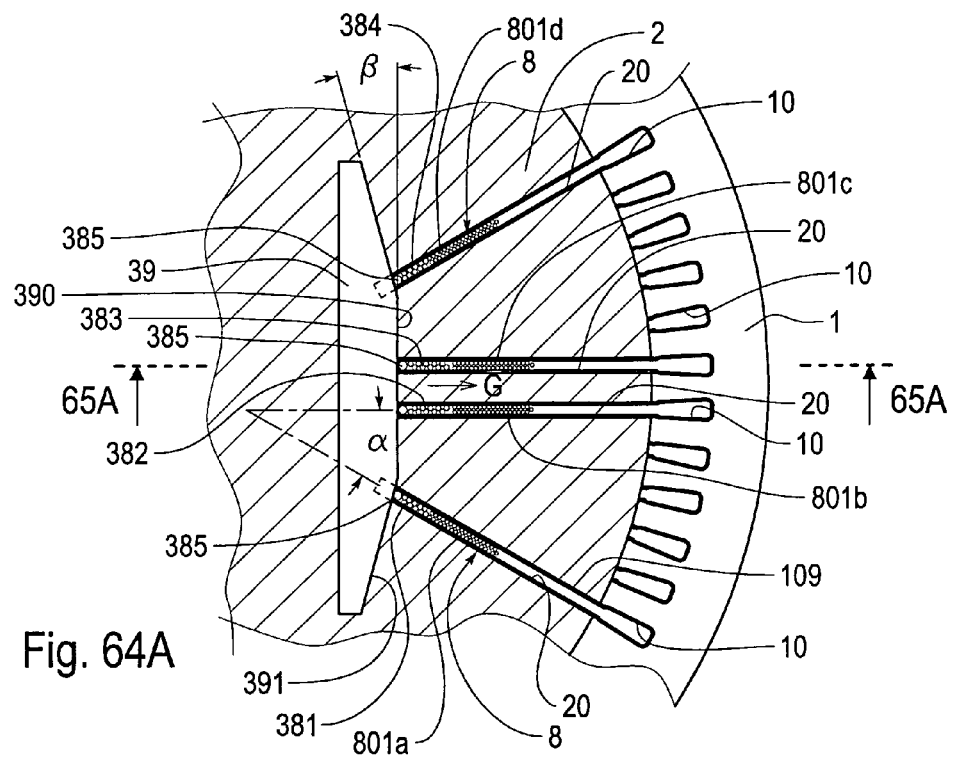
FIG. 64(a) is an explanatory view showing the state of coil inserting means taken in the axial direction of the stator core and before a pusher plate is advanced.
Figure 65A:
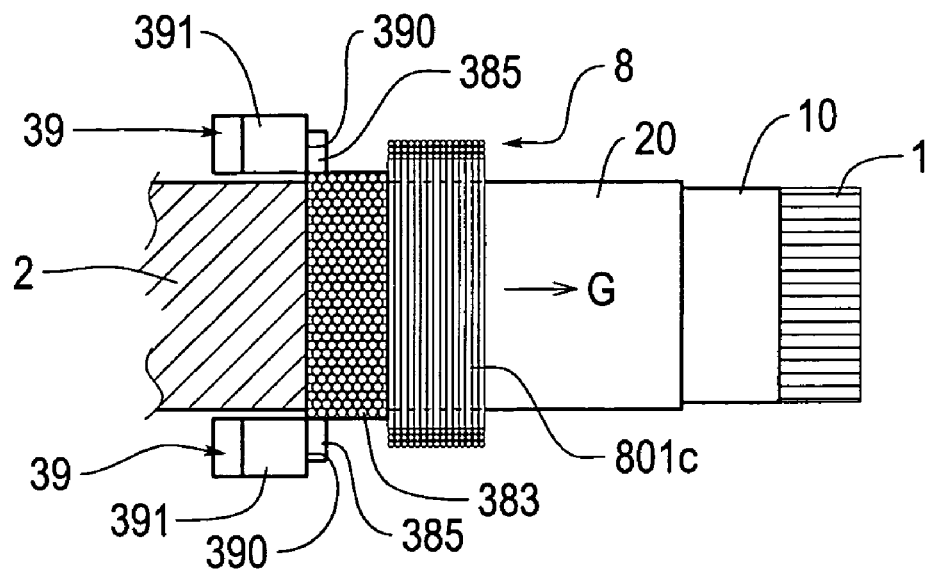
FIG. 65(a) is an explanatory view showing the state of the coil inserting means taken along line III-III of FIG. 64 and before the pusher plate is advanced.

When the two single-pole coils 8 are to be inserted into the slots 10 of the stator core 1 by using the magazine 2 and the coil inserting means thus constructed, the two single-pole coils 8 are retained by the magazine 2 acting as the coil retaining device, as shown in FIG. 64A and FIG. 65A, and this magazine 2 is arranged in the stator core 1. As a result, the two single-pole coils 8 are naturally arranged such that the coil insertion portions 801 of each single-pole coil 8 may individually confront the inner circumference openings 109 of the slots 10 and may be generally parallel to the axial direction of the stator core 1.

Next, the coil inserting device is arranged, and the paired surface and back pusher plates 39 are advanced in the direction of arrow G. As a result, the four insertion blades 381 to 384 abutting against the pusher plates 39 are pushed by the pusher plates 39 to advance along the coil retaining grooves 20.

Figure 64B:
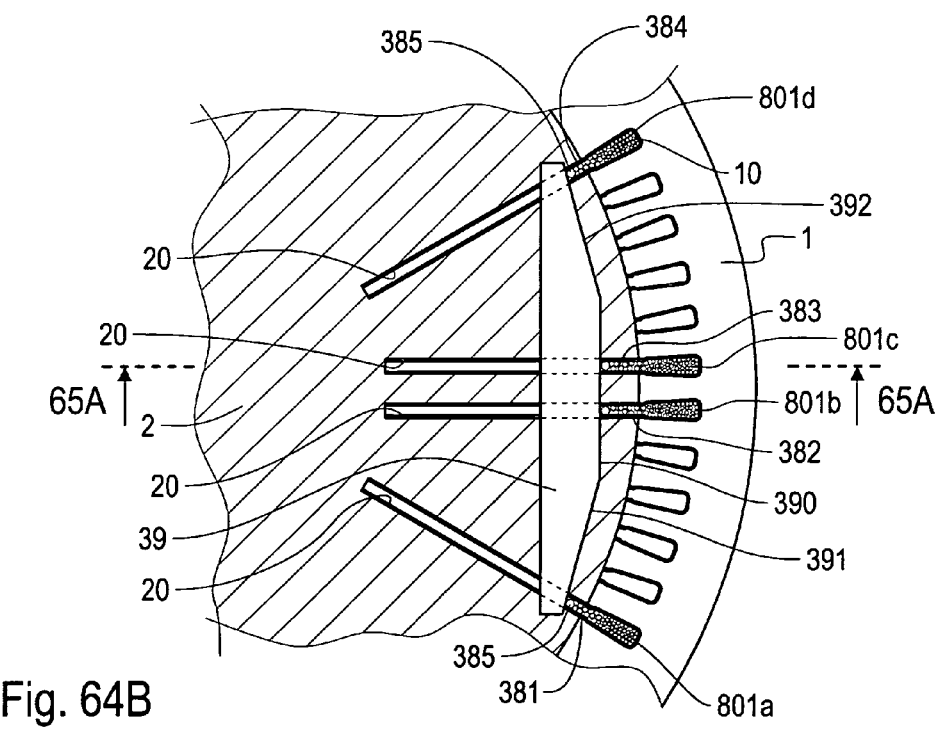
FIG. 64(b) is an explanatory view showing the state of the coil inserting means taken in the axial direction of the stator core and after the pusher plate is completely advanced.
Figure 65B:
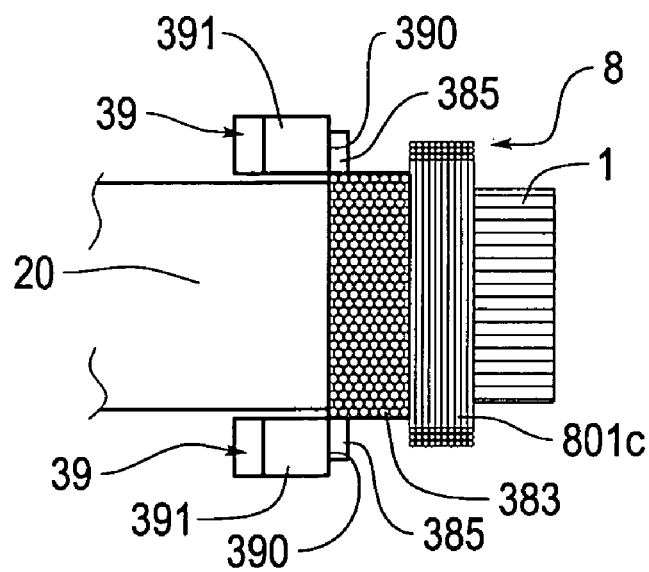
FIG. 65(b) is an explanatory view showing the state of the coil inserting means taken along line III-III of FIG. 64 and after the pusher plate is completely advanced.
Figure 66:
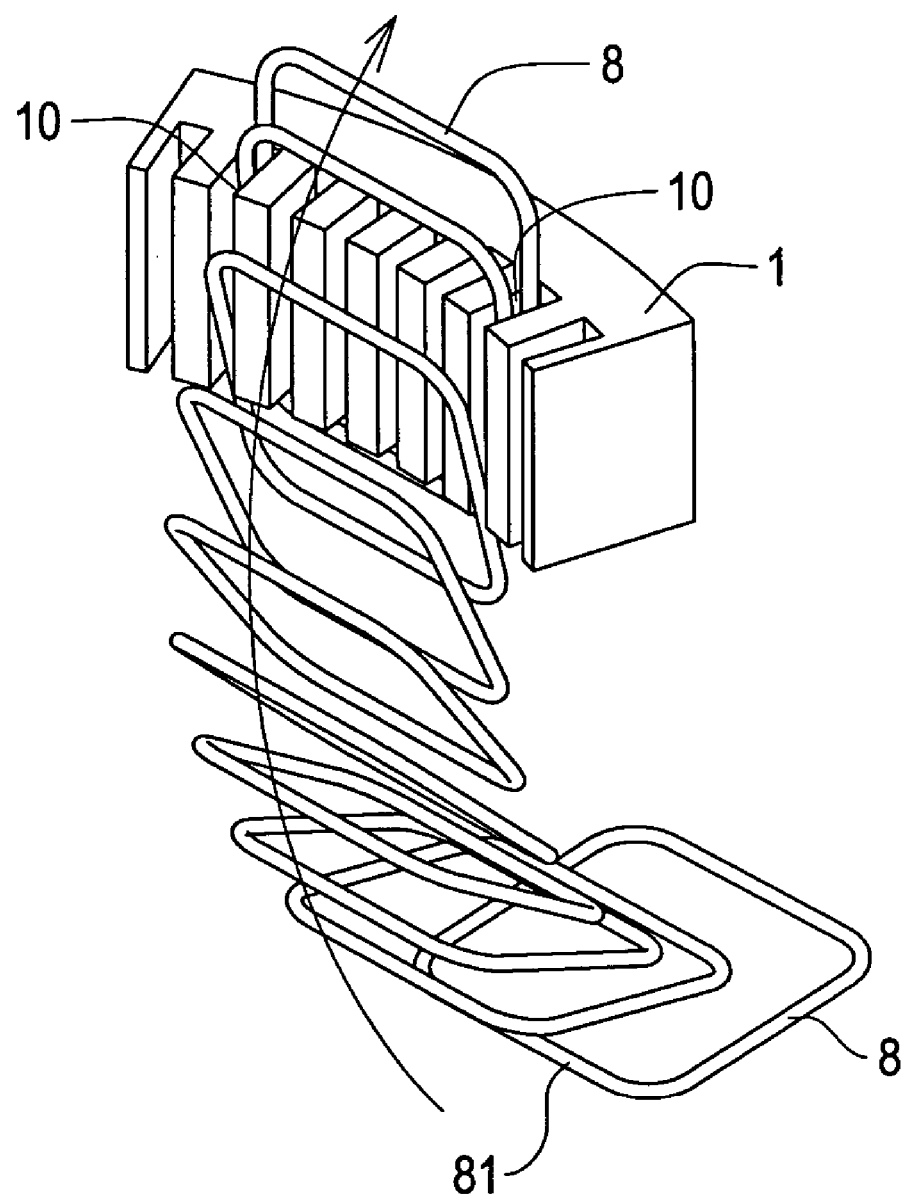
FIG. 66 is an explanatory view showing the state of a related art example, in which the locus of the coil when the coil is inserted into the stator core is perspectively taken.
Figure 67:
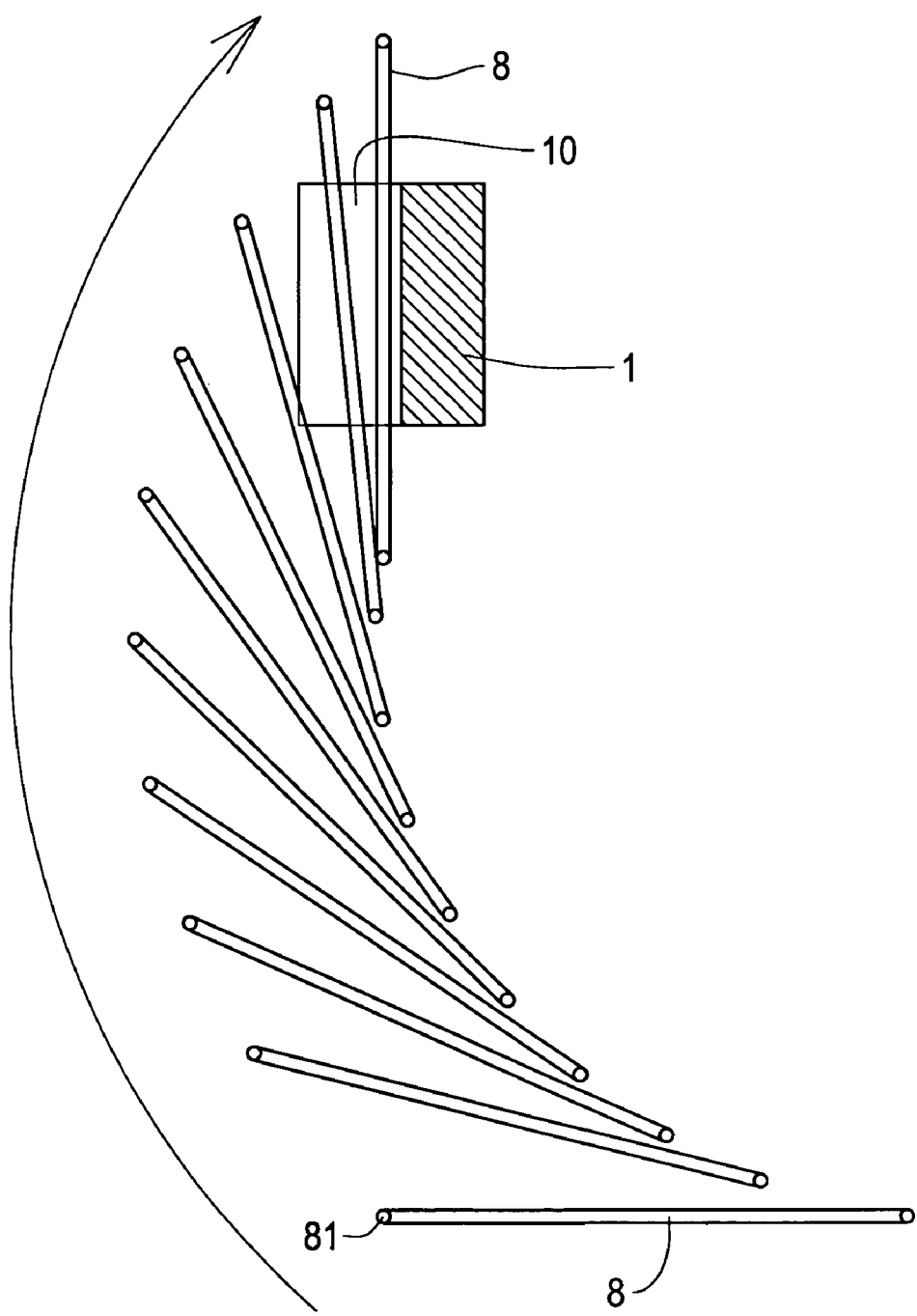
FIG. 67 is an explanatory view showing the state of the prior related example, in which the locus of the coil when the coil is inserted into the stator core is taken from the side.

In association with the motions of the pusher plates 39, all the insertion blades 381 to 384 then start movements simultaneously and continue the movements at the equal velocities. As a result, all the coil insertion portions 801a to 801d to abut against the individual insertion blades 381 to 384 start their movements simultaneously and continue the movements at the equal velocities so that they are simultaneously inserted into the slots 10 of the stator core 1 (FIG. 64B and FIG. 65B). At this time, moreover, the moving loci of the adjoining coil insertion portions 801b and 801c of the adjoining single-pole coils 8 before inserted into the slots 10, that is, while passing through the magazine 2 are parallel.

Thus in this embodiment, as described hereinbefore, the single-pole coils 8 can be moved not only generally linearly toward the stator core 1 but also such that the moving loci before the adjoining coil insertion portions 801b and 801c of the adjoining single-pole coils 8 are inserted into the slots 10 can be parallel. Moreover, the two coil insertion portions 801 (i.e., 801a and 801b, or 801c and 801d) owned by each single-pole coil 8 can start their movements simultaneously and can move at the equal velocities, and the coil insertion portions 801 (i.e., 801b and 801c) owned by the adjoining single-pole coils 8 can start their movements simultaneously and can move at the equal velocities, so that all the coil insertion portions 801a to 801c can be simultaneously inserted into the slots 10 of the stator core 1.

As in the foregoing other embodiments, therefore, it is unnecessary to add excessive length to the coil end portions, and the bulging extents of the coils from the stator core 1 can be reduced to make shorter the axial length of the motor obtained.

Here, this embodiment presents an example, in which only the two single-pole coils 8 are simultaneously handled. By adding the pusher plates and the insertion blades, however, three or more single-pole coils 8 could be simultaneously handled and inserted into the slots 10.

In accordance with various embodiments of the invention, at the coil inserting step, therefore, the single-pole coil can be inserted by the linear movement with little change in its posture. And, the so-called "linear insertion method (or radial insertion method)" can be executed. Therefore, it is not necessary to enlarge the vertical length of the single-pole coil more than necessary. Therefore, the lengths of the coil insertion portions and the coil end portions of the single-pole coil can be optimized for the state, in which it is mounted in the motor core. Thus, it is possible to reduce the axial length of the parts having the coils mounted on the motor core and accordingly the axial length of the entire motor.

Especially, single-pole coils are moved such that the moving locus the adjoining coil insertion portions in the adjoining may be parallel or may approach the more from the inner circumference side to the outer circumference side. Therefore, the single-pole coil can be easily arranged on the inner circumference side of the motor core, even in the case of using a stator core (or motor core) having a small diameter or a single-pole coil having a large number of turns (or winding number). It is possible to add an effect that the coil inserting step can be easily performed.

Moreover, the two coil insertion portions owned by each single-pole coil are either moved to start simultaneously or to take the equal velocities or moved to be simultaneously inserted into the slots. As a result, each single-pole coil can move while keeping the distance between the coil insertion portions always at the minimum. From this point, it is unnecessary to add excessive length to the coil end portions.

According to the invention, therefore, it is possible to provide the motor manufacturing process, which can reduce the bulge extents of the coil from the motor core and the axial length of the motor.

The invention thus allows, in accordance with various embodiments of the invention, a stabler movement for the single-pole coil.

The invention also allows, in accordance with various embodiments of the invention, adjoining coil insertion portions of adjoining single-pole coils that move not only such that the moving locus may be parallel or may approach the more from the inner circumference side to the outer circumference side but also such that the movement starting time, the movements and the movement completing time may be synchronized. As a result, the crossover lines or the electric lines (or wires) connecting the adjoining single-pole coils can be set to the minimum length so that the motor can be made more compact.

The invention also allows, in accordance with various embodiments of the invention, the time period required for the coil inserting step to be shortened to rationalize the steps. Here, all the single-pole coils belonging to one phase are desirably connected but may contain the single-pole coil group which is not connected but separated.

The invention also allows, in accordance with various embodiments of the invention, the angle made between the coil insertion portions and the axial direction of the motor core not exceed 5 degrees so that the effect to reduce the length of the coil end portions does not drop.

In accordance with another embodiment of the invention, it is preferable not that the coil is moved to the motor core together with the so-called "bobbin" having the coil wound thereon but that the coil is exclusively moved. As a result, the distance between the motor core and each coil (or the single-pole coil) can be reduced to give an advantage that a highly efficient magnetic circuit can be constructed.

The invention also allows, in accordance with various embodiments of the invention, the single-pole coil that can be linearly moved relatively easily while hardly changing its posture by applying the well-balanced inserting pressures to the two coil insertion portions.

The invention also allows, in accordance with various embodiments of the invention, the linear movement of the single-pole coil that can be realized relatively easily by applying the well-balanced inserting pressures to the two coil end portions.

The invention also allows, in accordance with various embodiments of the invention, the linear movement of the single-pole coil that can be realized by applying the well-balanced inserting pressures to those positions.

The invention also allows, in accordance with various embodiments of the invention, the single-pole coils that are constructed to have the partially overlapping coil end portions so that the coil end portions or the bulging portions of the coils can be effectively made compact especially by using the linear insertion method.

In accordance with various embodiments of the invention, the motor core is exemplified by the stator core and the rotor core. Especially, the case of the stator core is seriously demanded for the compact length in the axial direction, so that the invention is highly effective for the stator core.

In accordance with other embodiments of the invention, the coils are first inserted into the coil retaining grooves of the magazine. Here, the coil retaining grooves are formed in the outer circumference of the magazine. When the coils are inserted into the coil retaining grooves, therefore, it is possible to use the apparatus of a free construction without being restricted in the space and to adopt the free working method. Therefore, the coils can be relatively easily mounted in the coil retaining grooves of the magazine.

Then, the coil inserting device is brought into abutment against the coils and is moved from the inside to the outside. As a result, the coils retained by the coil retaining grooves of the magazine are linearly pushed by the coil inserting device so that they are pushed without changing their postures into the slots of the confronting motor core. In short, the linear movement of the coils can be easily executed by the movement of the coil inserting device.

Moreover, the coil retaining grooves formed in the magazine for arranging the adjoining coil insertion portions in the adjoining single-pole coils either are formed either in parallel with each other or approach the more from the inner circumference side to the outer circumference side, as described hereinbefore. Therefore, the moving loci of the adjoining coil insertion portions in the adjoining single-pole coils can be easily and reliably made either parallel or to approach each other from the inner circumference side to the outer circumference side.

At the time when the coils are mounted in the magazine, more specifically, a clearance is left between the bottom portions of the coil retaining grooves and the coils. As a result, the insertion blades can be arranged in the coil retaining grooves. By inserting the insertion blades into the coil retaining grooves, moreover, the insertion blades and the coil insertion portions positioned in the coil retaining grooves can abut against each other all over their faces thereby to realize the stable coil movements. Here, the insertions of the insertion blades into the coil retaining grooves may be timed either simultaneously or before and after the arrangement of the magazine in the motor core.

Moreover, it is preferable that the insertion blades are inserted from either the surface side face or the back side face of the magazine. As a result, it is possible to simplify the moving mechanism of the insertion blades.

In this case, it is possible to adopt either a method of moving the paired split insertion blades, as inserted from the surface and back of the magazine into the coil retaining grooves, from the center toward the outer circumference, or a method of realizing the linear movement of the coils merely by inserting the paired split insertion blades having tapered portions, from above and below, as exemplified in the later-described embodiments.

The invention also allows, in accordance with various embodiments of the invention, the coil inserting device that needs not be inserted into the coil retaining grooves so that the coils can be supported more simply and stably from the surface and back of the magazine.

The invention also allows, in accordance with various embodiments of the invention, the provisional shaping step of pushing and deforming the coil end portions or the bulging portions of the coils outward by the provisional shaping means to be easily performed, each time the coils are mounted in the motor core. As a result, the coil end portions can approach the surface of the motor core thereby to further reduce the axial length of the coil end portions. Moreover, the provisional shaping can be executed by using the magazine and the provisional shaping means so that the apparatus and the process can also be simplified.

The invention also allows, in accordance with various embodiments of the invention, the apparatus construction that can be simplified by combining the provisional shaping grooves and the provisional shaping blades.

The invention also allows, in accordance with various embodiments of the invention, the provisional shaping that can be stably performed from the surface and back of the coils.

In accordance with various embodiments of the invention, both the coil inserting device and the provisional shaping device are split to the two surface and back face sides of the magazine, more specifically, it is preferable that those existing on the same face side are linked and associated. As a result, the transfer mechanisms for the coil inserting device and the provisional shaping device can be integrated to simplify the apparatus construction.

The invention also allows, in accordance with various embodiments of the invention, the provisionally shaped coils that can be wholly shaped at once into the desired shape merely by pushing the former onto the motor core. Therefore, it is possible to perform the proper shaping step simply. By this proper shaping step, moreover, the coil end portions bulging from the motor core can be shaped to approach the motor core so that the aforementioned axial size can be made smaller.

The invention also allows, in accordance with various embodiments of the invention, in the presence of the coil inserting device and the provisional shaping device, coils that can be fixed at its proper shaping step so that the proper shaping can be stably performed. Moreover, the proper shaping step can be consecutively performed subsequent to the completion of the provisional shaping step so that the manufacturing process can be further rationalized.

The invention also allows, in accordance with various embodiments of the invention, the coils of one phase that can be handled all at once by using the magazine. By shifting the relative positions between the magazine and the motor core, moreover, all the three phases can be handled so that the works to insert the coils into the motor core can be completed by the three works.

The invention also allows, in accordance with various embodiments of the invention, at the coil forming step, coils that are formed by using the take-up jig having the winding frames radially. At the coil inserting step, moreover, the take-up jig is arranged in the motor core. At this time, the winding frames owned by the take-up jig are radially arranged. When the take-up jig is arranged in the ring-shaped motor core, therefore, the individual single-pole coils are easily made to confront the slots, into which they are to be inserted. Without the single-pole coils being transferred from the take-up jig to another transfer device or the like, therefore, the single-pole coils can be transferred from the winding frames directly to the slots of the motor core.

At the coil forming step, on the other hand, there is used a take-up jig having a unique construction including the base holder and the winding frames. As described hereinbefore, the winding frame protruding step, the winding step and the winding frame retracting step are performed sequentially for every winding frame.

Here, the winding step is performed by turning the take-up jig as a whole on the axis of the winding frame protruded. Therefore, the electric line can be fed from one direction, as described hereinbefore, so that it needs not be turned unlike the prior art. Therefore, the single-pole coils can be formed around the winding frames without any torsion in the electric line.

Moreover, the winding step is performed after the winding frame protruding step, and the winding frame retracting step is performed after the winding step. When the object winding frame of the winding step is changed, more specifically, this change can be made by advancing and retracting the winding frames at the winding frame protruding step and the winding frame retracting step, and no special space for feeding the electric line is needed between the adjoining winding frames. Therefore, the length of the crossover line between the single-pole coils obtained can be suppressed to a sufficiently small value.

In the take-up jig, as described hereinbefore, the coil retaining grooves for arranging the adjoining coil insertion portions in the adjoining single-pole coils are arranged between the adjoining winding frames either in parallel with each other or such that they approach more from the inner circumference side to the outer circumference side. Therefore, the moving loci of the adjoining coil insertion portions in the adjoining single-pole coils can be easily and reliably made either parallel or to approach each other from the inner circumference side to the outer circumference side.

The invention also allows, in accordance with various embodiments of the invention, at the coil forming step, a take-up jig that may be slightly turned as a whole on the center point of the base holder, in case the turning center of the entire take-up jig is to be changed for each winding frame. Therefore, the changing works of the turning center are facilitated when the winding frames are interchanged.

The invention also allows, in accordance with various embodiments of the invention, the shape of the single-pole coil to be formed around each winding frame that can be made wider along the axis. Therefore, it is possible to obtain the coil shape easily for the case, in which it is mounted from the inner circumference of the motor core.

The invention also allows, in accordance with various embodiments of the invention, the shape of the single-pole coil that can be easily changed by using the shaping blocks of different shapes. These shaping blocks can exhibit the function as the aforementioned positioning tool.

The invention also allows, in accordance with various embodiments of the invention, when the take-up jig is arranged on the inner surface side of the ring-shaped motor core, the clearance between the take-up jig and the inner circumference of the motor core that can be reduced to make the movement of the coils smoother.

The invention also allows, in accordance with various embodiments of the invention, when the winding frame is retracted after the single-pole coil was formed around the winding frame, a coil that can be arranged in the space of a predetermined distance between the separate plates and the winding frame so that the coil can be retained in the take-up jig while keeping its satisfactory shape.

In accordance with other embodiments of the invention, with the coil (or its coil insertion portions) being inserted into the slot of the motor core, more specifically, the wedge is inserted into the inner circumference opening of the slot so that the electric line (or wire) making the coil may not come out of the slot.

The wedge used in the motor manufacturing process using the inserter method of the prior art is constructed by folding a sheet of electrically insulating aramid fibers into a C-shape. Moreover, the wedge mounting works are performed simultaneously as the coil is inserted while being moved in the axial direction of the motor core.

In the linear insertion method of the invention, however, the wedge is not inserted into the slot simultaneously with the insertion of the coil, but the wedge insertion step is executed at a different step after the coil insertion.

The wedge, as formed by folding the aramid fiber sheet of the prior art, has such a low rigidity that its insertion into the slot while pushing out the coil. On the contrary, the aforementioned wedge is shaped to have the wide portion and the convex portion. Therefore, the wedge has a shape far superior in the rigidity to that of the wedge prepared by folding the sheet of the prior art. Therefore, the wedge has such a strength as can sufficiently endure the case in which it is solely inserted after the coil was inserted into the slot of the stator core.

By making use of the improved rigidity of the wedge, moreover, the slot open portion can be made wider than that of the prior art. Therefore, it is possible to improve the insertion of the coil at the coil inserting step.

Moreover, the wide portion and the convex portion of the wedge are arranged in the general portion and the slot open portion of the slot of the stator core, respectively. As a result, the convex portion can engage with the slot open portion so that the wedge can be prevented from turning and coming out of the slot open portion. Therefore, it is possible to keep the stable clogged state of the inner circumference opening of the slot.

The invention also allows, in accordance with various embodiments of the invention, the manufacture of the wedge to be performed easily and to lower the manufacturing cost by using a sedge molded of synthetic resin integrally with the wide portion and the convex portion. The synthetic resin can be exemplified by various synthetic resins or plastics, if it has the rigidity demanded for the wedge, the electric insulation and the heat resistance of some extent. Of these, a liquid crystal polymer called the "LCP (Liquid Crystal Polymer)" is excellent in strength characteristics and is especially preferable.

Moreover, it is preferable that an inward recessed portion is formed in the surface opposite to the face, as having the convex portion, of the wide portion of the wedge. In this case, the area of the space in the slot can be enlarged to the extent of the recessed portion so that it can contribute to the improving the filling percentage of the coil.

Moreover, at least one of the wide portion and the convex portion at least on longitudinal one end of the wedge is preferably tapered to smaller sizes in width or thickness to the end portion. In this case, even in the presence of the coil already inserted when the wedge is inserted into the slot, the wedge can be inserted while pushing away the coil along that tapered shape, so that the insertion can be improved.

Moreover, at least one of the wide portion and the convex portion at least on longitudinal one end of the wedge can also be constructed to have an R-shape by finishing the corners of the end portion into a curved shape. In this case, too, in the presence of the R-shape, it is possible to improve the insertion of the wedge into the slot.

Moreover, it is preferable that the wide portion has such a width size that it is arranged while retaining a predetermined clearance between from the inner wall face of the general portion in the slot of the stator core. In this case, when the wedge is to be inserted into the slot of the stator core, it does not receive the frictional resistance from the inner wall face of the general portion of the slot to the wedge, so that the inserting workability of the wedge can be better improved.

Moreover, it is preferable that the aforementioned clearance is smaller than the size, of which the inner wall face forming the slot open portion of the stator core protrudes from the inner wall face forming the general portion. In the state where the wedge is arranged in the slot, therefore, the wide portion can be reliably prevented from passing over and coming out of the slot open portion so that the wedge can be prevented from coming out in the axial direction by the frictional force between the wedge and the protrusion from the inner wall face.

Moreover, it is preferable that the clearance is smaller than the diameter of the electric line constructing the coil to be inserted and arranged in the slot of the stator core. In this case, the electric line of the coil in the slot can be reliably prevented from penetrating to the slot open side more than the wedge, thereby to enhance the effect of suppressing the creeping current.

Here will be described a coil inserting apparatus, which can be applied when the coil inserting step in the motor manufacturing process of the invention is executed.

Specifically, there is provided a coil inserting apparatus which comprises coil retaining device having coil retaining grooves formed at positions to confront the slots of a motor core and in which coil insertion portions of a single-pole coil are inserted into the coil retaining grooves to regain the single-pole coil in the coil retaining device, so that the single-pole coil is inserted into the slot of the motor core from the coil retaining device while the ring-shaped motor core being arranged on the outer circumference side of the coil retaining device. The soil insertion apparatus further includes a receiving bed for retaining the coil retaining device and the motor core, insertion blades adapted to be inserted into the coil retaining grooves of the coil retaining device, and a blade driving device for moving the insertion blades back and forth along the coil retaining grooves.

In this coil inserting apparatus, it is preferable: that the coil retaining device includes one or more provisional shaping grooves between the paired ones of the coil retaining grooves for retaining one single-pole coil; that the coil inserting apparatus further comprises one or more provisional shaping blades disposed between the paired insertion blades corresponding to the paired coil retaining grooves and adapted to be inserted into the provisional shaping grooves; and that the blade driving device is constructed to move the provisional shaping blades forward and backward along the provisional shaping grooves in association with the insertion blades. In this case, the provisional shaping can be performed simultaneously with the insertion of the single-pole coil.

In this coil inserting apparatus, moreover, it is preferable: that the coil inserting apparatus includes a first arm and a second arm having rocking fulcrums at their lower ends; the insertion blades are connected to the upper end of the first arm; that the provisional shaping blades are connected to the upper end of the second arm; that a first slot and a second slot having slopes at least their portions are formed in the first arm and the second arm; that lifting members to be moved up and down by an actuator are arranged on the inner sides of the first arm and the second arm; that the lifting members have a first pin and a second pin, which can slidably engage with the first slot and the second slot; and that the first arm and the second arm are rocked by moving the lifting members up and down with the actuator thereby to change the engagement positions between the first and second pins and the first and second slots, so that the insertion blades and the provisional shaping blades are advanced or retracted by the rocking motions. In this case, the advancing and retracting actions of the insertion blades and the provisional shaping blades can be executed easily and precisely.

The invention claimed is:

1. A method for manufacturing a motor with a ring-shaped motor core having slots formed in an inner circumference of the motor core and in which coils are inserted and arranged in the slots, comprising:

forming a plurality of single-pole coils that include two coil insertion portions and two coil end portions that connect the coil insertion portions; and inserting the coil insertion portions into the slots, by:

retaining the single-pole coils at or after the forming of the coils;

arranging the single-pole coils such that the coil insertion portions of each of the single-pole coils confront openings of the slots and are generally parallel to an axial direction of the motor core;

moving each of the single-pole coils substantially linearly toward the motor core such that each of the single-pole coils move from a retained position and a moving direction of adjoining coil insertion portions, before the adjoining coil insertion portions of adjoining single-pole coils are inserted into the slots, are substantially parallel or approach each other from an inner circumference side to an outer circumference side; and moving the two coil insertion portions of each single-pole coil such that the coil insertion portions start moving simultaneously and at equal velocities, wherein:

the formed coils are placed in a magazine before the coils are inserted into the slots, the magazine has such a shape such that the magazine can be arranged on an inner side of an inner circumference of motor core, which the magazine is provided on an outer circumference with a plurality of coil retaining grooves at positions confronting the slots of the motor core as to arrange the coil insertion portions of the single-pole coil, and in which the coil retaining grooves for arranging the adjoining coil insertion portions in the adjoining single-pole coils are arranged either in parallel with each other or to approach each other from the inner circumference side to the outer circumference side;

the coil insertion portions of the single-pole coils are inserted into the coil retaining grooves to retain the coils on the magazine;

the magazine is so arranged inside of the motor core that the coil retaining grooves of the magazine may confront the slots of the motor core; and all of the single-pole coils are moved from the coil retaining grooves to the slots of the motor core by bringing a coil insertion into abutment against all of the single-pole coils on the magazine thereby to advance the abutting portions in the direction from the center of the magazine to the outer circumference.

2. The motor manufacturing process in claim 1, wherein each single-pole coil is moved generally linearly toward the motor core such that the moving direction of adjoining coil insertion portions of a winding center point of each single-pole coil may be generally linear.

3. The motor manufacturing process in claim 1, wherein the single-pole coils are arranged on the inner circumference side of the motor core while being retained such that the two coil insertion portions of each single-pole coil may be individual positioned at an equal distance from the openings of the slots.

4. The motor manufacturing process in claim 1, wherein the two coil insertion portions of each single-pole coil are moved such that they start to advance simultaneously into the slots and complete advancements simultaneously.

5. The motor manufacturing process in claim 1, wherein all of the coil insertion portions of the single-pole coils start moving simultaneously and at equal velocities.

6. The motor manufacturing process in claim 1, wherein the motor includes coil groups of a plurality of phases, each of which is composed of the plurality of the single-pole coils, and all of the single-pole coils belonging to one phase are arranged in the motor core so that their coil insertion portions of all of the single-pole coils start to move simultaneously and move at the equal velocities.

7. The motor manufacturing process in claim 1, wherein the movements of the single-pole coil are done while an angle made between the coil insertion portions and the axial direction of the motor core are kept within 5 degrees.

8. The motor manufacturing process in claim 1, wherein only the single-pole coil is inserted into the slot of the motor core.

9. The motor manufacturing process in claim 1, wherein the single-pole coil is moved generally linearly toward the motor core by applying insertion pressures individually at least to the two coil insertion portions of the single-pole coil.

10. The motor manufacturing process in claim 1, wherein the single-pole coil is moved generally linearly toward the motor core by applying insertion pressures individually at least to the two coil end portions of the single-pole coil.

11. The motor manufacturing process in claim 1, wherein the single-pole coil is moved generally linearly toward the motor core by applying insertion pressures individually to a plurality of positions which are generally symmetric with respect to a winding center point of each single-pole coil.

12. The motor manufacturing process in claim 1, wherein the motor is a distributed winding type motor including:
the ring-shaped motor core having the slots formed in the inner circumference, and
coil groups of a plurality of phases, each of which is composed of the single-pole coils making one pole, in which individual single-pole coils are individually inserted across two slots and arranged in the motor core and in which the single-pole coils belonging to the coil groups of different phases overlap the coil end portions partially when they are mounted in the motor core.

13. The motor manufacturing process in claim 1, wherein the motor core is a stator core.

14. The motor manufacturing process in claim 1, wherein the coil inserting device includes insertion blades, which can be inserted into the coil retaining grooves of the magazine, so that the coil insertion portions are moved from the coil retaining grooves into the slots of the motor core by inserting the insertion blades into the coil retaining grooves to advance them from the center toward the outer circumference.

15. The motor manufacturing process in claim 1, wherein the coil inserting device includes a pair of split insertion blades, which can be inserted individually from a surface side and a back side of the magazine into the coil retaining grooves, so that the coil insertion portions are moved from the coil retaining grooves into the slots of the motor core by inserting the paired split insertion blades individually from the surface side and the back side of the magazine into the coil retaining grooves to bring them into abutment against the coil insertion portions and by advancing the abutting portions in the direction from the center to the outer circumference.

16. The motor manufacturing process in claim 1, wherein the coil inserting device includes a pair of split insertion hooks, which are divided on a surface side and a back side of the magazine, so that the coil insertion portions are moved from the coil retaining grooves into the slots of the motor core by bringing the paired split insertion hooks individually into abutment against the coil end portions protruding to the surface side and the back side of the magazine to advance them in the direction from the center of the magazine to the outer circumference.

17. The motor manufacturing process in claim 1, wherein, simultaneously with or after the movement of the coil insertion portions from the coil retaining grooves to the slots, a provisional shaping step of pushing and deforming the coil end portions is performed by advancing a provisional shaping device arranged between the adjoining coil retaining grooves in the direction from the center of the magazine to the outer circumference.

18. The motor manufacturing process in claim 17, wherein the magazine is provided with provisional shaping grooves in juxtaposition to the coil retaining grooves, and in that provisional shaping blades capable of being inserted into the provisional shaping grooves are used as the provisional shaping device, so that the provisional shaping step is performed by inserting the provisional shaping blades into the provisional shaping grooves to advance them in the direction from the center to the outer circumference.

19. The motor manufacturing process in claim 17, where the provisional shaping device includes a pair of split provisional shaping blades split on the surface side and the back side of the magazine, so that the provisional shaping step is performed by advancing the paired split provisional shaping blades on the surface side and the back side of the magazine in the direction from the center of the magazine to the outer circumference.

20. The motor manufacturing process in claim 19, wherein the coil inserting device includes a pair of split provisional shaping blades split on the surface side and the back side of the magazine, and in that the split insertion blades and the split provisional shaping blades are associated with each other.

21. The motor manufacturing process in claim 17, after the coil inserting step and the provisional shaping step are repeated a plurality of times, a proper shaping step of shaping the coil end portions is performed by pushing a former having shaping faces for profiling the coil end portions into a desired shape, onto the motor core.

22. The motor manufacturing process in claim 21, wherein the formers are provided with cutouts for preventing the interference between the coil inserting device and the provisional shaping device, and in that the formers are pushed onto the motor core while the coil inserting device and the provisional shaping device are kept in the advanced state.

23. The motor manufacturing process in claim 1, wherein the motor is a three-phase DC brushless motor, and in that at the coil inserting step, the single-pole coils of one phase are simultaneously inserted into the slots of the motor core.

24. The motor manufacturing process in claim 1, wherein:
a take-up jig is used to form the coils, the take-up jig includes a base holder and a plurality of winding frames arranged radially on an outer circumference of the base holder, in which the winding frames are arranged to move back and forth with respect to the base holder, and in which the coil retaining grooves for arranging the adjoining coil insertion portions in the adjoining single-pole coils are arranged between the adjoining winding frames either in parallel with each other or such that they approach more from the inner circumference side to the outer circumference side; and
the motor manufacturing process comprises:
advancing one of the winding frames to protrude more than the remaining winding frames;
winding an electric line on the protruded winding frame to form the single-pole coil, by feeding the protruded winding frame in one direction with the electric line and by turning the take-up jig as a whole on the axis of the winding frame; and
retracting the winding frame having the single-pole coil formed, wherein:
the steps are sequentially repeated on the adjoining winding frames and are performed at the winding step by reversing the turning directions of the take-up jig sequentially; and the take-up jig is used as the magazine so the take-up jig retaining the coil is arranged inside of the motor core and so that the each single-pole coil is moved from the winding frame directly to the slots of the motor core.

25. The motor manufacturing process in claim 24, wherein the base holder in the take-up jig exhibits a disc shape, and the winding frames are arranged to move back and forth along the axes extending radially from the center point of the base holder.

26. The motor manufacturing process in claim 24, wherein each winding frame in the take-up jig has a sector shape made wider along the axis.

27. The motor manufacturing process in claim 24, wherein each winding frame in the take-up jig is removably provided with shaping blocks for profiling a shape of the single-pole coil to be wound.

28. The motor manufacturing process in claim 24, wherein the take-up jig has such a contour formed of the leading ends of the winding frames while all of the winding frames being retracted is circular around the center point of the base holder.

29. The motor manufacturing process in claim 24, wherein separate plates extended from the outer circumference of the base holder are so arranged on the two sides of the each winding frame that a predetermined spacing is retained between the separate plates and the winding frame.

30. The motor manufacturing process in claim 1, wherein:
the slot of the motor core includes a slot open portion constricted in a space portion at an inner circumference end portion of the slot; and a general portion formed on the outer circumference side of the slot open portion and made larger in the space width than the slot open portion; and after the coil is integrated, a wedge inserting step is performed to insert the wedge in the axial direction of the motor core into said slot so that the opening in said slot may be clogged.

31. The motor manufacturing process in claim 30, wherein the wedge includes a wide portion arranged in the general portion of the slot, and a convex portion, which has a smaller width size than that of the wide portion, which is protruded from the wide portion and which is arranged in the slot open portion.

32. The motor manufacturing process in claim 31, wherein the wedge is molded of a synthetic resin integrally with the wide portion and the convex portion.

33. The motor manufacturing process in claim 30, wherein:.

insertion blades capable of penetrating into the slots are used to push and guide the coil insertion portions into the slots, and penetrate by themselves into the slots; and the insertion blades and the wedge are moved in association with each other in the axial direction of the motor core and are interchanged to insert the wedge into the slot.

\* \* \* \* \*